US011862378B2

(12) United States Patent
Sullivan et al.

(10) Patent No.: US 11,862,378 B2
(45) Date of Patent: Jan. 2, 2024

(54) RESONANT COILS WITH INTEGRATED CAPACITANCE

(71) Applicant: THE TRUSTEES OF DARTMOUTH COLLEGE, Hanover, NH (US)

(72) Inventors: Charles R. Sullivan, West Lebanon, NH (US); Aaron L. F. Stein, West Lebanon, NH (US); Phyo Aung Kyaw, West Lebanon, NH (US)

(73) Assignee: THE TRUSTEES OF DARTMOUTH COLLEGE ( * ) Notice: Subject to any disclaimer, the term of this patent is extended or adjusted under 35 U.S.C. 154(b) by 1382 days.

(21) Appl. No.: 16/319,633

(22) PCT Filed: Jul. 21, 2017

(86) PCT No.: PCT/US2017/043377
§ 371 (c)(1),
(2) Date: Jan. 22, 2019

(87) PCT Pub. No.: WO2018/018006
PCT Pub. Date: Jan. 25, 2018

(65) Prior Publication Data

US 2021/0304949 A1 Sep. 30, 2021

Related U.S. Application Data

(60) Provisional application No. 62/365,668, filed on Jul. 22, 2016.

(51) Int. Cl.
*H01F 27/32* (2006.01)
*H01F 27/28* (2006.01)
(Continued)

(52) U.S. Cl.
CPC ....... *H01F 27/2804* (2013.01); *H01F 27/006* (2013.01); *H01F 27/24* (2013.01); *H01F 27/323* (2013.01); *H01F 2027/2809* (2013.01)

(58) Field of Classification Search
CPC ............. H01F 17/0013; H01F 27/2804; H01F 2027/2809; H01F 17/0006; H01F 5/003;
(Continued)

(56) References Cited

U.S. PATENT DOCUMENTS 6,946,833 B1 9/2005 Logue et al.
2004/0246692 A1* 12/2004 Satoh .................... H01L 27/016
257/E27.113
(Continued)

FOREIGN PATENT DOCUMENTS

JP 11097244 A * 4/1999
WO WO-2014121100 A1 * 8/2014 ......... H01F 17/0013

OTHER PUBLICATIONS

PCT/US2017/043377 International Search Report and Written Opinion dated Nov. 16, 2017, 15 pp.
(Continued)

*Primary Examiner* — Tszfung J Chan
(74) *Attorney, Agent, or Firm* — Cozen O'Connor

(57) ABSTRACT

A resonant coil with integrated capacitance includes at least one separation dielectric layer and a plurality of conductor layers stacked in an alternating manner. Each of the plurality of conductor layers includes a first conductor sublayer and second conductor sublayer having common orientation and a sublayer dielectric layer separating the first and second conductor sublayers. Adjacent conductor layers of the plurality of conductor layers have different orientations.

19 Claims, 38 Drawing Sheets

(51) Int. Cl.
*H01F 27/00* (2006.01)
*H01F 27/24* (2006.01)

(58) Field of Classification Search
CPC ....... H01F 2017/0026; H01F 2038/146; H01F 27/006; H01F 27/24; H01F 27/34; H01F 2017/0073; H01F 2027/2857; H01F 27/323; H02J 5/005; H02J 50/12; H01P 3/16
USPC .................................. 336/200, 232; 307/104
See application file for complete search history.

(56) References Cited

U.S. PATENT DOCUMENTS

| | | | | |
|---|---|---|---|---|
| 2004/0257175 | A1* | 12/2004 | Hidaka | H01P 1/2016 333/204 |
| 2008/0061917 | A1 | 3/2008 | Manoukian et al. | |
| 2009/0127962 | A1 | 5/2009 | Ohyama et al. | |
| 2011/0101788 | A1* | 5/2011 | Sun | H01F 38/14 307/104 |
| 2016/0005531 | A1 | 1/2016 | Sullivan | |
| 2016/0086721 | A1* | 3/2016 | Park | H01F 27/2804 336/200 |

OTHER PUBLICATIONS

PCT/US2017/043377 International Preliminary Report on Patentability dated Jan. 22, 2019, 12 pp.

* cited by examiner

RESONANT COILS WITH INTEGRATED CAPACITANCE

CROSS-REFERENCE TO RELATED APPLICATIONS

This application is a 35 U.S.C. 071 filing of International Application No. PCT/US2017/043377, filed Jul. 21, 2017, which claims benefit of priority to U.S. Provisional Patent Application Ser. No. 62/365,665, filed Jul. 22, 2016, each of which is incorporated herein by reference in its entirety.

U.S. GOVERNMENT RIGHTS

This invention was made with government support under award number 1507773 awarded by the National Science Foundation. The government has certain rights in the invention.

BACKGROUND

Resonant coils with integrated capacitance are electrical conductors which exhibit capacitance and inductance. Consequently, these resonant coils can achieve resonance without external reactive components, when part of an electrical circuit. Resonant coils with integrated capacitance are used, for example, in high-frequency transmission lines, as resonant tank elements in electrical circuits, and to generate a magnetic field for uses such as induction heating, magnetic hyperthermia and wireless power transfer.

FIG. 1 is a top plan view a prior art resonant coil 100 with integrated capacitance. Resonant coil 100 includes a stack of alternating electrically conductive first and second conductor sublayers 102, 104. FIG. 2 is a top plan view of one first conductor sublayer 102 instance, and FIG. 3 is a top plan view of one second conductor sublayer 104 instance. FIG. 4 is an exploded perspective view of resonant coil 100, and FIG. 5 is a cross-sectional view of resonant coil 100 taken along line 5A-5A of FIG. 1.

Resonant coil 100 includes a plurality of unit cells or conductor layers 106 stacked in a thickness 108 direction. In this document, specific instances of an item may be referred to by use of a numeral in parentheses (e.g., conductor layer 106(1)) while numerals without parentheses refer to any such item (e.g., conductor layers 106). Each conductor layer 106 includes a respective first conductor sublayer 102, sublayer dielectric layer 110, and second conductor sublayer 104, stacked in the thickness 108 direction. Adjacent conductor layers 106 are separated in the thickness 108 direction by a separation dielectric layer 112. Each first conductor sublayer 102 forms a first discontinuity or notch 114 (FIG. 2), and each second conductor sublayer 104 forms a second discontinuity or notch 118 (FIG. 3). Conductor sublayers 102 are angularly displaced from conductor sublayers 104 by about 180 degrees around a center axis 116. Thus, notches 114, 118 of first and second conductor sublayers 102, 104, respectively, are angularly displaced from each other by about 180 degrees, such that notches of immediately adjacent conductors in the thickness 108 direction are angularly displaced from each other by 180 degrees.

Dielectric layers 110, 112 are formed, for example of a polymer material, such as polyimide. However, polyimide has a relatively high dielectric loss, and therefore, an insulating material with a lower dielectric loss than polyimide, such as polytetrafluoroethylene (PTFE), perfluoroalkoxy (PFA), ethylene tetrafluoroethylene (ETFE), fluorinated ethylene propylene (FEP), polypropylene, polyethylene, polystyrene, glass, or ceramic is typically required to obtain high performance.

SUMMARY

In an embodiment, a resonant coil with integrated capacitance includes at least one separation dielectric layer and a plurality of conductor layers stacked in an alternating manner Each of the plurality of conductor layers includes a first conductor sublayer and second conductor sublayer having common orientation and a sublayer dielectric layer separating the first and second conductor sublayers. Adjacent conductor layers of the plurality of conductor layers have different orientations.

In an embodiment, a resonant coil with integrated capacitance includes (a) first and second terminals and (b) at least one separation dielectric layer and a plurality of conductor layers stacked in an alternating manner in a first direction. Each of the plurality of conductor layers includes a first conductor sublayer, a second conductor sublayer, and a sublayer dielectric layer separating the first and second conductor sublayers in the first direction. At least one of the plurality of conductor layers is electrically coupled to the first terminal, and at least one of the plurality of conductor layers is electrically coupled to the second terminal, such that the resonant coil has a series-resonant electrical topology as seen from the first and second terminals.

In an embodiment, a magnetic device includes a magnetic core and a plurality of conductor layers. The magnetic core includes an end magnetic element, a center post extending away from the end magnetic element in a thickness direction, a hollow outer magnetic element concentric with the center post and extending away from the end magnetic element in the thickness direction, an inner magnetic extension, and an outer magnetic extension. The inner magnetic extension and the outer magnetic extension are concentric with the center post. Each of the inner magnetic extension and the outer magnetic extension are disposed between the hollow outer magnetic element and the center post as seen when the magnetic device is viewed cross-sectionally in the thickness direction. The plurality of conductor layers are wound around the center post.

In an embodiment, a magnetic device includes a magnetic core and a plurality of conductor layers. The magnetic core includes first and second end magnetic elements separated from each other in a first direction, a first inner magnetic extension disposed on the first end magnetic element and extending toward the second end magnetic element, a first outer magnetic extension disposed on the first end magnetic element and extending toward the second end magnetic element, a second inner magnetic extension disposed on the second end magnetic element and extending toward the first end magnetic element, and a second outer magnetic extension disposed on the second end magnetic element and extending toward the first end magnetic element. The plurality of conductor layers are disposed, as seen when the magnetic device is viewed cross-sectionally in the first direction, (a) outside of the first and second inner magnetic extensions and (b) inside of the first and second outer magnetic extensions.

DETAILED DESCRIPTION OF THE EMBODIMENTS

Figure 1:
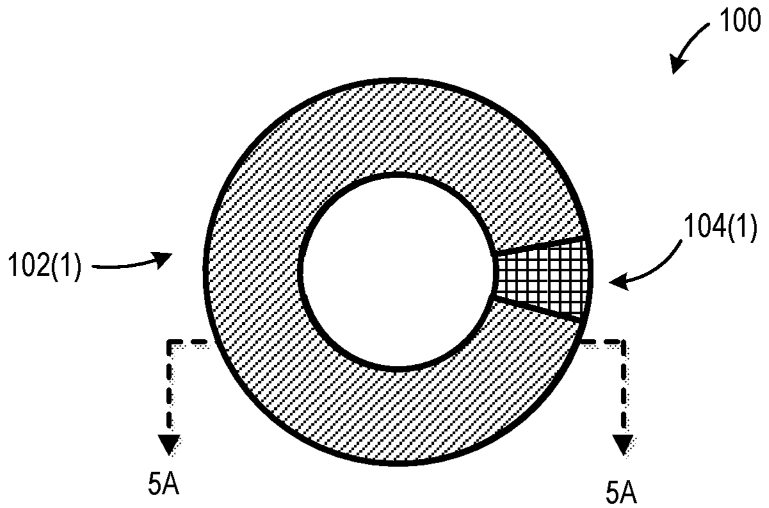
(PRIOR ART) FIG. 1
FIG. 1 is a top plan view of a prior art resonant coil with integrated capacitance.
Figure 2:
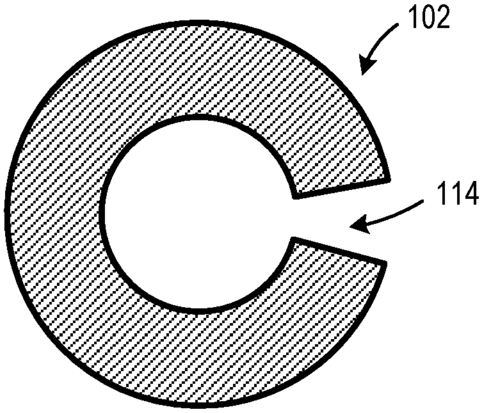
(PRIOR ART) FIG. 2
FIG. 2 is a top plan view of one first conductor sublayer instance of the FIG. 1 resonant coil.
Figure 3:
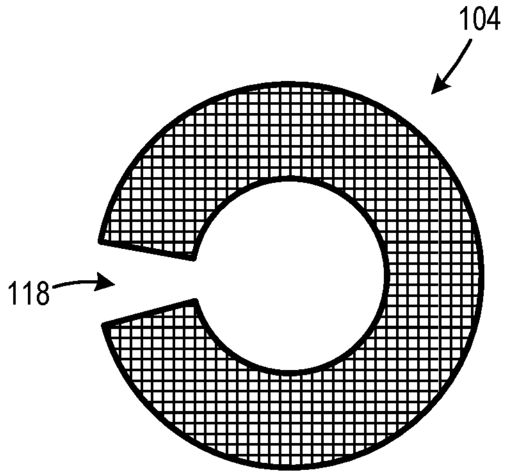
(PRIOR ART) FIG. 3
FIG. 3 is a top plan view of one second conductor sublayer instance of the FIG. 1 resonant coil.
Figure 4:
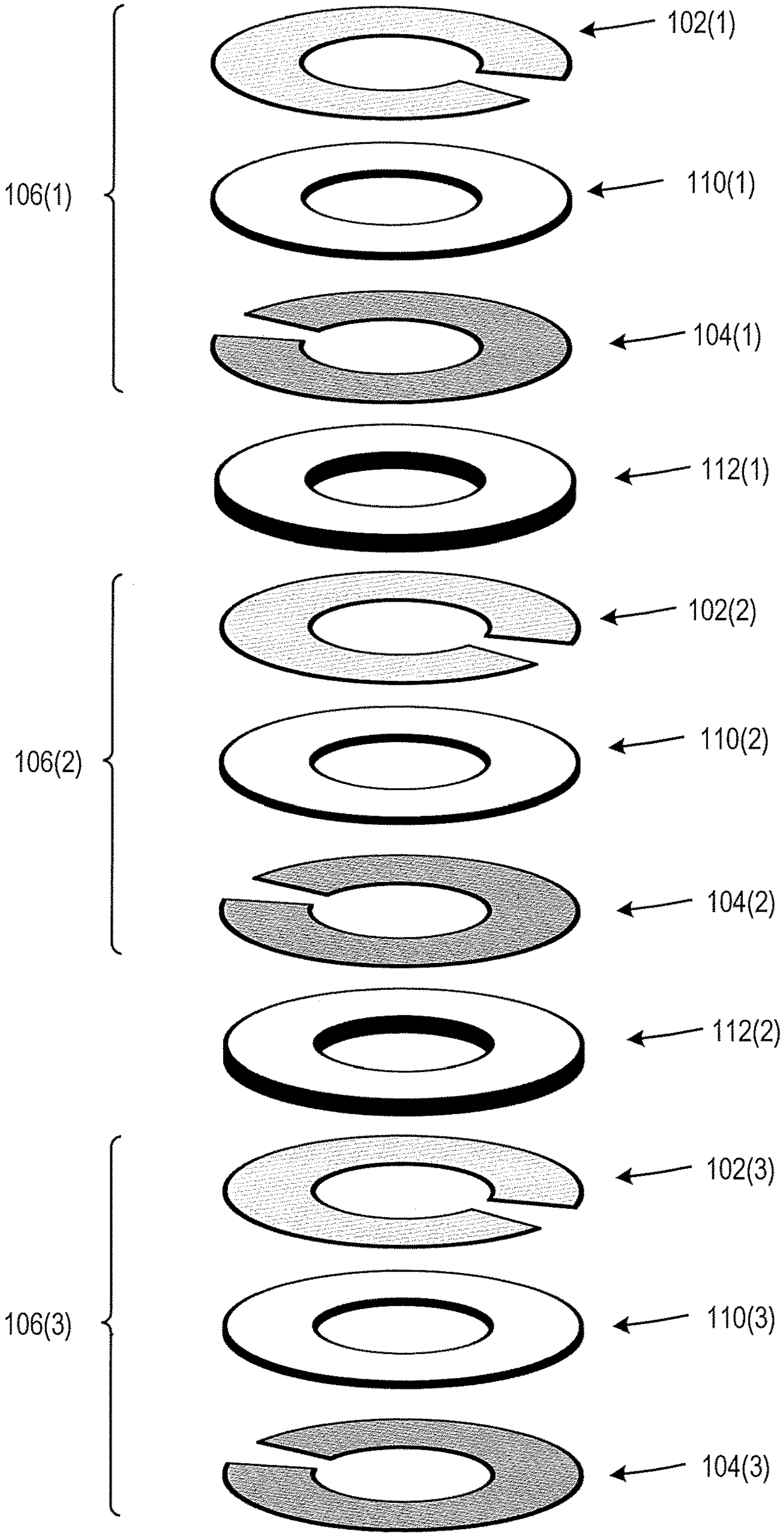
(PRIOR ART) FIG. 4
FIG. 4 is an exploded perspective view of the FIG. 1 resonant coil.

Prior art resonant coil 100 of FIG. 1 can obtain high performance with use of low-loss dielectric materials, as discussed above. However, it can be difficult and/or expensive to manufacture this resonant coil with low-loss dielectric materials. For example, in typical high-performance implementations of resonant coil 100, thicknesses of first and second conductor sublayers 102, 104 are less than 20 microns. These small thicknesses make it difficult to handle first and second conductor sublayers 102, 104 while keeping them flat. Thus, an attractive method for manufacturing resonant coil 100 is to start with a laminate including a first foil conductor layer, a layer of dielectric, and a second foil conductor layer. The foil conductor layers are then etched in complimentary C shapes to form sections including first and second conductor sublayers 102, 104, and the sections are stacked in an alternating manner with additional dielectric rings. The sections can be made using a standard printed circuit board (PCB) process.

Unfortunately, standard dielectrics used in the PCB industry, such as polyimide and FR4 epoxy fiberglass composite, have relatively high dielectric loss. Consequently, prior art resonant coil 100 cannot achieve high-performance, e.g., high quality factor (Q), when formed using standard PCB manufacturing techniques. While low-loss laminate materials, such as liquid-crystal polymers and PTFE, are available for specialized high-frequency PCBs, these materials are very expensive. Additionally, very thin dielectric is needed in many designs, which can further increase material cost, PCB processing cost, and post-processing handling cost, when forming resonant coil 100 using standard PCB manufacturing techniques.

Applicant has developed new resonant coils with integrated capacitance which at least partially overcome the drawbacks to prior art resonant coil 100 discussed above. These new resonant coils minimize electric field in dielectric material between selected conductor sublayers, such that dissipation losses between the selected conductor sublayers do not significantly affect resonant coil performance Consequentially, high-performance can be obtained even if dielectric between the selected conductor sublayers is formed of a high-loss material, such as FR4 or polyimide, thereby enabling use of low-cost manufacturing techniques and materials. Additionally, certain embodiments of the new resonant coils are relatively simple to construct, thereby further promoting low cost.

Figure 6:
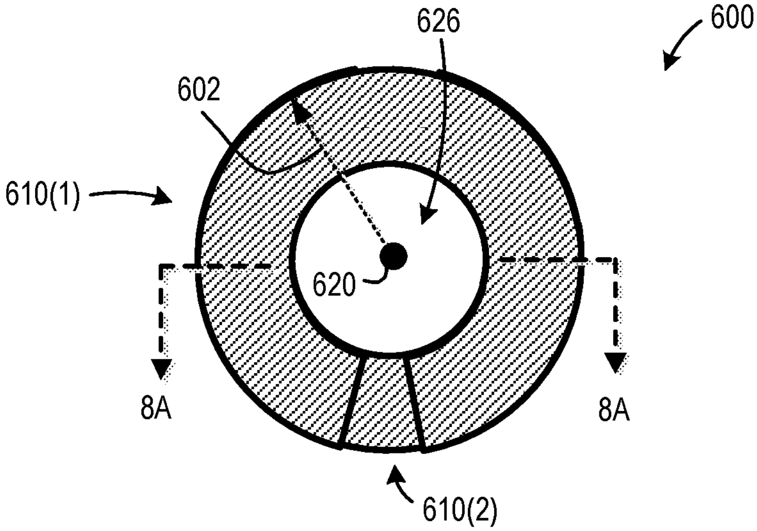
FIG. 6 is a top plan view of a resonant coil with integrated capacitance, according to an embodiment.
Figure 7:
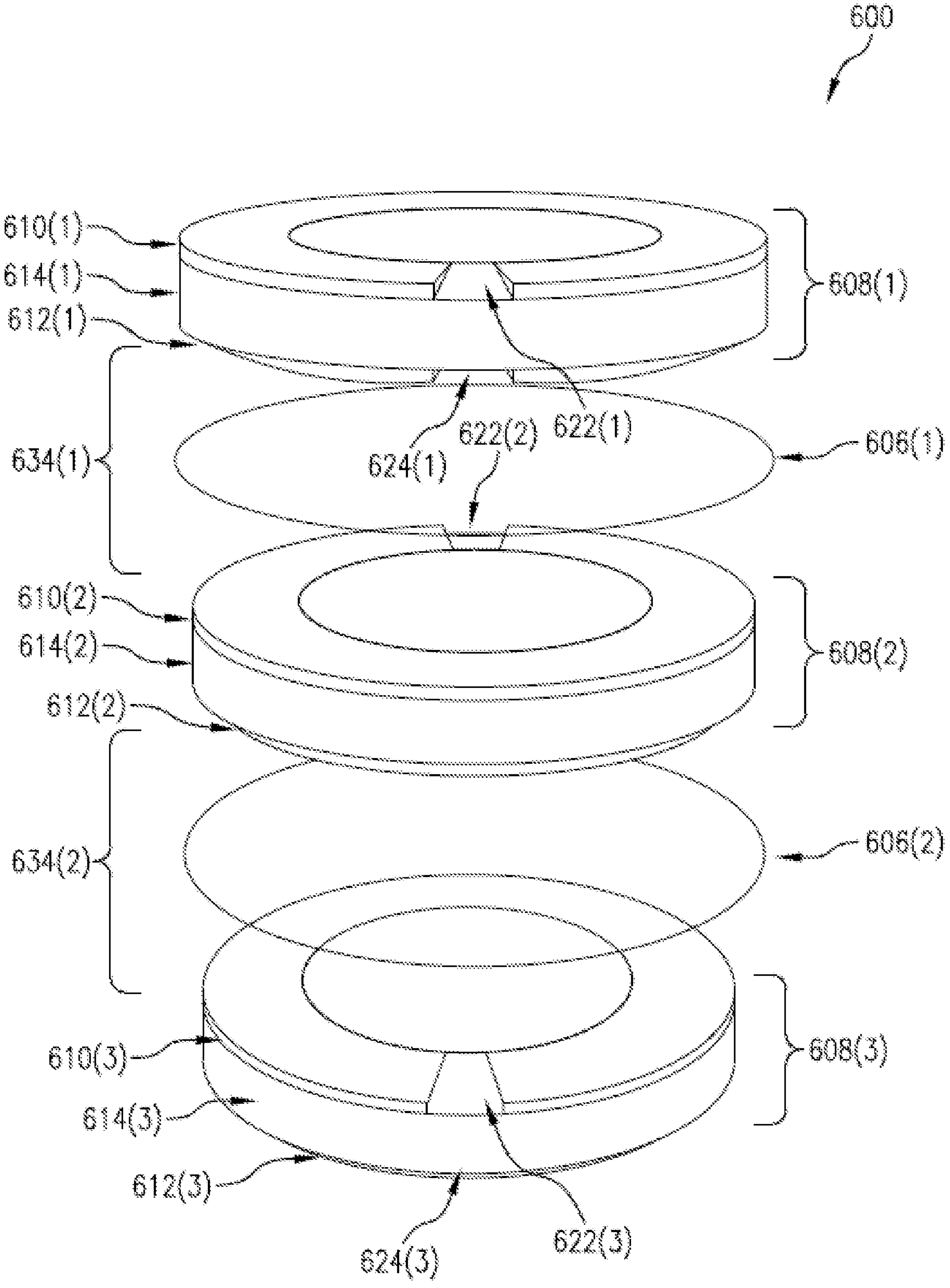
FIG. 7 is an exploded perspective view of the FIG. 6 resonant coil.
Figure 8:
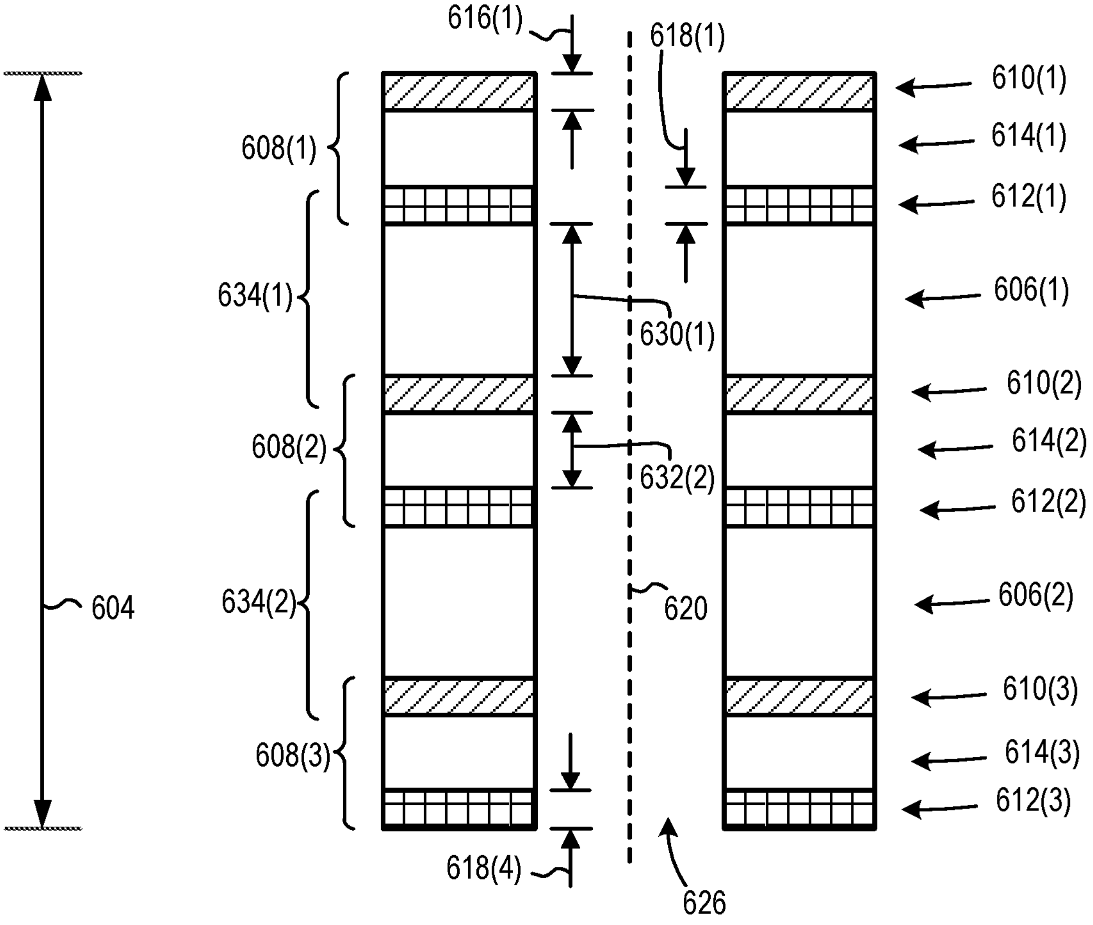
FIG. 8 is a cross-sectional view of the FIG. 6 resonant coil taken along line 8A-8A of FIG. 6.

FIG. 6 is a top plan view of a resonant coil 600 with integrated capacitance, which is one embodiment of the new resonant coils developed by Applicant. FIG. 7 is an exploded perspective view of the resonant coil, and FIG. 8 is a cross-sectional view of the resonant coil taken along line 8A-8A of FIG. 6. Resonant coil 600 has a radius 602 and a thickness 604, and resonant coil 600 includes at least one separation dielectric layer 606 and a plurality of conductor layers 608 stacked in an alternating manner in the thickness 604 direction.

Figure 9:
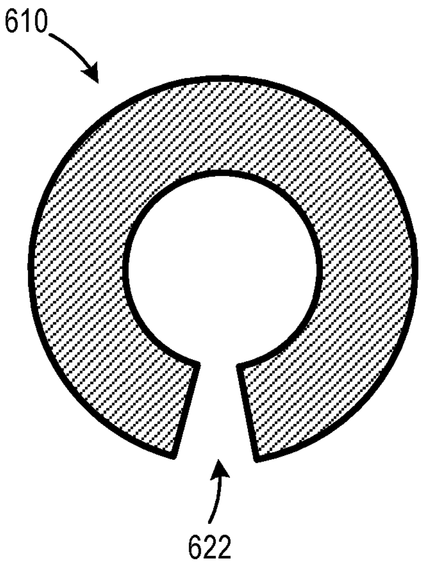
FIG. 9 is a top plan view of one first conductor sublayer instance of the FIG. 6 resonant coil.
Figure 10:
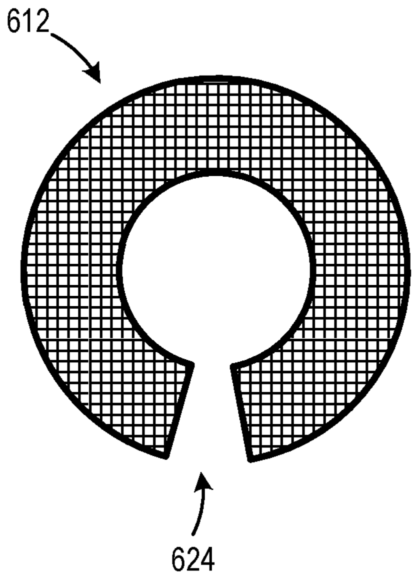
FIG. 10 is a top plan view of one second conductor sublayer instance of the FIG. 6 resonant coil.

Each conductor layer 608 includes a first conductor sublayer 610 and a second conductor sublayer 612 separated in the thickness 604 direction by a sublayer dielectric layer 614. FIG. 9 is a top plan view of one first conductor sublayer 610 instance, and FIG. 10 is a top plan view of one second conductor sublayer 612 instance. First and second conductor sublayers 610, 612 are formed, for example, of copper foil, aluminum foil, or another electrically conductive material, laminated to sublayer dielectric layer 614. It is anticipated that dielectric layers 606, 614 will typically extend slightly, such as one to five millimeters, beyond the edges of conductor sublayers 610, 612 to minimize the likelihood of arcing between the edges of adjacent conductor sublayers. Conductor sublayers 610, 612 have respective thicknesses 616, 618 (see FIG. 8) that are typically smaller than their skin depths at an intended operating frequency, thereby promoting efficient use of conductor sublayers 610, 612 and corresponding low power loss. Proximity losses increase with increasing values of thicknesses 616 and 618, while DC losses decrease with increasing values of thicknesses 616 and 618.

First and second conductor sublayers 610, 612 have at least substantially similar notched annular ring shapes. Conductor sublayers 610, 612 and dielectric layers 606, 614 are each disposed around a common center axis 620 extending in the thickness 604 direction. Each first conductor sublayer 610 forms a first discontinuity or notch 622 such that the first conductor sublayer does not completely encircle center axis 620, and each second conductor sublayer 612 forms a second discontinuity or notch 624 such that the second conductor sublayer does not completely encircle center axis 620. Importantly, within a given conductor layer 608 instance, first conductor sublayer 610 is angularly aligned with second conductor sublayer 612 with respect to center axis 620, such that notches 622, 624 of first and second conductor sublayers 610, 612, respectively, are also angularly aligned. Consequently, first and second conductor sublayers 610, 612 of a given conductor layer 608 instance are commonly aligned when resonant coil 600 is viewed cross-sectionally in the thickness 604 direction.

The common alignment of first and second conductor sublayers 610, 612 within a given conductor layer 608 instance causes there to be negligible electric field between the first and second conductor sublayers, resulting in minimal excitation of the capacitance between the conductor sublayers. As a result, dielectric loss of sublayer dielectric layer 614 does not significantly affect performance of resonant coil 600. Consequently, sublayer dielectric layer 614 can be formed of low-cost, industry standard dielectric materials having relatively high-loss, such as FR4 or polyimide, without negatively impacting performance Additionally, sublayer dielectric layer 614 can be of essentially any desired thickness without materially affecting performance, since capacitance of sublayer dielectric layer 614 is minimally excited during operation, which facilitates use of standard PCB processing techniques and materials when forming resonant coil 600, thereby further promoting low cost and ease of manufacturing. In prior art resonant coil 100 of FIG. 1, in contrast, thickness of sublayer dielectric layers 110 directly affects capacitance values, thereby constraining thickness and composition of sublayer dielectric layers 110 to those required to achieve desired electrical properties of resonant coil 100.

The plurality of conductor layers 608 in resonant coil 600 have alternating opposing orientations, where notches 622, 624 of one conductor layer 608 instance are angularly displaced from notches 622, 624 of an adjacent conductor layer 608 instance, with respect to center axis 620. In particular, first conductor layer 608(1) has a first orientation with notches 622, 624 at about zero degrees with respect to center axis 620, second conductor layer 608(2) has an opposite second orientation with notches 622, 624 at about 180 degrees with respect to center axis 620, third conductor layer 608(3) has the first orientation, and so on, as seen when resonant coil 600 is viewed cross-sectionally in the thickness 604 direction. Such alternating opposing orientation of adjacent conductor layers 608 results in an electric field between adjacent conductor layers 608, thereby achieving integrated capacitance of resonant coil 600, as discussed below with respect to FIG. 11. Adjacent conductor layers 608 may be angularly offset from each other at angles other than 180 degrees without departing from the scope hereof, as long as adjacent conductor layers 608 have different orientations.

In contrast to sublayer dielectric layers 614, separation dielectric layers 606 must be formed of a low-loss dielectric material, such as PTFE, PFA, ETFE, FEP, polypropylene, polyethylene, polystyrene, glass, or ceramic, to achieve high performance, because there is significant electric field between conductor layers 608 during operation of resonant coil 600. However, low-loss dielectric films without metal foil laminated thereto are much less expensive than low-loss dielectric films laminated with foil. For example, PTFE film is readily available at low cost, but laminating it with copper is very expensive because it is difficult to adhere copper to the PTFE. Accordingly, separation dielectric layers 606 can be formed of low-loss dielectric material at a much lower cost than sublayer dielectric layers 614.

Resonant coil 600 forms a center aperture 626, such that conductor sublayers 610, 612 are wound around the aperture and center axis 620. It is anticipated that in many embodiments, a magnetic core (not shown) will extend through aperture 626, to help direct the magnetic field produced by resonant coil 600 to where it is needed and to help prevent stray magnetic flux. Use of a magnetic core potentially also helps shape the magnetic field in the region of resonant coil 600 such that the magnetic flux above, below, and within resonant coil 600 travels approximately parallel to conductor layers 610, 612, thereby promoting even conductor current distribution and low eddy current losses in the conductors. A magnetic core can also be used to help achieve a desired reluctance in applications requiring a particular reluctance value, such as in applications where resonant coil 600 forms an inductive-capacitive resonant device. One possible material for use in a magnetic core is manganese zinc ferrite material, which has low losses at any frequency below about one megahertz, at flux densities up to about 200 millitesla. Another possible material for use in a magnetic core is nickel zinc ferrite material, which has lower losses than manganese zinc ferrite material at higher frequencies. However, use of a magnetic core is not required. Additionally, in some alternate embodiments, such as in embodiments intended for use without a core, dielectric layers 606, 614 are solid disc shaped as opposed to annular shaped, such that resonant coil 600 does not form an aperture that extends along the entirety of thickness 604.

Although resonant coil 600 is illustrated as including three conductor layers 608, resonant coil 600 could be modified to have any number of conductor layers 608 greater than one. Additionally, resonant coil 600 could be modified to have one or more incomplete conductor layers 608, such as an incomplete conductor layer including first conductor sublayer 610 and sublayer dielectric layer 614 instances, but no second conductor sublayer 612 instance. Additionally, since dielectric layers 606, 614 need only separate adjacent conductor sublayers, in some alternate embodiments, dielectric layers 606, 614 have a notched annular shape similar to those of conductor sublayers 610, 612, where the dielectric layer notch is generally aligned with the notch of an adjacent conductor sublayer 610, 612. Furthermore, although each conductor sublayer 610, 612 instance is shown as having the same thickness 616, 618, thickness could vary among conductor sublayer instances, or even within a given conductor sublayer. For example, in a particular alternate embodiment including a magnetic core, conductor sublayers 610, 612 instances near the bottom of resonant coil 600 have greater thicknesses 616, 618 than conductor sublayer 610, 612 instances near the top of resonant coil 600, to promote low DC resistive losses within conductor sublayers 610, 612 without incurring excessive eddy-current-induced losses. In particular, the magnetic core causes conductor sublayer 610, 612 instances near the bottom of resonant coil 600 to be subject to less magnetic flux than conductor sublayer 610, 612 instances near the top of resonant coil 600, such that instances near the bottom of resonant coil 600 can be relatively thick without incurring excessive eddy-current losses.

Moreover, while it is anticipated that each sublayer dielectric layer 614 instance will typically have the same thickness 632, thickness 632 could vary among sublayer dielectric layer 614 instances without departing from the scope hereof. Similarly, separation dielectric layer 606 thicknesses 630 could either be the same or vary among separation dielectric layer 606 instances. Only some instances of thicknesses 616, 618, 630, 632 are labeled in FIG. 8 to promote illustrative clarity.

Figure 11:
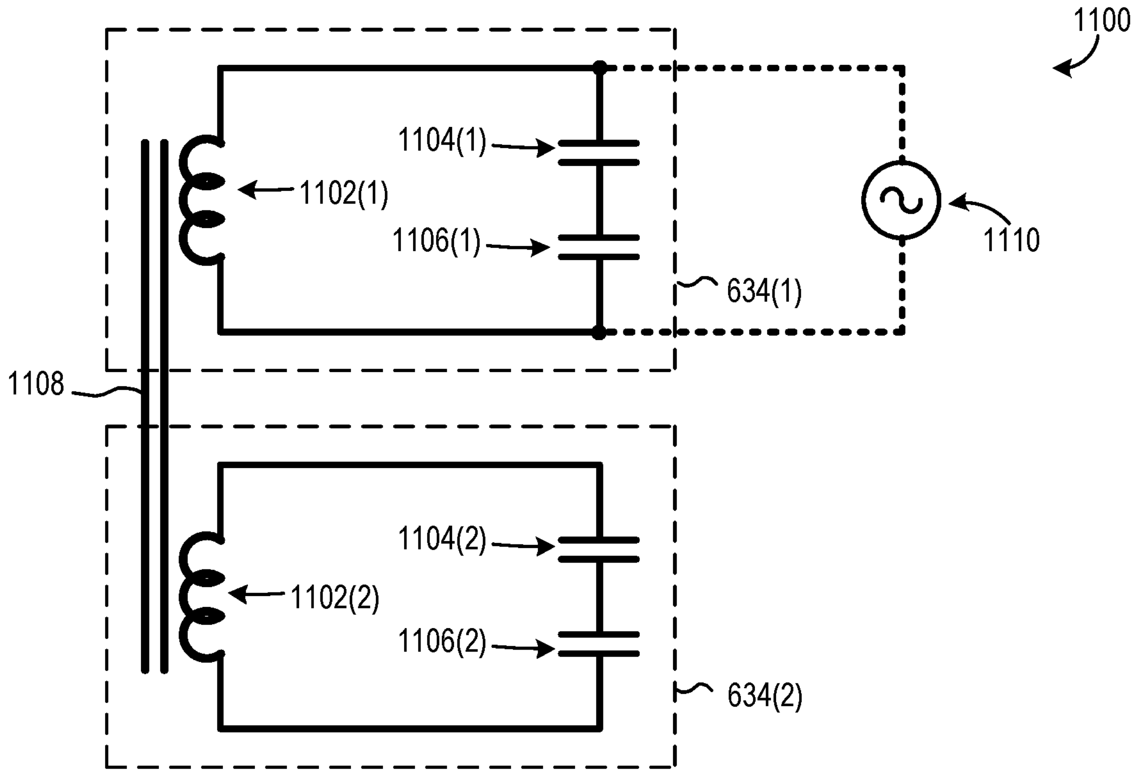
FIG. 11 is an electrical model of the FIG. 6 resonant coil.

Resonant coil 600 forms one or more sections 634, depending on the number of conductor layers 608, where each section 634 includes a respective instance of first conductor sublayer 610, second conductor sublayer 612, and separation dielectric layer 606. Accordingly, the embodiment illustrated in FIGS. 6-8 has two sections 634. FIG. 11 is an electrical model 1100 of the illustrated embodiment of resonant coil 600. As shown in FIG. 11, each section 634 includes a winding turn 1102 electrically coupled in parallel with two series-coupled capacitors 1104 and 1106. Winding turns 1102 are magnetically coupled, as symbolically represented by a core 1108. Core 1108 is a magnetic core in embodiments where resonant coil 600 includes a magnetic core. On the other hand, in embodiments where resonant coil 600 does not include a magnetic core, core 1108 represents magnetic coupling without use of a magnetic core, such that core 1108 is an "air core." Proximity losses increase with increasing number of sections 634, while DC losses increase with decreasing number of sections 634. It should be noted that first conductor sublayer 610(1) and second conductor sublayer 612(3) do not materially contribute to the electrical characteristics of resonant coil 600 since these two conductor sublayers are not part of a section 634. Additionally, capacitance between first conductor sublayer 610(1) and second conductor sublayer 612(1), capacitance between first conductor sublayer 610(2) and second conductor sublayer 612(2), and capacitance between first conductor sublayer 610(3) and second conductor sublayer 612(3) are not shown in FIG. 11 because such capacitance is not materially excited and therefore does not significantly affect electrical characteristics of resonant coil 600.

Figure 12:
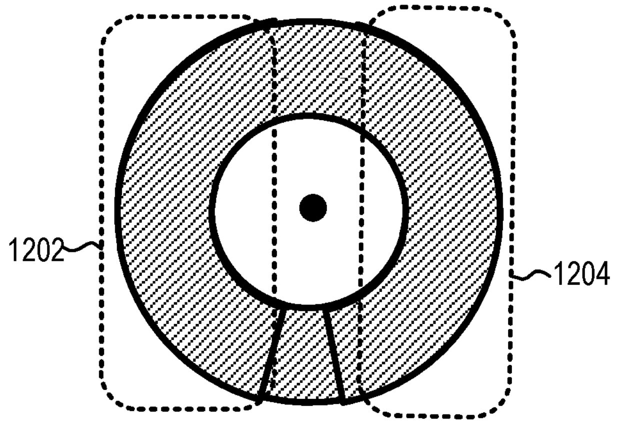
FIG. 12 is a top plan view of the FIG. 6 resonant coil with left and right portions approximately delineated by dashed lines.

FIG. 12 shows a top plan view of resonant coil 600 with left and right portions 1202, 1204 of resonant coil 600 approximately delineated by dashed lines. Left and right portions 1202, 1204 are separated by notches 622, 624 in conductor sublayers 610, 612 (see FIGS. 9 and 10). Capacitor 1104(1) represents capacitance between conductor sublayers 612(1), 610(2) in left portion 1202, and capacitor 1104(2) represents capacitance between conductor sublayers 612(2), 610(3) in left portion 1202. Similarly, capacitor 1106(1) represents capacitance between conductor sublayers 612(1), 610(2) in right portion 1204, and capacitor 1106(2) represents capacitance between conductor sublayers 612(2), 610(3) in right portion 1204. The capacitance values of capacitors 1104, 1106 can be adjusted during the design of resonant coil 600, such as to achieve a desired resonance. For example, capacitance can be increased by decreasing separation dielectric layer 606 thickness 630 and/or by increasing surface area of overlapping portions of conductor sublayers 610, 612 within sections 634, such as by adjusting widths of notches 622, 624. Assuming symmetrical construction, the capacitance value of capacitor 1104 is essentially identical to the capacitance value of capacitor 1106 in each conductor layer 608.

An AC electric power source 1110 is optionally electrically coupled to resonant coil 600 to drive the resonant coil, such that power source 1110 and resonant coil 600 collectively form a system for generating a magnetic field, or such that power source 1110 and resonant coil 600 form part of a resonant electrical circuit. AC electric power source 1110 may be electrically coupled in parallel with conductor sublayers 610, 612 of one section 634, such that electric power source 1110 is effectively electrically coupled in parallel with one winding turn 1102. For example, AC electric power source 1110 may be electrically coupled in parallel with conductor sublayers 612(1) and 610(2), such that source 1110 is effectively electrically coupled in parallel with winding turn 1102(1), as shown in FIG. 11. Although only one winding turn 1102 is directly connected to AC electric power source 1110 in the FIG. 11 example, the remaining winding turns 1102 are also effectively coupled in parallel with source 1110, due to magnetic coupling of winding turns 1102. Each winding turn 1102's capacitors 1104, 1106, for example, collectively serve as a resonant capacitor electrically coupled in parallel with the winding turn.

While FIG. 11 shows AC electric power source 1110 electrically coupled in parallel with winding turn 1102(1), electric power source 1110 could alternately be electrically coupled to one or more different conductor sublayers 610, 612. Furthermore, AC electrical power source 1110 could be configured to indirectly drive resonant coil 600, such as via another winding that is separate from, but magnetically coupled to, resonant coil 600. For example, in certain embodiments, resonant coil 600 includes a magnetic core (not shown), and AC electrical power source 1110 is electrically coupled to an additional winding wound around center axis 620 and disposed in thickness 604 direction between a last section 634 and the magnetic core, such that the additional winding is largely outside of the magnetic flux path of resonant coil 600. Such relative isolation of the additional winding from the magnetic flux path enables the additional winding to be formed of relatively thick metal to promote low DC resistive losses, without incurring excessive eddy-current-induced losses.

Figure 13:
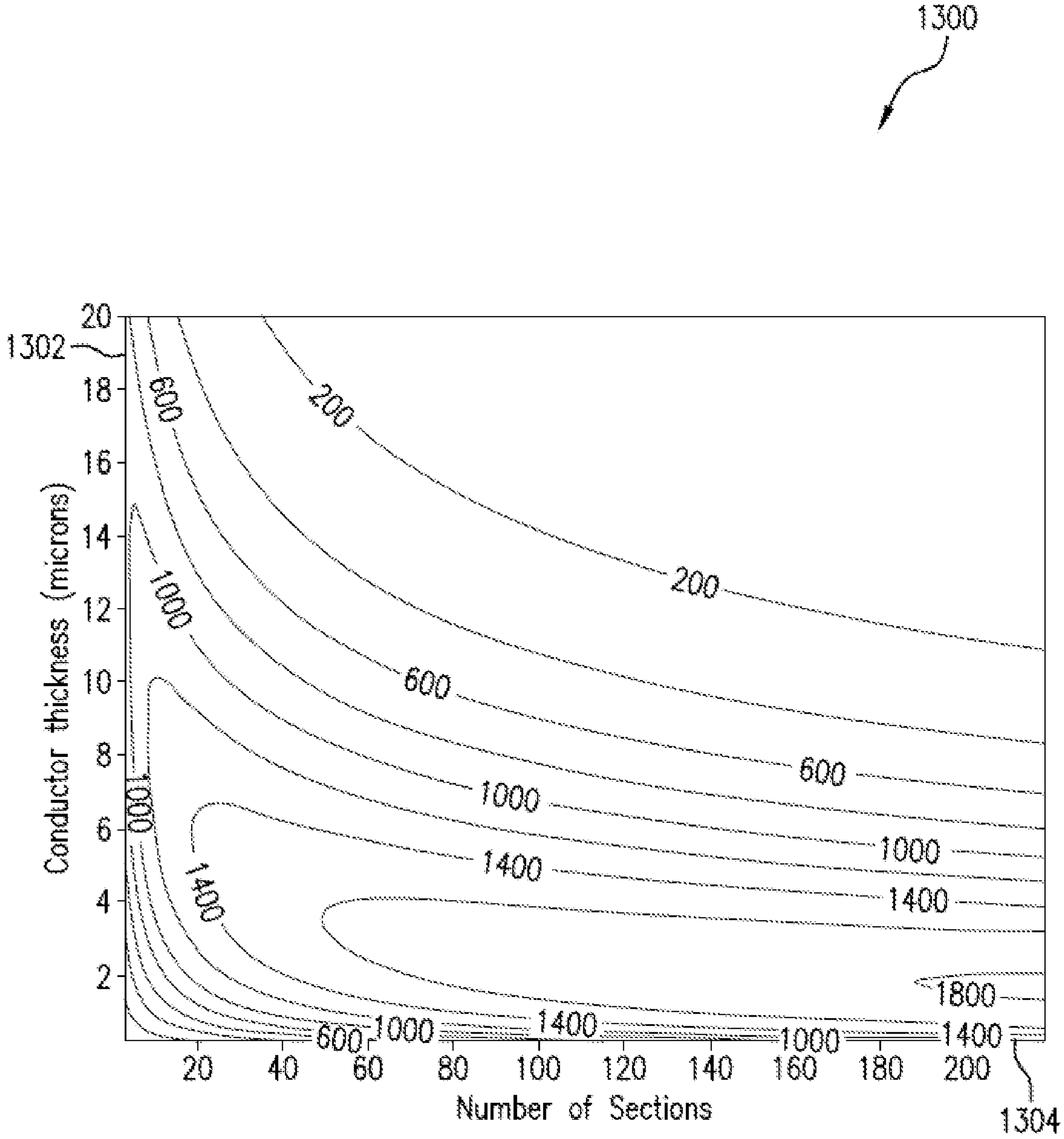
FIG. 13 shows a graph of theoretical values of quality factor at 7 MHz for one embodiment of the FIG. 6 resonant coil as a function of number of sections and as a function of thicknesses of first and second conductor sublayers.

It may be desirable for resonant coil 600 to have a high quality factor in certain applications, such as in wireless power transfer applications, as discussed below. Certain embodiments of resonant coil 600 advantageously achieve a significantly higher quality factor than conventional resonant coils of similar size. For example, FIG. 13 shows a graph 1300 of theoretical values of quality factor at 7 MHz for one embodiment of resonant coil 600 as a function of number of sections 634 and thicknesses 616 and 618 of first and second conductor sublayers 610, 612, respectively. The vertical axis 1302 of graph 1300 corresponds to thicknesses 616 and 618 of first and second conductor sublayers 610, 612, respectively, and the horizontal axis 1304 of graph 1300 corresponds to number of sections 634. The numbers on the curves in graph 1300 correspond to quality factor at 7 MHz. As evident from FIG. 13, values of quality factor higher than 1,000 are theoretically achievable in certain embodiments of resonant coil 600.

Possible applications of resonant coil 600 include, but are not limited to, use as a resonant coil in a power converter and use as a resonant coil in a wireless power transfer system. The high quality factor values achievable by certain embodiments of resonant coil 600 may be particularly beneficial in wireless power transfer applications because high quality factor promotes high efficiency in such applications. In particular, theoretical maximum efficiency $n_{max}$ in a wireless power transfer application is given by EQN. 1 below, where $Q_1$ is the quality factor of the sending resonant coil, $Q_2$ is the quality factor of the receiving resonant coil, and k is the coupling coefficient of the sending and receiving resonant coils. As evident from EQN. 1, increasing values of $Q_1$ and/or $Q_2$ increases maximum efficiency $n_{max}$.

$$n_{max} = \frac{\left(\sqrt{Q_1 Q_2}\,k\right)^2}{\left(1 + \sqrt{1 + \left(\sqrt{Q_1 Q_2}\,k\right)^2}\right)^2} \quad \text{EQN. 1}$$

Figure 14:
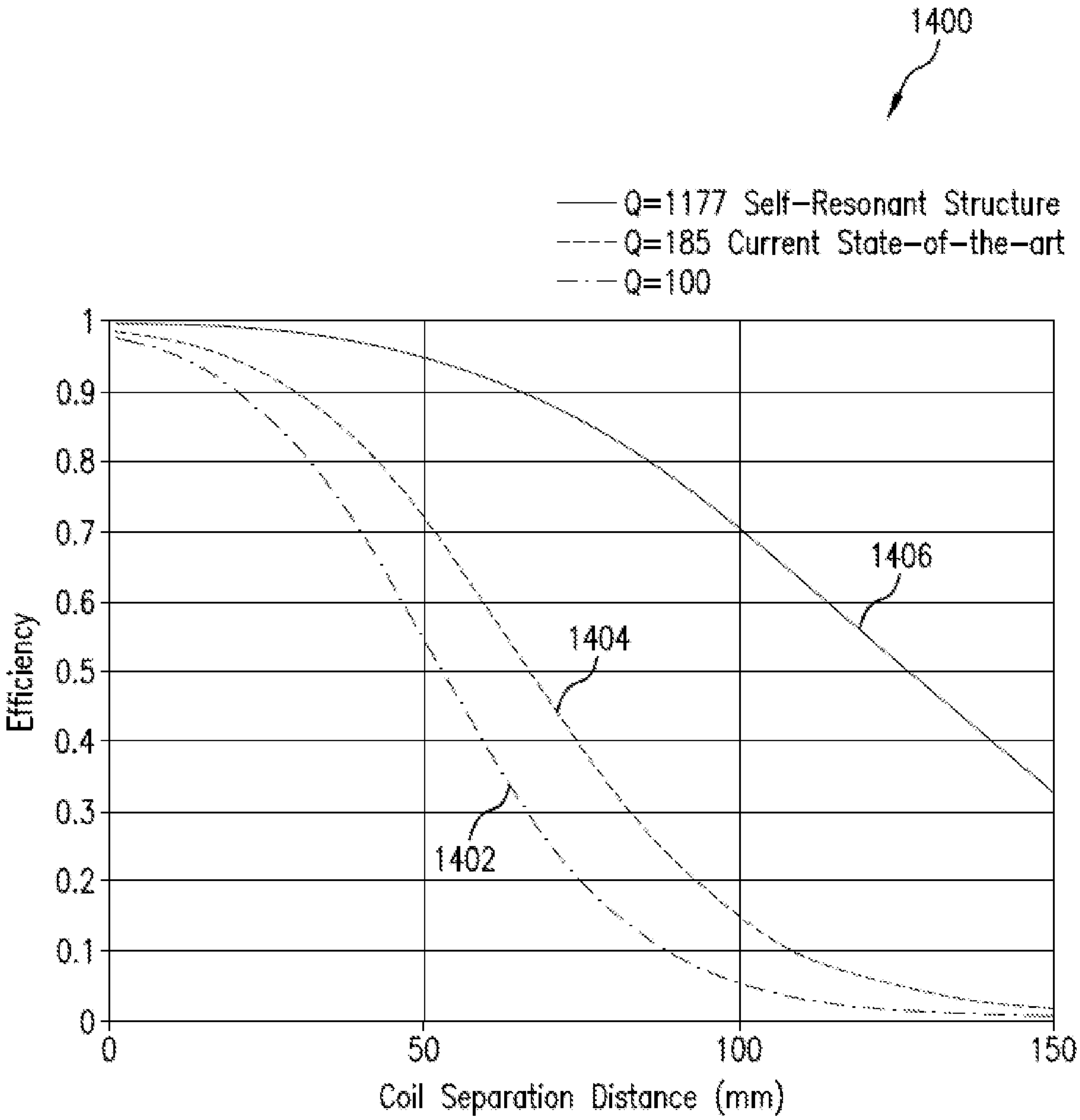
FIG. 14 shows a graph of theoretical wireless power transfer efficiency as a function of coil separation distance for three different resonant coil types.

FIG. 14 shows a graph 1400 of theoretical wireless power transfer efficiency as a function of coil separation distance for three different resonant coil types, where coil separation distance is a distance between a sending resonant coil and a receiving resonant coil. Curve 1402 corresponds to the sending and receiving resonant coils each being conventional resonant coil having a quality of factor of 100, and curve 1404 corresponds to the sending and receiving resonant coils each being conventional state-of-the-art resonant coil having a quality of factor of 185. Curve 1406 corresponds to the sending and receiving resonant coils each being an embodiment of resonant coil 600 having a quality of factor 1177. As can be appreciated from graph 1400, resonant coil 600 can achieve remarkably higher efficiency in wireless power transfer applications than conventional resonant coils, especially at large separation distances.

Figure 15:
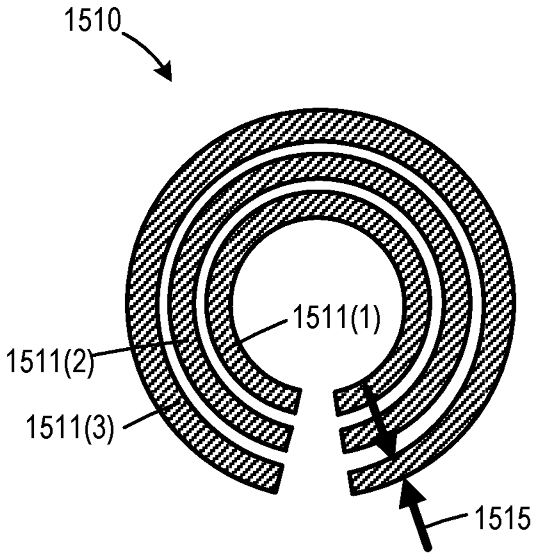
FIG. 15 is a top plan view of an alternate embodiment of the first conductor sublayer of the FIG. 6 resonant coil.
Figure 16:
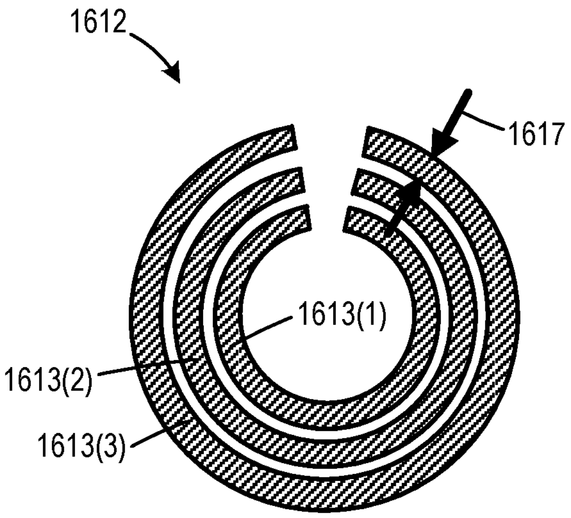
FIG. 16 is a top plan view of an alternate embodiment of the second conductor sublayer of the FIG. 6 resonant coil.

In an alternate embodiment of resonant coil 600, one or more instances of first and second conductor sublayers 610, 612 are replaced with multiple notched annular ring-shaped conductors concentrically wound around center axis 620. For instance, FIGS. 15 and 16 respectively illustrate first and second conductor sublayers 1510, 1612, which may be used in place of first and second conductor sublayers 610, 612, respectively, in resonant coil 600. First conductor sublayer 1510 includes a plurality of annular ring-shaped conductors 1511 concentrically wound around center axis 620. Similar, second conductor sublayer 1612 includes a plurality of annular ring-shaped conductors 1613 wound around center axis 620. Such division of first and second conductor sublayers 610, 612 into multiple parallel-coupled conductors promotes equal current sharing in the radial 602 direction. Each annular ring-shaped conductor 1511 has a respective width 1515 in the radial direction, and each annular ring-shaped conductor 1613 has a respective width 1617 in the radial direction. Only one instance of width 1515 is labeled in FIG. 15, and only one instance of width 1617 is labeled in FIG. 16, to promote illustrative clarity. The number of annular ring-shaped conductors 1511 and annular ring-shaped conductors 1613 may be varied without departing from the scope hereof.

Figure 52:
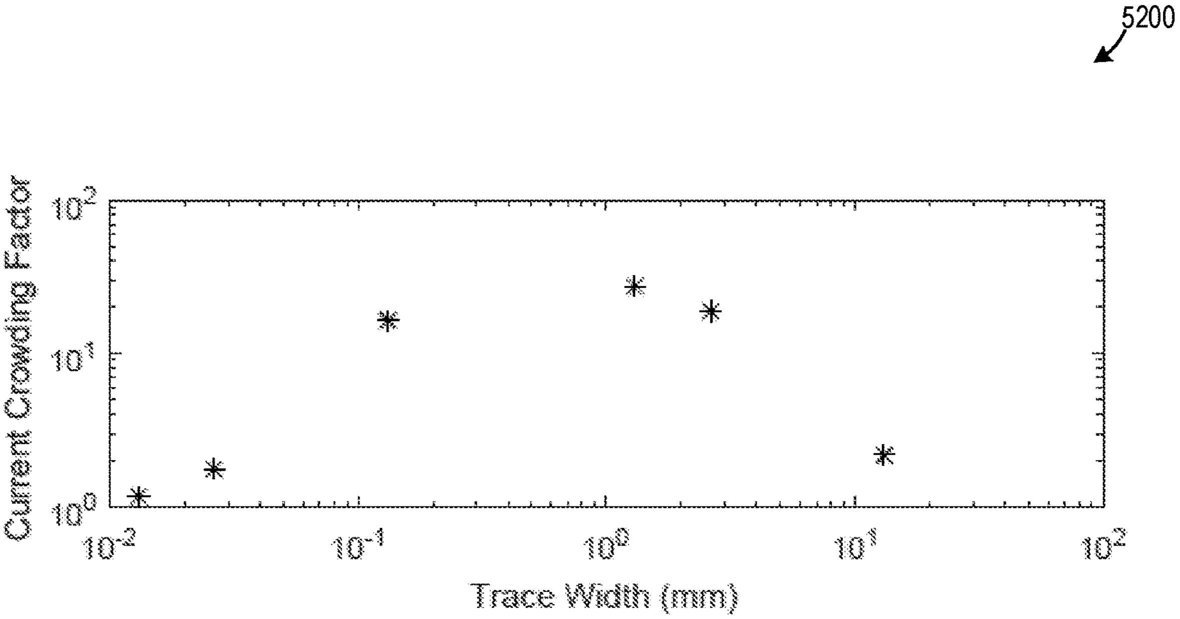
FIG. 52 is a graph of simulated current crowding factor of the FIGS. 15 and 16 conductor sublayers as a function of annular ring-shaped conductor width, according to an embodiment.
Figure 53:
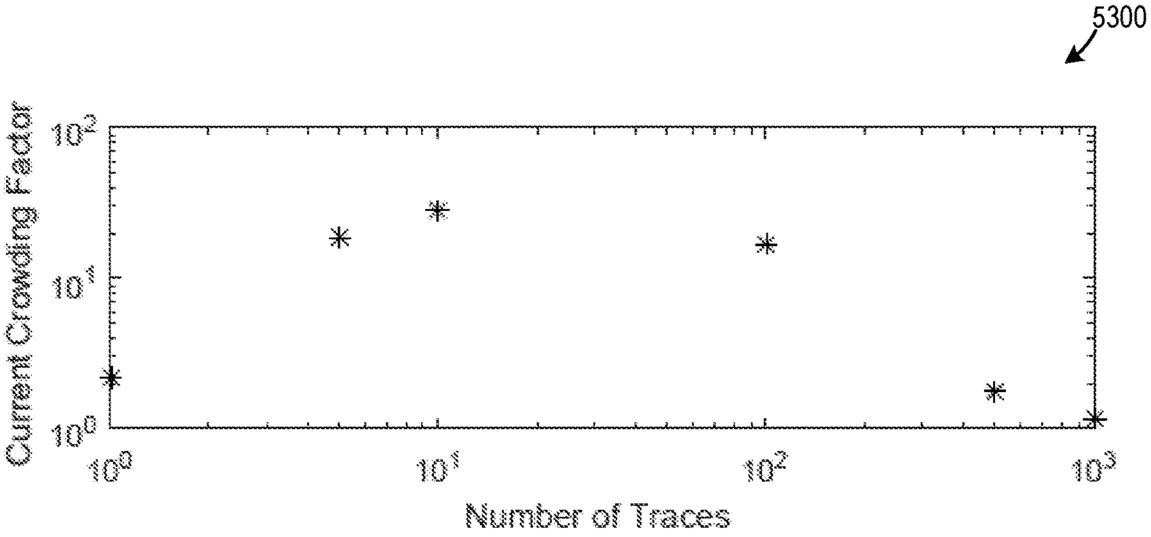
FIG. 53 is a graph of simulated current crowding factor of the FIGS. 15 and 16 conductor sublayers as a function of number of annular ring-shaped conductors, according to an embodiment.

FIG. 52 is a graph 5200 of simulated current crowding factor of conductor sublayers 1510 and 1612 as a function of widths 1515 and 1617, respectively, in a wireless power transfer application. FIG. 53 is a graph 5300 of simulated current crowding factor of conductor sublayers 1510 and 1612 as a function of number of "traces," i.e., number of first conductor sublayers 1510 and second conductor sublayers 1612, respectively, in a wireless power transfer application. Current crowding factor in graphs 5200 and 5300 is the ratio of (a) simulated AC resistance including lateral current crowding to (b) calculated AC resistance not including lateral current crowding. As evident from graphs 5200 and 5300, current crowding factor may vary significantly as a function of widths 1515 and 1617 and number of conductor sublayers 1510 and 1612. In certain embodiments, small current crowding factor is promoted by configuring conductor sublayers 1510 and 1612 such that respective widths 1515 and 1617 are small, i.e., close to their skin depths under anticipated operating conditions.

Figure 17:
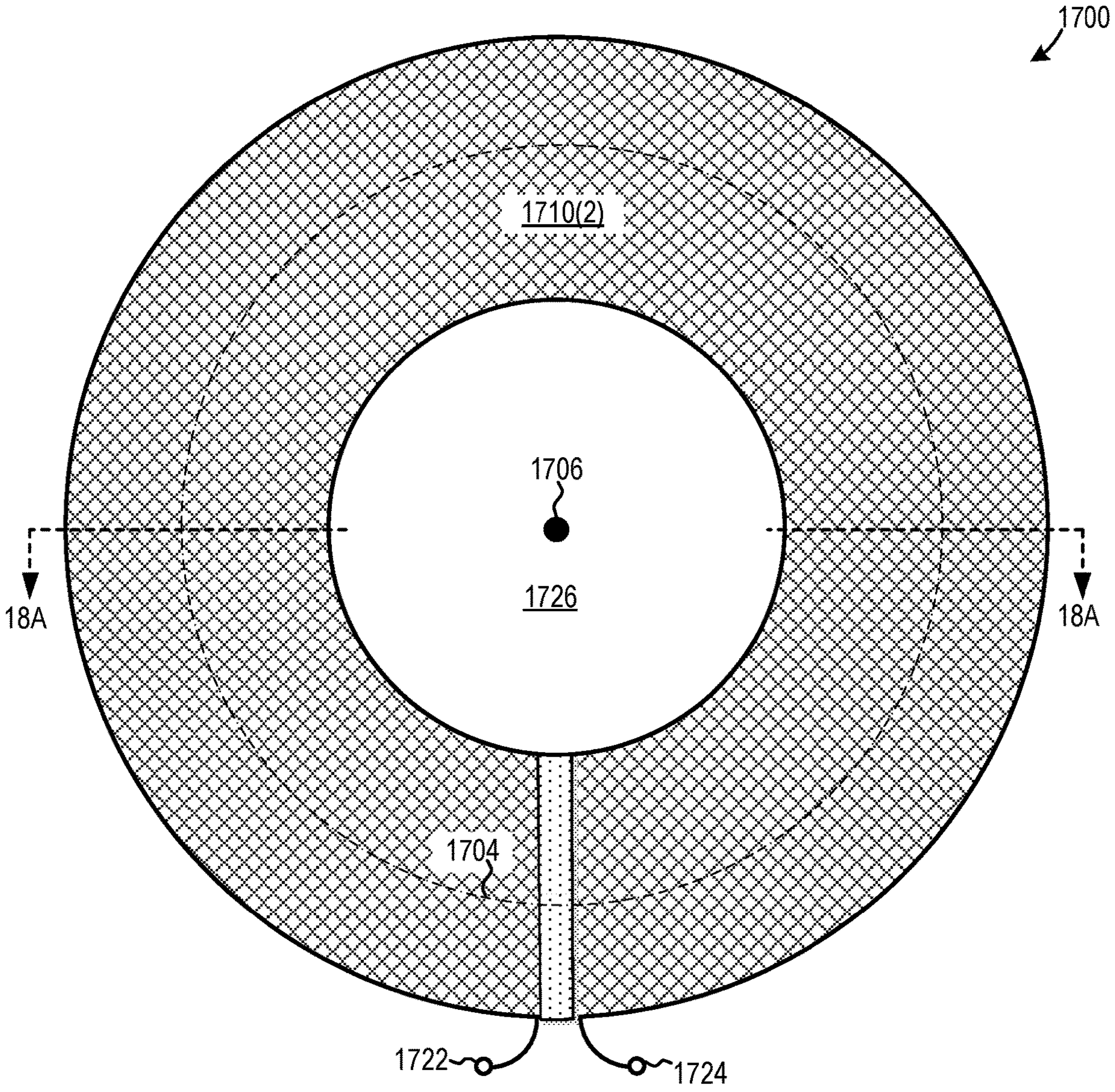
FIG. 17 is a top plan view of a resonant coil with integrated capacitance and including a plurality of concentric tubular conductor layers, according to an embodiment.
Figure 18:
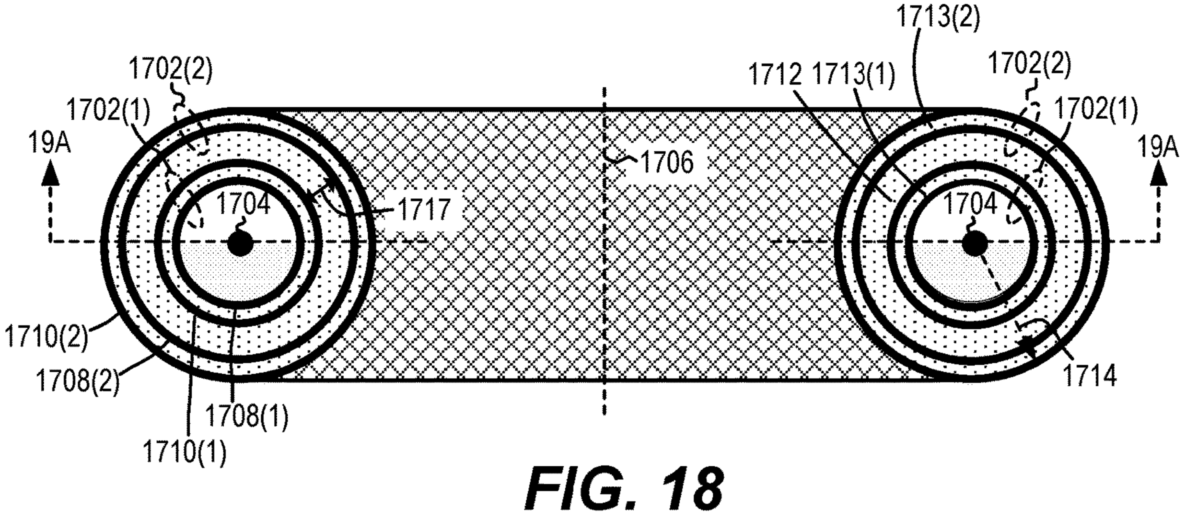
FIG. 18 is a cross-sectional view of the FIG. 17 resonant coil taken along line 18A-18A of FIG. 17.
Figure 19:
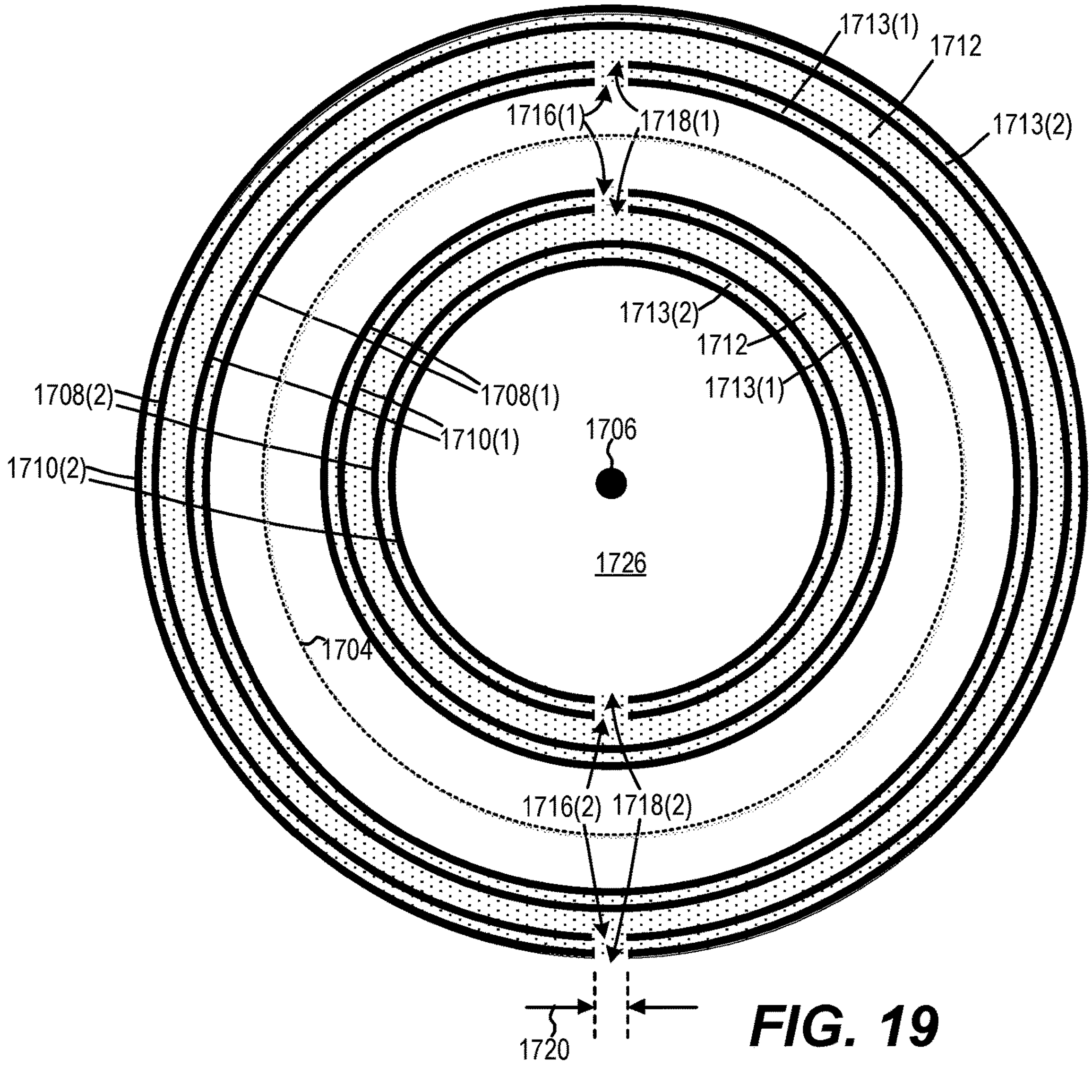
FIG. 19 is a cross-sectional view of the FIG. 17 resonant coil taken along line 19A-19A of FIG. 18.

Resonant coil 600 could be modified to have a different geometry without departing from the scope hereof, as long as conductor sublayers 610, 612 within each conductor layer 608 have a common orientation, and adjacent conductor layers 608 have different orientations. For example, first and second conductor sublayers 610, 612 could be modified to have a rectangular shape instead of a ring shape. As another example, FIG. 17 is a top plan view of a resonant coil 1700 with integrated capacitance and including a plurality of concentric tubular conductor layers. FIG. 18 is a cross-sectional view of resonant coil 1700 taken along line 18A-18A of FIG. 17, and FIG. 19 is a cross-sectional view of resonant coil 1700 taken along line 19A-19A of FIG. 18. Resonant coil 1700 includes a plurality of tubular conductor layers 1702 concentrically stacked around a common axis 1704 in a radial 1714 direction extending from common axis 1704. Although resonant coil 1700 is illustrated as including two tubular conductor layers 1702, resonant coil 1700 could include additional tubular conductor layers 1702 without departing from the scope hereof. Common axis 1704 forms a loop around a center axis 1706 of resonant coil 1700, such that resonant coil 1700 has a toroidal shape.

Each tubular conductor layer 1702 includes a first tubular conductor sublayer 1708 and a second tubular conductor sublayer 1710 concentrically stacked around common axis 1704. In some embodiments, first and second tubular conductor sublayers 1708, 1710 are formed of conductive foil or conductive film. The conductive foil or film typically has a thickness smaller than its skin depth at an intended operating frequency, thereby promoting efficient use of foil conductor sublayers 1708, 1710 and corresponding low power loss. In some embodiments, thickness of the foil or conductive film is inversely proportional to the square root of the number of tubular conductor layers 1702, such that thickness decreases as the number of tubular conductor layers increases. A separation dielectric layer 1712 separates each pair of adjacent tubular conductor layers 1702 in the radial 1714 direction. Consequentially, tubular conductor layers 1702 and separation dielectric layers 1712 are concentrically stacked in an alternating manner in the radial direction. A sublayer dielectric layer 1713 separates adjacent first and second tubular conductor sublayers 1708, 1710 in the radial 1714 direction within each tubular conductor layer 1702.

Each first tubular conductor sublayer 1708 forms a first discontinuity 1716, and each second tubular conductor sublayer 1710 forms a second discontinuity 1718, in the toroidal direction, so that conductor sublayers 1708, 1710 do not completely encircle center axis 1706, as illustrated in FIG. 19. Within each tubular conductor layer 1702 instance, first and second discontinuities 1716, 1718 are angularly aligned with respect to center axis 1706, such that first and second tubular conductor sublayers 1708, 1710 have a common alignment. Consequently, there is minimal electric field to excite capacitance between first and second tubular conductor sublayers 1708, 1710 within a given tubular conductor layer 1702. Therefore, sublayer dielectric layer 1713 can be formed of low-cost, industry standard dielectric materials having relatively high-loss, such as FR4 or polyimide, without negatively impacting performance Additionally, thickness of sublayer dielectric layer 1713 can be varied during the design of resonant coil 1700 without materially affecting electrical properties of the coil.

Tubular conductor layers 1702 having alternating opposing orientations, to excite capacitance between adjacent tubular conductor layers 1702 and thereby achieve integrated capacitance of resonant coil 1700. In particular, first tubular conductor layer 1702(1) has a first orientation with discontinuities 1716(1), 1718(1) at about zero degrees with respect to center axis 1706, and second tubular conductor layer 1702(2) has an opposite second orientation with discontinuities 1716(2), 1718(2) at about 180 degrees with respect to center axis 1706. A third tubular conductor layer 1702 (not shown) would have the first orientation, a fourth tubular conductor layer 1702 (not shown) would have the second orientation, and so on. Adjacent tubular conductor layers 1702 may be angularly offset from each other at angles other than 180 degrees without departing from the scope hereof, as long as adjacent tubular conductor layers 1702 have different orientations. Separation dielectric layers 1712 must be formed of a low-loss dielectric material, such as PTFE, PFA, ETFE, FEP, polypropylene, polyethylene, polystyrene, glass, or ceramic, to achieve high performance, because there is significant electric field between conductor tubular layers 1702 during operation of resonant coil 1700.

Capacitance of resonant coil 1700 is proportional to the area of overlap of adjacent tubular conductor layers 1702. Accordingly, capacitance values can be adjusted during the design of resonant coil 1700 by varying the respective widths 1720 of first and second discontinuities 1716, 1718 in the toroidal direction. (See FIG. 19). For instance, if smaller capacitance values are desired, widths 1720 of first and second discontinuities 1716, 1718 can be made larger. Although it is anticipated that each first and second discontinuity 1716, 1718 will have the same width 1720, it is possible for discontinuity width 1720 to vary among tubular conductor layer 1702 instances without departing from the scope hereof. Capacitance is also inversely proportional to radial separation 1717 of adjacent tubular conductor layers 1702 (see FIG. 18), and capacitance can therefore be adjusted during resonant coil 1700's design by varying radial separation distance 1717.

In the embodiment of FIGS. 17-19, common axis 1704 forms a circle around center axis 1706 such that common axis 1704 forms a closed loop, as illustrated in FIGS. 17 and 19, and each tubular conductor sublayer 1708, 1710 has a circular cross-section perpendicular to common axis 1704, such that resonant coil 1700 has a toroidal shape. However, the shape of the loop formed by common axis 1704 and/or the cross-sectional shape of tubular conductor sublayers 1708, 1710 could be varied without departing from the scope hereof. For example, in one alternate embodiment, common axis 1704 forms a non-planar closed loop.

The fact that first and second tubular conductor sublayers 1708, 1710 do not completely encircle center axis 1706 causes current to flow through resonant coil 1700 in the direction of common axis 1704, or in other words, causes current to flow in the toroidal direction. Resonant coil 1700 optionally includes electrical terminals 1722, 1724 electrically coupled to opposing ends of second tubular conductor sublayer 1710(2), as illustrated in FIG. 17, to provide electrical access to resonant coil 1700. A magnetic field generated by current flowing through second tubular conductor sublayer 1710(2) induces current through the remaining first and second tubular conductor sublayers 1708, 1710, and it therefore may be unnecessary to couple the other tubular conductor sublayers to electrical terminals. However, alternate or additional tubular conductor sublayers could be electrically coupled to electrical terminals 1722, 1724 without departing from the scope hereof.

A magnetic core (not shown) is optionally disposed partially or completely around resonant coil 1700 to achieve a desired reluctance and/or to help contain the magnetic field. For example, in some embodiments, a cylindrical magnetic core is disposed in center 1726 of resonant coil 1700. In applications where resonant coil 1700 forms a resonant induction coil for induction heating, it is expected that the workpiece would be disposed in center 1726 to realize maximum magnetic field strength at the workpiece location. The magnetic field also extends along center axis 1706, decreasing in magnitude with distance above resonant coil 1700. In some resonant induction coil applications, the magnetic field in the region above resonant coil 1700 is used, for example, for wireless power transfer or for magnetic hyperthermia.

Figure 20:
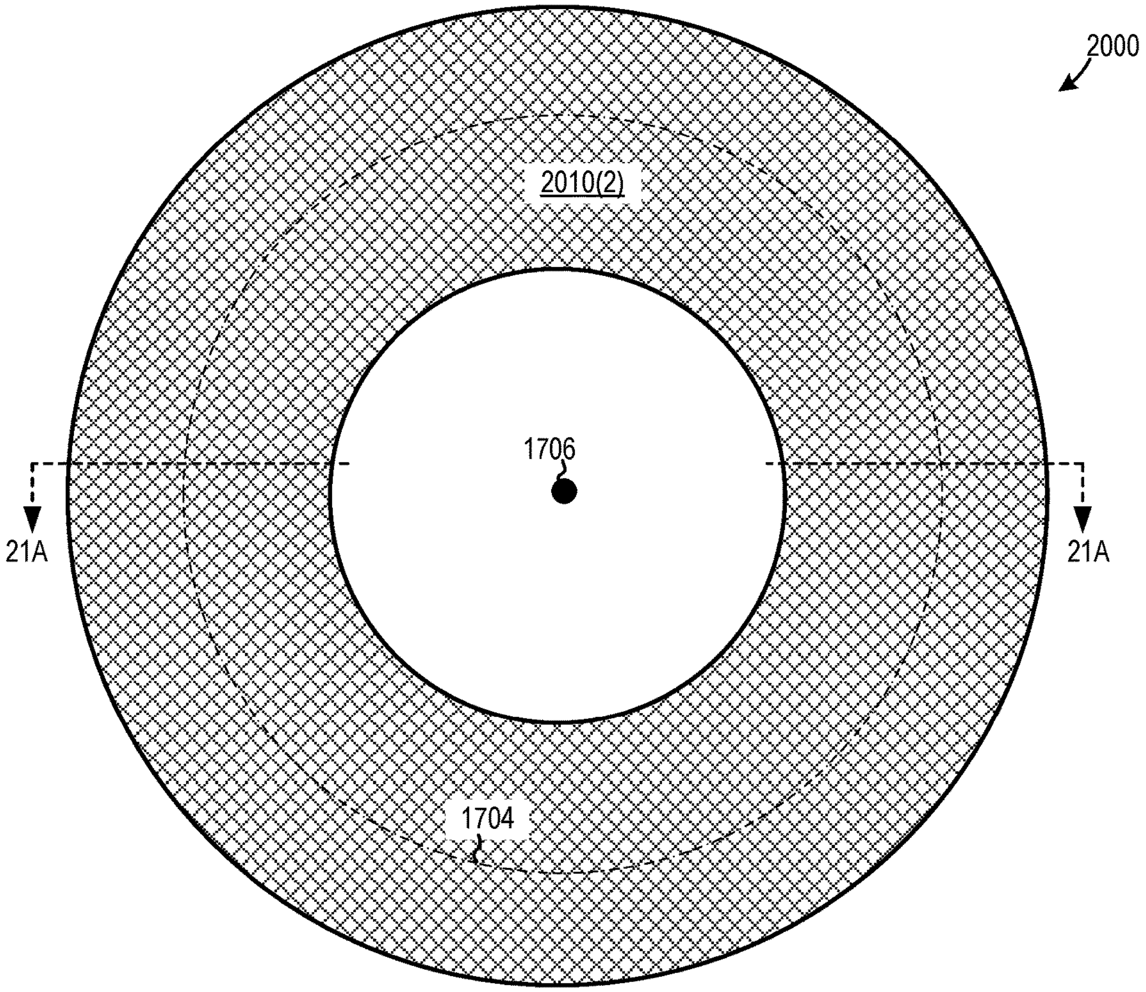
FIG. 20 is a top plan view of another resonant coil with integrated capacitance including a plurality of concentric tubular conductor layers, according to an embodiment.
Figure 21:
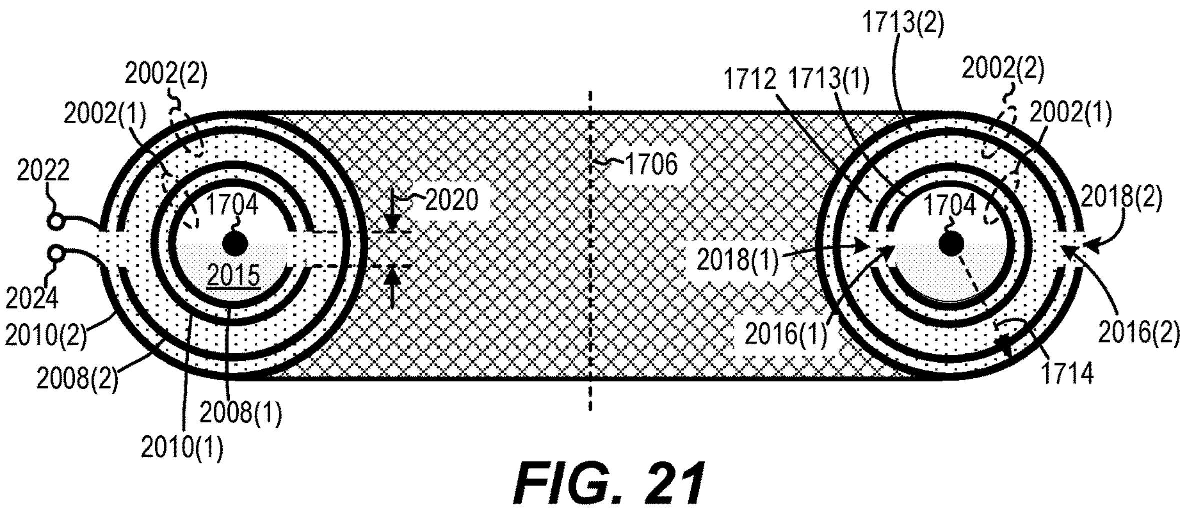
FIG. 21 is a cross-sectional view of the FIG. 20 resonant coil taken along line 21A-21A of FIG. 20.

FIG. 20 is a top plan view of a resonant coil 2000 with integrated capacitance including a plurality of concentric tubular conductor layers, and FIG. 21 is a cross-sectional view of resonant coil 2000 taken along line 21A-21A of FIG. 20. Resonant coil 2000 is similar to resonant coil 1700 of FIGS. 17-19, but with tubular conductor layers 1702 replaced with tubular conductor layers 2002. As discussed below, tubular conductor sublayer discontinuities of resonant coil 2000 are formed along poloidal axes such that each tubular conductor sublayer does not completely encircle common axis 1704, so that the current flow and magnetic field paths of resonant coil 2000 differ from those of resonant coil 1700.

Each tubular conductor layer 2002 includes a first tubular conductor sublayer 2008 and a second tubular conductor sublayer 2010 concentrically stacked around common axis 1704 in the radial 1714 direction. In some embodiments, first and second tubular conductor sublayers 2008, 2010 are formed of conductive foil or conductive film. The conductive foil or film typically has a thickness smaller than its skin depth at an intended operating frequency, thereby promoting efficient use of foil conductor sublayers 2008, 2010 and corresponding low power loss. In some embodiments, thickness of the foil or conductive film is inversely proportional to the square root of the number of tubular conductor layers 2002, such that thickness decreases as the number of tubular conductor layers increases. A separation dielectric layer 1712 separates each pair of adjacent tubular conductor layers 2002, and a sublayer dielectric layer 1713 separates first and second tubular conductor sublayers 2008, 2010 within each tubular conductor layer.

Each first tubular conductor sublayer 2008 forms a first notch or discontinuity 2016, and each second tubular conductor sublayer 2010 forms a second notch or discontinuity 2018, so that each tubular conductor sublayer 2008, 2010 does not completely encircle common axis 1704, as illustrated in FIG. 21. Within each tubular conductor layer 2002 instance, first and second discontinuities 2016, 2018 are angularly aligned with respect to common axis 1704, such that first and second tubular conductor sublayers 2008, 2010 have a common alignment. Consequently, there is minimal electric field to excite capacitance between first and second tubular conductor sublayers 2008, 2010, within a given tubular conductor layer 2002. Therefore, sublayer dielectric layer 1713 can be formed of low-cost, industry standard dielectric materials having relatively high-loss, such as FR4 or polyimide, without negatively impacting performance Additionally, thickness of sublayer dielectric layer 1713 can be selected as desired without materially affecting electrical properties of resonant coil 2000.

Tubular conductor layers 2002 have alternating opposing orientations, to excite capacitance between adjacent tubular conductor layers and thereby achieve integrated capacitance of resonant coil 2000. In particular, first tubular conductor layer 2002(1) has a first orientation with discontinuities 2016(1), 2018(1) at about zero degrees with respect to common axis 1704, and second conductor layer 2002(2) has an opposite second orientation with discontinuities 2016(2), 2018(2) at about 180 degrees with respect to common axis 1704. A third conductor layer 2002 (not shown) would have the first orientation, a fourth conductor layer 2002 (not shown) would have the second orientation, and so on. Adjacent tubular conductor layers 2002 may be angularly offset from each other at angles other than 180 degrees without departing from the scope hereof, as long as adjacent tubular conductor layers 2002 have different orientations. Separation dielectric layers 1712 must be formed of a low-loss dielectric material, such as PTFE, PFA, ETFE, FEP, polypropylene, polyethylene, polystyrene, glass, or ceramic, to achieve high performance, because there is significant electric field between conductor tubular layers 2002 during operation of resonant coil 2000.

Capacitance values can be adjusted during the design of multilayer conductor 2000 by varying the respective widths 2020 of first and second discontinuities in the poloidal direction, in a manner similar to that discussed above with respect to multilayer conductor 1700. Additionally, capacitance can be adjusted during resonant coil 2000's design by varying the radial 1714 separation of tubular conductor layers 2002, similar to as discussed above with respect to resonant coil 1700.

The fact that first and second discontinuities 2016, 2018 do not completely encircle common axis 1704 causes current to flow through resonant coil 2000 around common axis 1704, or in other words, causes current to flow in the poloidal direction. The magnetic field, in turn, is directed along common axis 1704, or in other words, in the toroidal direction, within a center portion 2015 of concentric tubular conductor layers 2002. A magnetic core (not shown) is optionally disposed within center 2015 of tubular conductor layers 2002 to achieve a desired reluctance. Resonant coil 2000 optionally includes electrical terminals 2022, 2024 electrically coupled to opposing ends of second tubular conductor sublayer 2010(2), as illustrated in FIG. 21, to provide electrical access to resonant coil 2000. A magnetic field generated by current flowing through second tubular conductor sublayer 2010(2) induces current through the remaining first and second tubular conductor sublayers 2008, 2010, and it therefore may be unnecessary to couple the other tubular conductor sublayers to electrical terminals. However, alternate or additional tubular conductor sublayers could be electrically coupled to electrical terminals without departing from the scope hereof.

Figure 22:
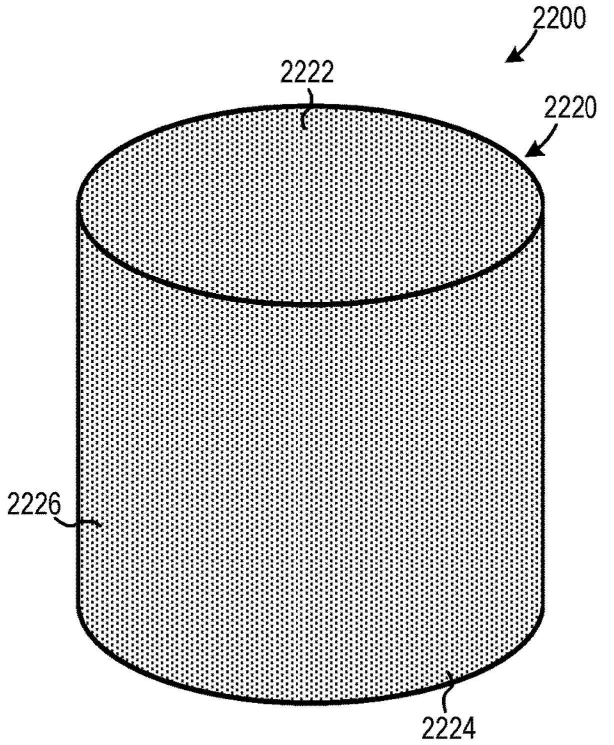
FIG. 22 is a perspective view of a magnetic device including a resonant coil with integrated capacitance, according to an embodiment.
Figure 23:
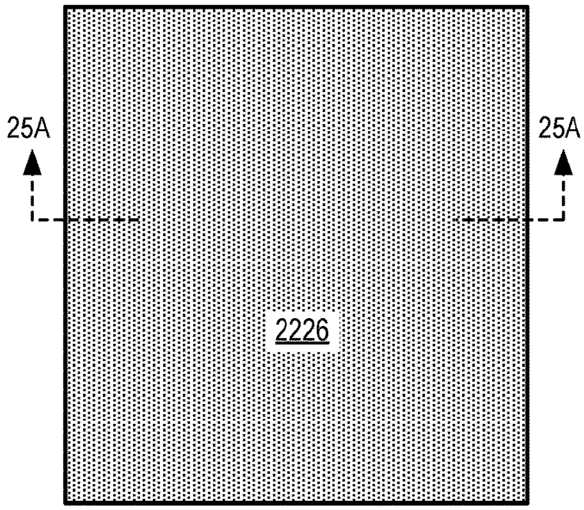
FIG. 23 is a side elevational view of the FIG. 22 magnetic device.
Figure 24:
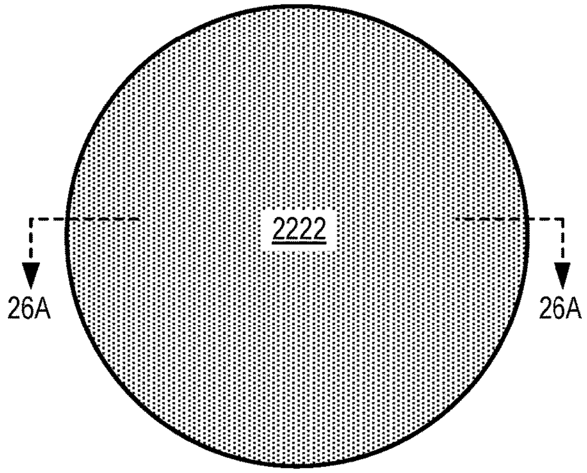
FIG. 24 is a top plan view of the FIG. 22 magnetic device.
Figure 25:
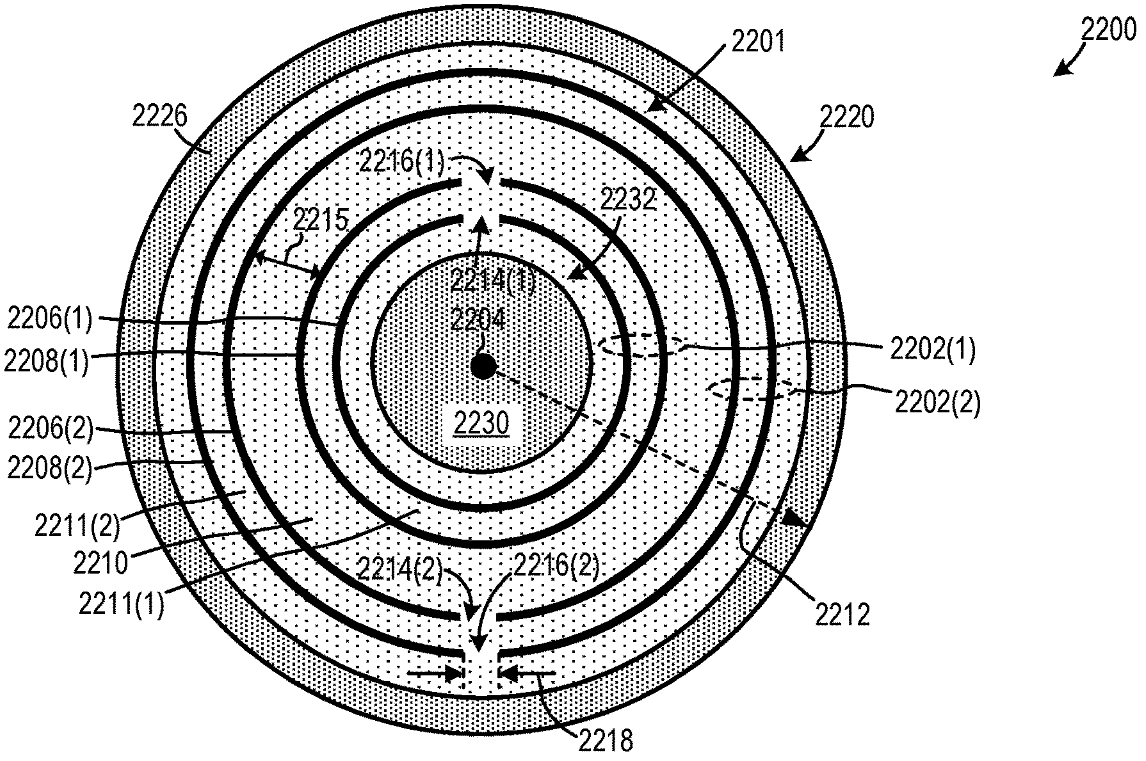
FIG. 25 is a cross-sectional view of the FIG. 22 magnetic device taken along line 25A-25A of FIG. 23.
Figure 26:
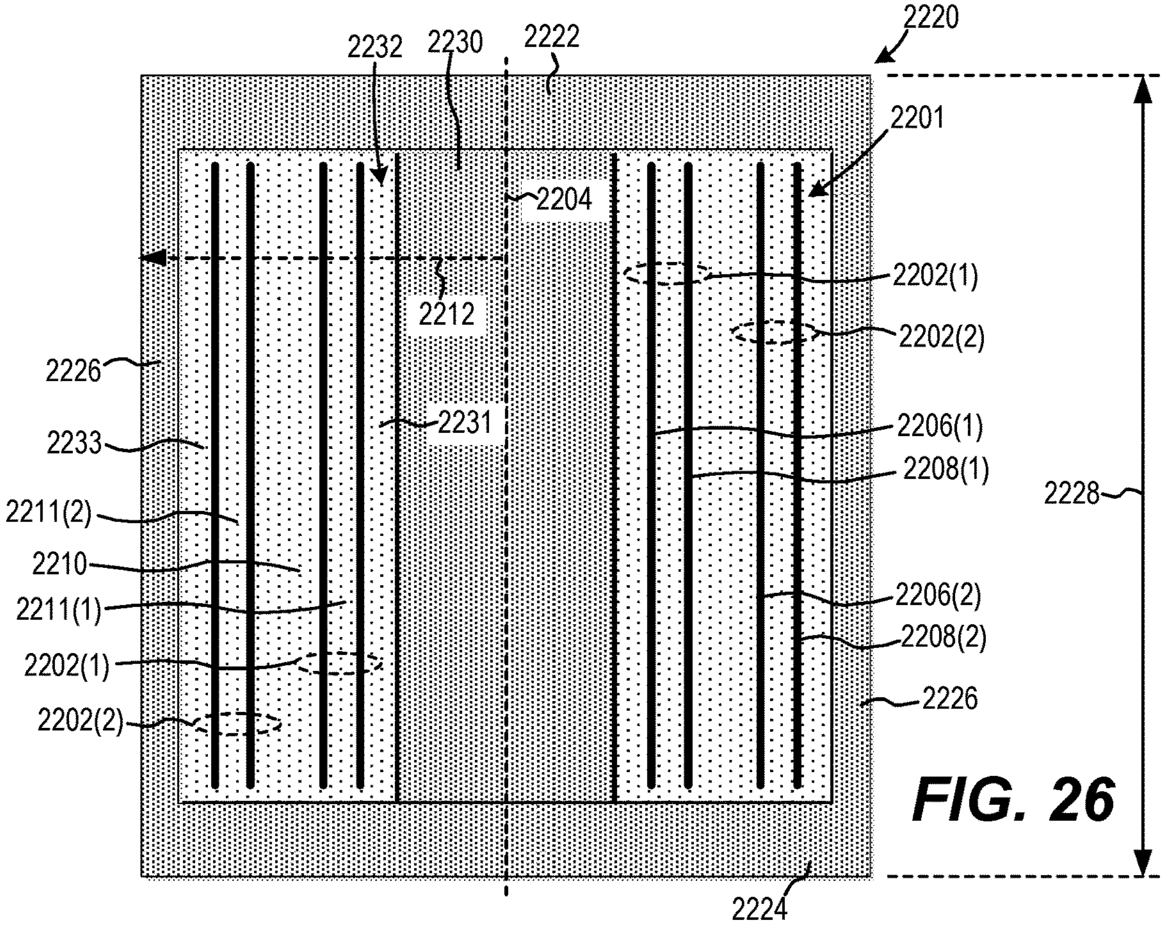
FIG. 26 is a cross-sectional view of the FIG. 22 magnetic device along line 26A-26A of FIG. 24.

FIGS. 22-26 illustrate a magnetic device 2200 including a resonant coil 2201 with integrated capacitance. FIG. 22 is a perspective view of magnetic device 2200, FIG. 23 is a side elevational view of magnetic device 2200, and FIG. 24 is a top plan view of magnetic device 2200. FIG. 25 is a cross-sectional view of magnetic device 2200 taken along line 25A-25A of FIG. 23, and FIG. 26 is a cross-sectional view of the magnetic device along line 26A-26A of FIG. 24.

Resonant coil 2201 includes a plurality of tubular conductor layers 2202 concentrically stacked around a common or center axis 2204 in a radial 2212 direction, as illustrated in FIGS. 25 and 26. Resonant coil 2201 has a cylindrical shape as seen when viewed cross-sectionally along center axis 2204. Although resonant coil 2201 is illustrated as including two tubular conductor layers 2202, resonant coil 2201 could include additional tubular conductor layers 2202 without departing from the scope hereof. Each tubular conductor layer 2202 includes a first tubular conductor sublayer 2206 and a second tubular conductor sublayer 2208 concentrically stacked in the radial 2212 direction around center axis 2204. In some embodiments, first and second tubular conductor sublayers 2206, 2208 are formed of conductive foil or conductive film. The conductive foil or film typically has a thickness smaller than its skin depth at an intended operating frequency, thereby promoting efficient use of foil conductor sublayers 2206, 2208 and corresponding low power loss. In some embodiments, thickness of the foil or conductive film is inversely proportional to the square root of the number of tubular conductor layers 2202, such that thickness decreases as the number of tubular conductor layers increases. A separation dielectric layer 2210 separates each pair of adjacent tubular conductor layers 2202 in the radial 2212 direction. Consequentially, tubular conductor layers 2202 and separation dielectric layers 2210 are concentrically stacked around center axis 2204. A sublayer dielectric layer 2211 separates adjacent first and second tubular conductor sublayers 2206, 2208 in the radial 2212 direction within each tubular conductor layer.

Each first tubular conductor sublayer 2206 forms a first notch or discontinuity 2214, such that the first tubular conductor sublayer does not completely encircle center axis 2204, as illustrated in FIG. 25. Similarly, each second tubular conductor sublayer 2208 forms a second notch or discontinuity 2216, such that the second tubular conductor sublayer does not completely encircle center axis 2204, as also illustrated in FIG. 25. Although discontinuities 2214 and 2216 are illustrated as being filled with air, discontinuities 2214 and 2216 could be filled with another material, such as material forming sublayer dielectric layers 2211 or material forming separation dielectric layers 2210, without departing from the scope hereof. Within each tubular conductor layer 2202 instance, first and second discontinuities 2214, 2216 are angularly aligned with respect to center axis 2204, such that first and second tubular conductor sublayers 2206, 2208 have a common alignment. Consequently, there is minimal electric field to excite capacitance between first and second tubular conductor sublayers 2206, 2208, within a given tubular conductor layer 2202. Therefore, sublayer dielectric layer 2211 can be formed of low-cost, industry standard dielectric materials having relatively high-loss, such as FR4 or polyimide, without negatively impacting performance Additionally, thickness of sublayer dielectric layer 2211 can be selected as desired without materially affecting electrical properties of resonant coil 2201.

Tubular conductor layers 2202 have alternating opposing orientations, to excite capacitance between adjacent tubular conductor layers and thereby achieve integrated capacitance of resonant coil 2200. In particular, first tubular conductor layer 2202(1) has a first orientation with discontinuities 2214(1), 2216(1) at about zero degrees with respect to center axis 2204, and second conductor layer 2202(2) has an opposite second orientation with discontinuities 2214(2), 2216(2) at about 180 degrees with respect to center axis 2204. A third tubular conductor layer 2202 (not shown) would have the first orientation, a fourth tubular conductor layer 2202 (not shown) would have the second orientation, and so on. Adjacent tubular conductor layers 2202 may be angularly offset from each other at angles other than 180 degrees without departing from the scope hereof, as long as adjacent tubular conductor layers 2202 have different orientations. Separation dielectric layers 2210 must be formed of a low-loss dielectric material, such as PTFE, PFA, ETFE, FEP, polypropylene, polyethylene, polystyrene, glass, or ceramic, to achieve high performance, because there is significant electric field between conductor tubular layers 2202 during operation of resonant coil 2201.

Capacitance values can be adjusted during the design of resonant coil 2201 by varying the respective widths 2218 of first and second discontinuities 2214, 2216, in a manner similar to that discussed above with respect to resonant coil 1700. Additionally, capacitance can be adjusted during resonant coil's 2201 design by varying radial 2212 separation distance 2215 of the tubular conductor sublayers, similar to as discussed above with respect to resonant coil 1700.

Although not required, magnetic device 2200 typically includes a magnetic core 2220 enclosing tubular conductor layers 2202 to help achieve desired reluctance, to help contain a magnetic field generated by current flowing through tubular conductor layers 2202, and/or to influence the shape of the magnetic field lines in the region of tubular conductor layers 2202 to be substantially parallel to the layers. For example, in some embodiments, magnetic core 2220 has a hollow cylindrical shape and is centered with respect to center axis 2204, as illustrated in FIGS. 25 and 26. In these embodiments, magnetic core 2220 includes a first end magnetic element 2222, a second end magnetic element 2224, and an outer ring 2226. First end magnetic element 2222 opposes second end magnetic element 2224 in a thickness 2228 direction parallel to center axis 2204. Outer ring 2226 is centered with respect to center axis 2204, and outer ring 2226 also joins first and second end magnetic elements 2222, 2224 in the thickness 2228 direction. Accordingly, resonant coil 2201 is disposed between first and second end magnetic elements 2222, 2224 and within outer ring 2226.

A magnetic center post 2230 is disposed in a center 2232 of tubular conductor layers 2202 along center axis 2204. Magnetic center post 2230 at least partially joins first and second end magnetic elements 2222, 2224 in the thickness 2228 direction. Magnetic flux generated by current flowing through tubular conductor layers 2202 flows in a loop through magnetic center post 2230, first end magnetic element 2222, outer ring 2226, and second end magnetic element 2224. Although not required, additional dielectric material 2231, 2233 typically separates tubular conductor layers 2202 from magnetic center post 2230 and outer ring 2226, respectively. Although FIG. 26 delineates magnetic center post 2230 from first end magnetic element 2222 and second end magnetic element 2224 to help the viewer distinguish the magnetic center post from the end magnetic elements, the magnetic center post could be joined with one or more of the end magnetic elements without departing from the scope hereof. Additionally, although outer ring 2226 and end magnetic elements 2222, 2224 are illustrated as being part of a single-piece magnetic core, magnetic core 2220 could be formed from two or more magnetic pieces that are joined together.

Magnetic center post 2230 could have the same composition as magnetic core 2220 to simplify construction. Alternately, magnetic center post 2230 could have a different composition from magnetic core 2220, such as to help achieve a desired reluctance. For example, in some embodiments, magnetic core 2220 is formed of a high permeability ferrite material, and magnetic center post 2230 is formed of a lower permeability material including magnetic materials disposed in a non-magnetic binder, such that the magnetic center post has a distributed non-magnetic "gap." In these embodiments, a desired reluctance is achieved, for example, by adjusting the ratio of magnetic material and non-magnetic binder forming magnetic center post 2230.

Magnetic center post 2230 could also form a discrete gap (not shown) filled with non-magnetic material, or with material having a lower magnetic permeability than the remainder of the magnetic center post, to help achieve a desired reluctance. However, a single gap may cause magnetic field lines, which generally flow in the thickness 2228 direction through magnetic center post 2230, to curve in the vicinity of the gap, such that the magnetic field lines induce eddy current losses in tubular conductor layers 2202. Such eddy-current losses can be reduced by forming a quasi-distributed gap from multiple small gaps (not shown), instead of a single large gap, in magnetic center post 2230. Additionally, magnetic center post 2230 could even be completely omitted.

In an alternate embodiment of device 2200, first and second end magnetic elements 2222, 2224 are each formed of a high permeability magnetic material, and outer ring 2226 and magnetic center post 2230 are each formed of a low permeability magnetic material. The low permeability magnetic material in this embodiment includes, for example, a low permeability homogenous magnetic material, a low permeability composite magnetic material, a high permeability magnetic material including multiple gaps forming a quasi-distributed gap, or air.

Device 2200 optionally includes electrical terminals (not shown) electrically coupled to opposing ends of one or more tubular conductor sublayers 2206, 2208, to provide electrical access to resonant coil 2201. A magnetic field generated by current flowing through one tubular conductor sublayer 2206 or 2208 induces current through the remaining first and second tubular conductor sublayers 2206, 2208. Therefore, it may be unnecessary to couple all other tubular conductor sublayers to electrical terminals.

Although magnetic device 2200 is shown as being cylindrical, it could alternately have a different shape without departing from the scope hereof. For example, tubular conductor layers 2202 could alternately have an oval or rectangular cross-section, instead of a circular cross-section, as seen when viewed cross-sectionally along line 25A-25A of FIG. 23. Additionally, although magnetic center post 2230 is illustrated as having a cylindrical shape, it could also have a different shape without departing from the scope hereof.

Figure 27:
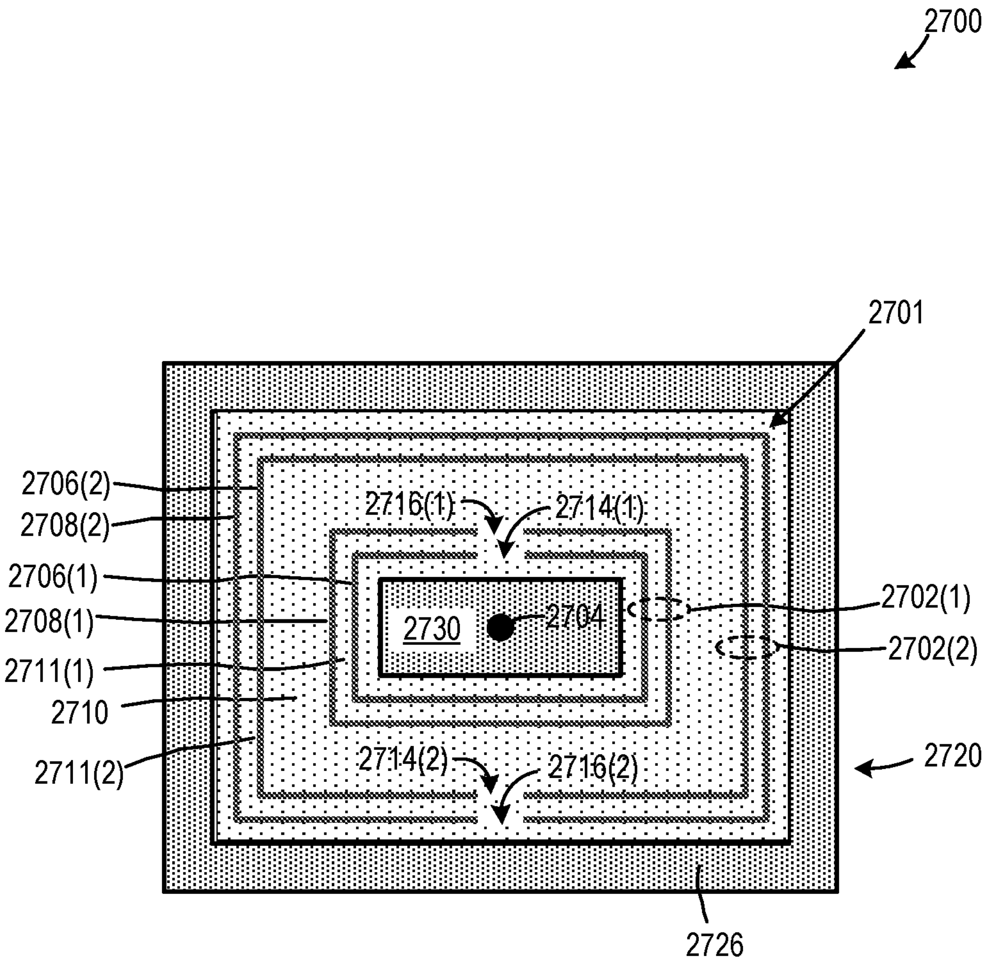
FIG. 27 is a cross-sectional view of an alternate embodiment of the FIG. 22 magnetic device having a rectangular cross-section.

For instance, FIG. 27 is a cross-sectional view analogous to FIG. 25 of a magnetic device 2700 including a resonant coil 2701 with integrated capacitance. Magnetic device 2700 is one alternate embodiment of device 2200 having a rectangular shape, as seen when viewed cross-sectionally along a common or center axis 2704. Magnetic device 2700 includes a plurality of tubular conductor layers 2702 concentrically stacked around a common or center axis 2704, where each tubular conductor layer 2702 includes a first tubular conductor sublayer 2706 and a second tubular conductor sublayer 2708 concentrically stacked around center axis 2704. A separation dielectric layer 2710 separates each pair of adjacent tubular conductor layers 2702, and a sublayer dielectric layer 2711 separates adjacent first and second tubular conductor sublayers 2706, 2708 within each tubular conductor layer. Each first tubular conductor sublayer 2706 forms a first notch or discontinuity 2714, and each second tubular conductor sublayer 2708 forms a second notch or discontinuity 2716. Although discontinuities 2714 and 2716 are illustrated as being filled with air, discontinuities 2714 and 2716 could be filled with another material, such as material forming sublayer dielectric layers 2711 or material forming separation dielectric layers 2710, without departing from the scope hereof. Within each tubular conductor layer 2702 instance, first and second discontinuities 2714, 2716 are angularly aligned with respect to center axis 2704, such that first and second tubular conductor sublayers 2706, 2708 have a common alignment. Tubular conductor layers 2702 have alternating opposing orientations, to excite capacitance between adjacent tubular conductor layers and thereby achieve integrated capacitance of resonant coil 2700. Tubular conductor layers 2702, dielectric layer 2710, and sublayer dielectric layers 2711 are analogous to tubular conductor layers 2202, dielectric layer 2210, and sublayer dielectric layers 2211, respectively, of device 2200. Device 2700 could include additional tubular conductor layers 2702 without departing from the scope hereof.

Figure 28:
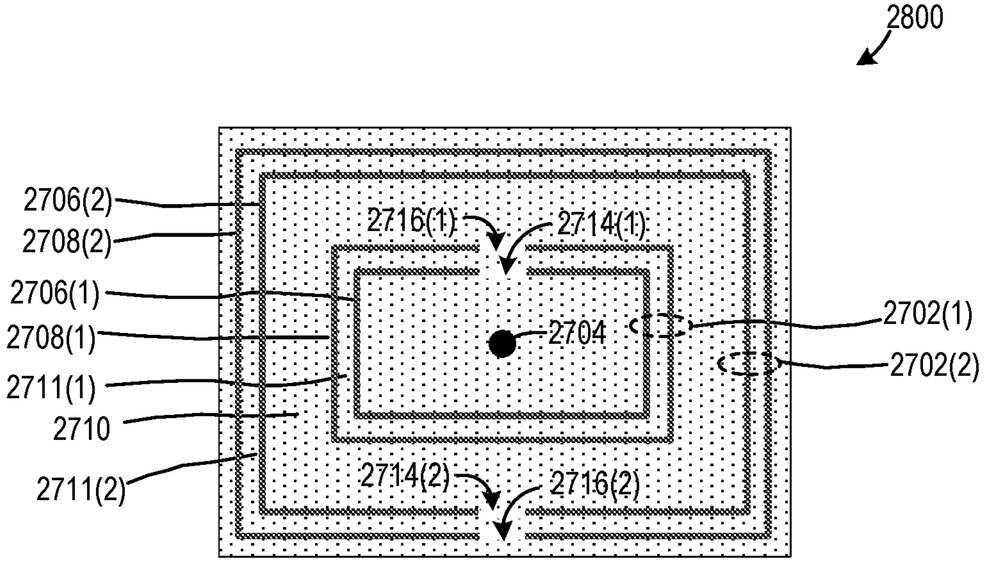
FIG. 28 is a cross-sectional view of an alternate embodiment of the FIG. 27 magnetic device with a magnetic core omitted.

Although not required, device 2700 typically includes a magnetic core 2720 analogous to magnetic core 2220 of device 2200. Magnetic core 2720 includes a rectangular hollow outer magnetic element 2726 joining first and second end magnetic elements (not shown) in the thickness direction. A magnetic center post 2730 at least partially joins the first and second end magnetic elements in the thickness direction. FIG. 28 is a cross-sectional view of a device 2800 which is like device 2700 but with magnetic core 2720 and magnetic center post 2730 omitted.

Figure 29:
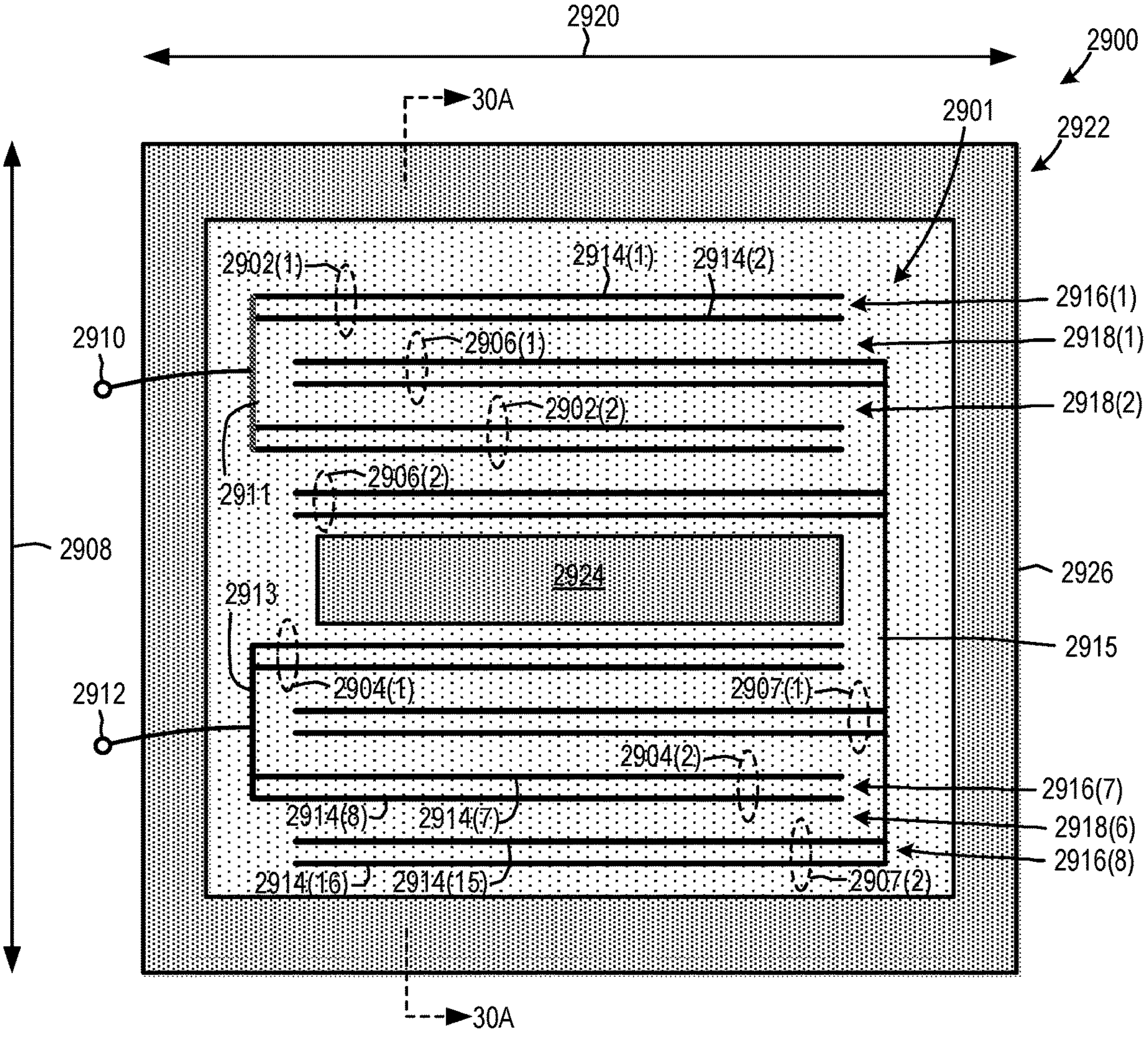
FIG. 29 is a cross-sectional view of a magnetic device similar to that of FIG. 27 but with a series-resonant electrical topology, according to an embodiment.
Figure 30:
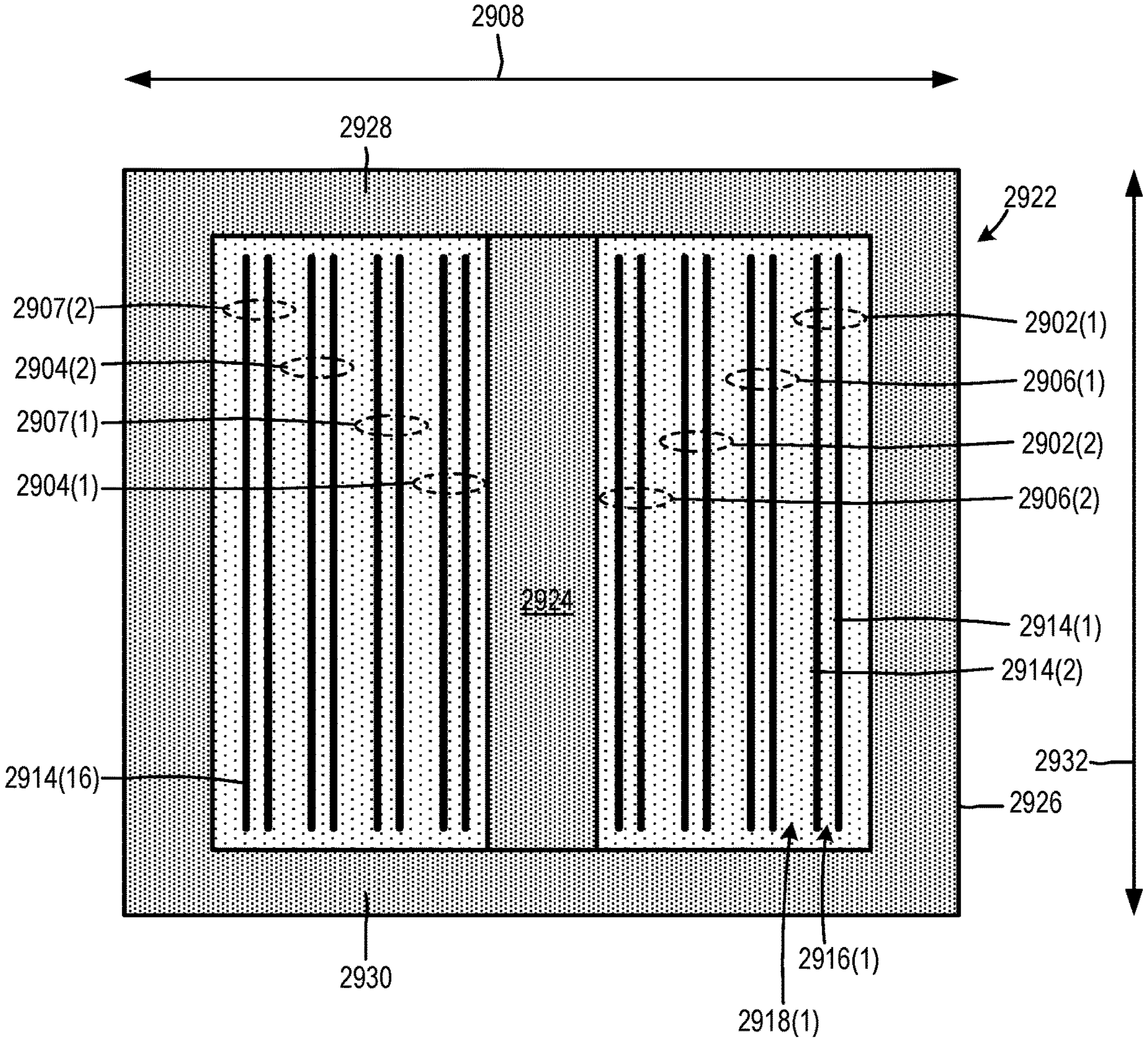
FIG. 30 is another cross-sectional view of the FIG. 29 magnetic device.

The resonant coils discussed above have a parallel-resonant electric topology, i.e., with integrated capacitance electrically coupled in parallel with winding turns, as symbolically illustrated in the FIG. 11 electrical model. However, any of the resonant coils discussed above could be modified to have a series-resonant electric topology, i.e. with the integrated capacitance effectively coupled in series with the winding turns. For example, FIG. 29 is a cross-sectional view of a magnetic device 2900 including a resonant coil 2901 with integrated capacitance, and FIG. 30 is a cross-sectional view of device 2900 taken along 30A-30A of FIG. 29. Magnetic device 2900 is similar to magnetic device 2700 of FIG. 27, but resonant coil 2901 of magnetic device 2900 has a series resonant topology.

Resonant coil 2900 includes one or more first conductor layers 2902, one or more second conductor layers 2904, one or more third conductor layers 2906, and one or more fourth conductor layers 2907. First conductor layers 2902 are separated from second conductor layers 2904 in a widthwise 2908 direction. Third conductor layers 2906 are interdigitated with first conductor layers 2902 in the widthwise 2908 direction, and fourth conductor layers 2907 are interdigitated with second conductor layers 2904 in the widthwise 2908 direction. First conductor layers 2902 are electrically coupled in parallel to a first electrical terminal 2910 via a conductor 2911, and second conductor layers 2904 are electrically coupled in parallel to a second electrical terminal 2912 via a conductor 2913. Third conductor layers 2906 and fourth conductor layers 2907 are electrically coupled in parallel with each other via a conductor 2915. Although not required, it is anticipated that third conductor layers 2906 and fourth conductor layers 2907 will typically be floating, i.e., not directly electrically connected to external circuitry. The number of first, second, third, and fourth conductor layers 2902, 2904, 2906, 2907 may be varied without departing from the scope hereof.

Each conductor layer 2902, 2904, 2906, 2907 includes a two conductor sublayers 2914 separated from each other in the widthwise 2908 direction by a sublayer dielectric layer 2916 instance. Conductor sublayers 2914 are formed, for example, of conductive foil or film, which typically has a thickness smaller than its skin depth at an intended operating frequency. Adjacent conductor layers 2902, 2904, 2906, 2907 are separated from each other in the widthwise 2908 direction by separation dielectric layers 2918. Thus, conductor layers 2902, 2904, 2906, 2907 and separation dielectric layers 2918 are stacked in an alternating direction in the widthwise 2908 direction. Only some instances of conductor sublayers 2914, sublayer dielectric layers 2916, and separation dielectric layers 2918 are labeled in FIGS. 29 and 30 to promote illustrative clarity.

Within each conductor layer 2902, 2904, 2906, 2907 instance, both conductor sublayers 2914 have approximately the same electrical potential at a given point along a length 2920 of resonant coil 2900. Consequently, there is minimal electric field to excite capacitance between conductor sublayers 2914 within a given conductor layer 2902, 2904, 2906, 2907. Therefore, sublayer dielectric layers 2916 can be formed of low-cost, industry standard dielectric materials having relatively high-loss, such as FR4 or polyimide, without negatively impacting performance Additionally, thickness of sublayer dielectric layers 2916 does not materially affect electrical properties of resonant coil 2900, which allows further flexibility is selecting sublayer dielectric layers 2916.

There is significant electric field between first conductor layers 2902 and third conductor layers 2906, as well as between second conductor layers 2904 and fourth conductor layers 2907, during operation of resonant coil 2900. Therefore, adjacent first conductor layers 2902 and third conductor layers 2906 form integrated capacitors, and adjacent second conductor layers 2904 and fourth conductor layers 2907 form integrated capacitors. Separation dielectric layers 2918 must be formed of a low-loss dielectric material, such as PTFE, PFA, ETFE, FEP, polypropylene, polyethylene, polystyrene, glass, or ceramic, to achieve high performance, due to the significant electric field between conductor layers 2902, 2904, 2906, 2907 during operation of resonant coil 2900. Capacitance values can be adjusted during the design of resonant coil 2900 by varying size and/or separation of adjacent conductor layers 2902, 2904, 2906, 2907.

Figure 31:
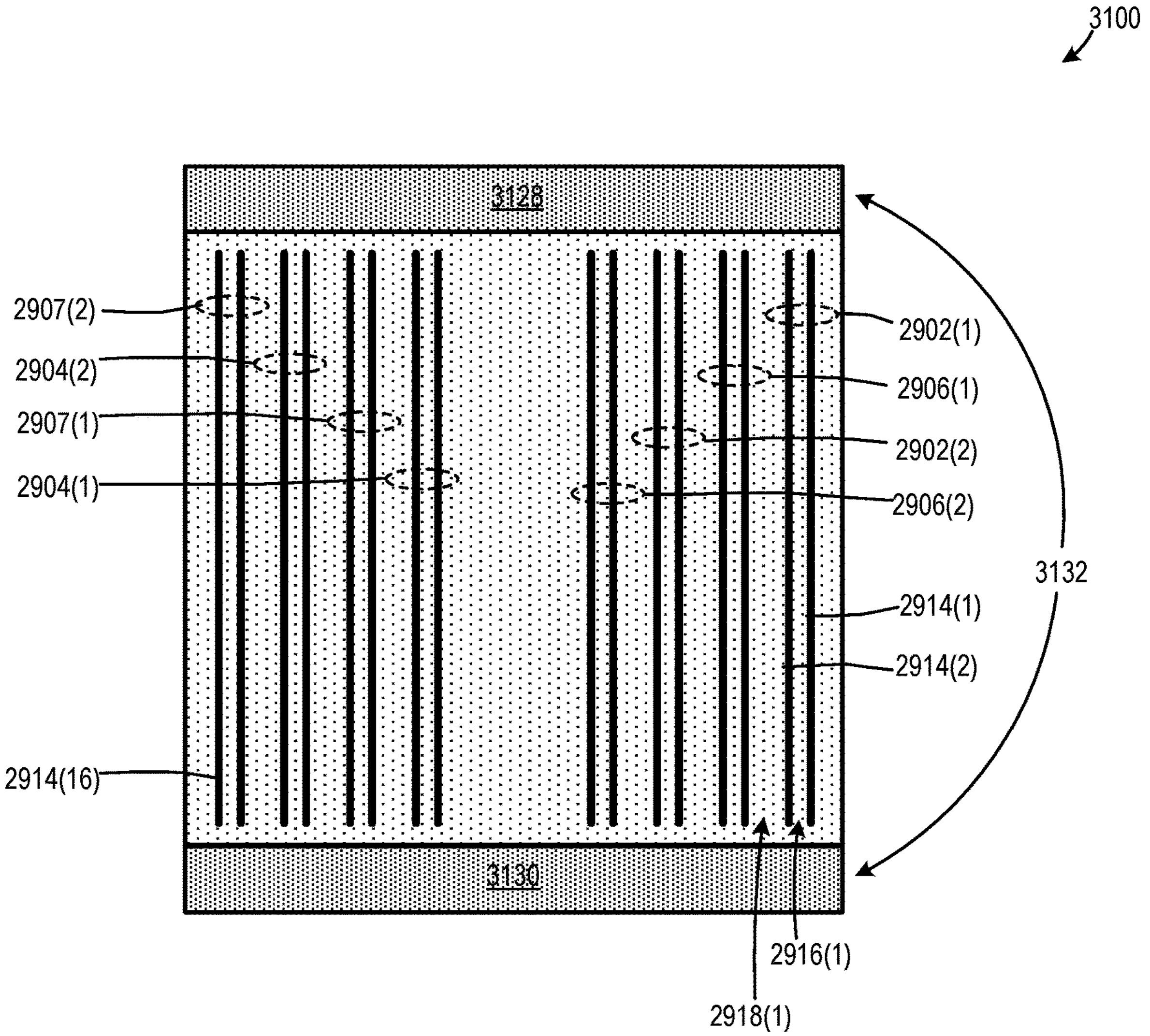
FIG. 31 is a cross-sectional view of magnetic device like that of FIG. 29 but with a different magnetic core, according to an embodiment.

Resonant coil 2900 optionally includes a magnetic core, such as magnetic core 2922 illustrated in FIG. 29. Magnetic core 2922 is similar to magnetic core 2220 of device 2200, and magnetic core 2922 includes a center post 2924 and a rectangular hollow outer element 2926 joined by opposing first and second end magnetic elements 2928 and 2930 in a thickness 2932 direction. In certain embodiments, magnetic core 2922 includes one or more openings (not shown) for first and second electrical terminals 2910 and 2912 to extend therethrough. Magnetic core 2922 could be modified without departing from the scope hereof. For example, FIG. 31 is a cross-sectional view analogous to that of FIG. 30 of a magnetic device 3100 which is similar to magnetic device 2900 but with magnetic core 2922 replaced with a magnetic core 3122. Magnetic core 3132 includes first and second end magnetic elements 3128 and 3130, but magnetic core 3132 does not include a center post or a hollow outer magnetic element.

Figure 32:
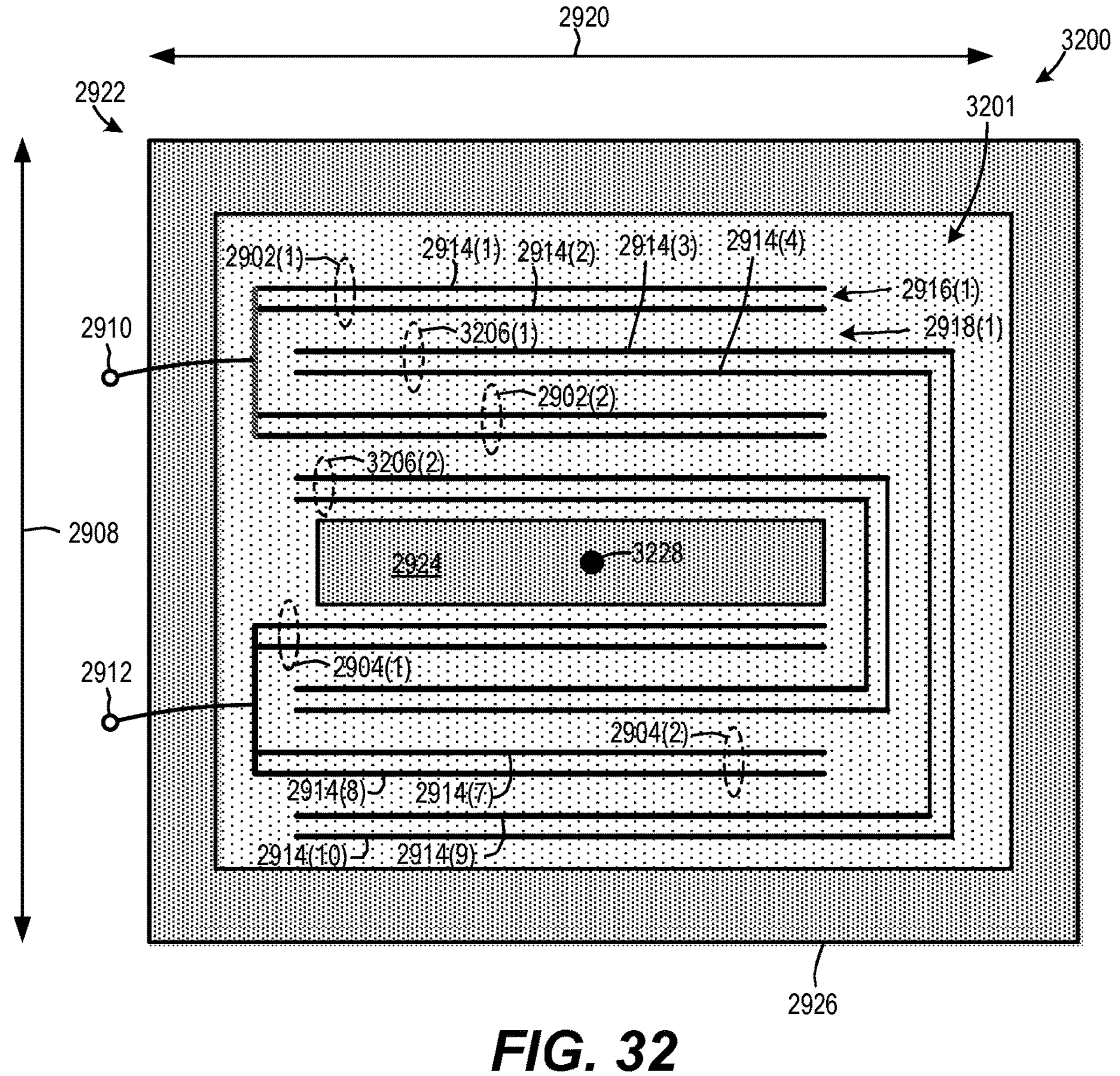
FIG. 32 is a cross-sectional view of an alternate embodiment of the FIG. 29 magnetic device.

FIG. 32 is a cross-sectional view of a magnetic device 3200 including a resonant coil 3201 with integrated capacitance. Magnetic device 3200 is similar to magnetic device 2900 of FIG. 29, but with third conductor layers 3206 in place of third and fourth conductor layers 2906, 2907 of FIG. 29. Each third conductor layer 3206 is wound around a center axis 3228 of magnetic device 3200 such that (1) a first end of the third conductor layer is interdigitated with one or more first conductor layers 2902 in the widthwise 2908 direction, and (2) a second end of the third conductor layer is interdigitated with one or more second conductor layers 2904 in the widthwise 2908 direction. Thus, conductor layers 2902, 3206, 2904 and separation dielectric layers 2918 are stacked in an alternating direction in the widthwise 2908 direction. Each third conductor layer 3206 includes two conductor sublayers 2914 separated by a sublayer dielectric layer 2916. Center axis 3228 extends in a thickness direction orthogonal to each of the widthwise 2908 direction and the lengthwise 2920 direction.

Figure 33:
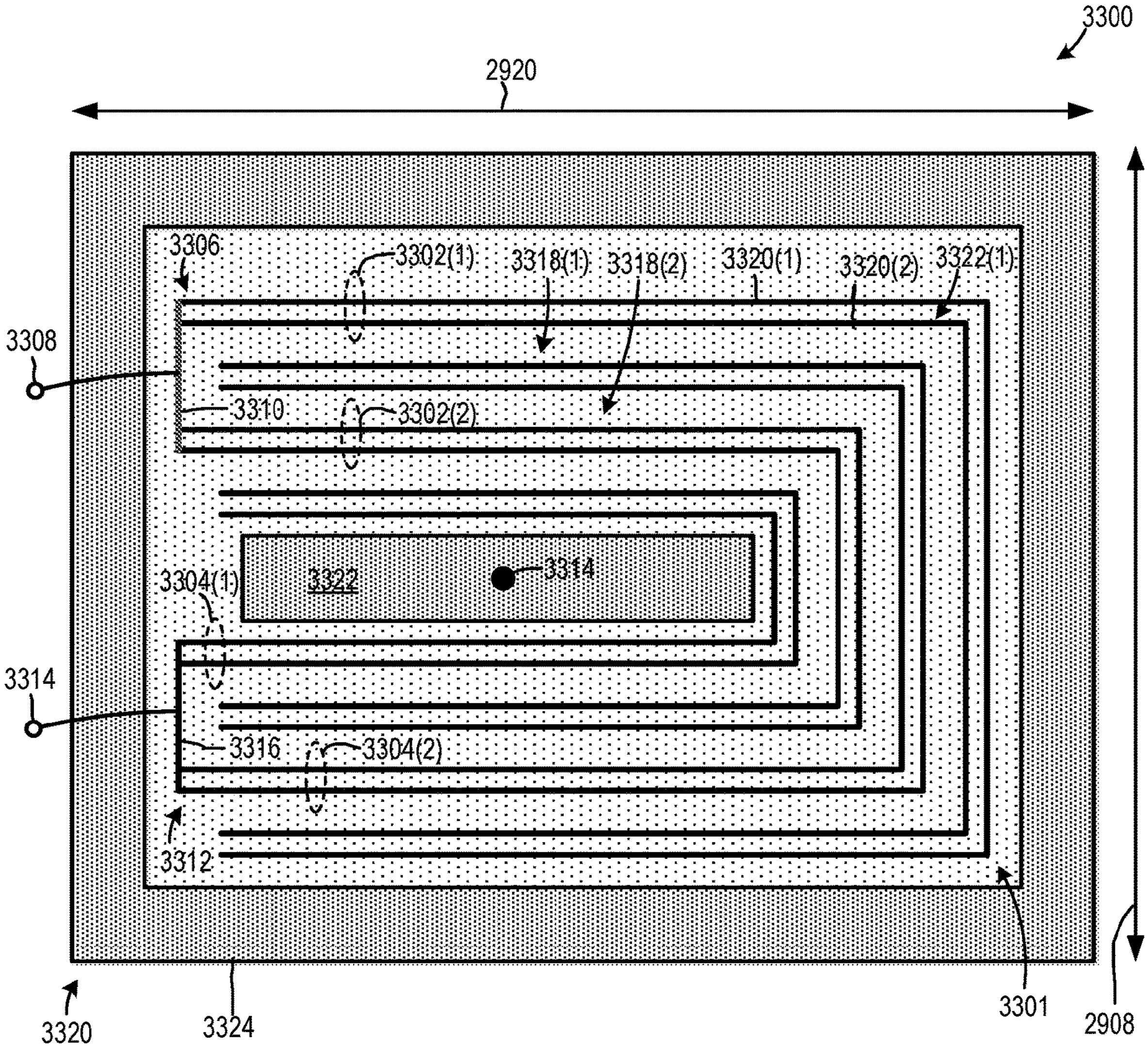
FIG. 33 is a cross-sectional view of another alternate embodiment of the FIG. 29 magnetic device.

FIG. 33 is a cross-sectional view of a magnetic device 3300 including a resonant coil 3301 with integrated capacitance. Magnetic device 3300 is another alternate embodiment of magnetic device 2700 of FIG. 27. Resonant coil 3301 includes one or more first conductor layers 3302 and one or more second conductor layers 3304. First ends 3306 of first conductor layers 3302 are electrically coupled in parallel to an electrical terminal 3308 via an electrical conductor 3310, and second ends 3312 of second conductor layers 3304 are electrically coupled in parallel to an electrical terminal 3314 via an electrical conductor 3316. First conductor layers 3302 and second conductor layers 3304 are concentrically stacked around a center axis 3314 in an alternating manner, such that first and second conductor layers 3302, 3304 are interdigitated. Center axis 3314 extends in a thickness direction orthogonal to each of the widthwise 2908 direction and the lengthwise 2920 direction. Separation dielectric layers 3318 separate adjacent conductor layers 3302, 3304.

Each conductor layer 3302, 3304 includes a two conductor sublayers 3320 separated from each other by a sublayer dielectric layer 3322. Conductor sublayers 3320 are formed, for example, of conductive foil or film, which typically has a thickness smaller than its skin depth at an intended operating frequency. Only some instances of conductor sublayers 3320, sublayer dielectric layers 3322, and separation dielectric layers 3318 are labeled in FIG. 33 to promote illustrative clarity.

Within each conductor layer 3302, 3304 instance, there is minimal electric field to excite capacitance between conductor sublayers 3320. Therefore, sublayer dielectric layers 3322 can be formed of low-cost, industry standard dielectric materials having relatively high-loss, such as FR4 or polyimide, without negatively impacting performance Additionally, thickness of sublayer dielectric layers 3322 does not materially affect electrical properties of resonant coil 3301, which further promotes flexibility in selecting sublayer dielectric layer 3322 material.

There is significant electric field between first conductor layers 3302 and second conductor layers 3304 during operation of resonant coil 3300. Therefore, capacitance between adjacent first and second conductor layers 3302, 3304 forms integrated capacitance of resonant coil 3301. Consequently, separation dielectric layers 3318 must be formed of a low-loss dielectric material, such as PTFE, PFA, ETFE, FEP, polypropylene, polyethylene, polystyrene, glass, or ceramic, to achieve high performance of resonant coil 3301. Capacitance values can be adjusted during the design of resonant coil 3301 by varying size and/or separation of conductor layers 3302, 3304.

Device 3300 optionally includes a magnetic core, such as magnetic core 3320, as illustrated. Magnetic core 3320 is similar to magnetic core 2220 of device 2200, and magnetic core 3320 includes a center post 3322 and a hollow outer magnetic element 3324 joined by opposing first and second end magnetic elements (not shown).

Figure 34:
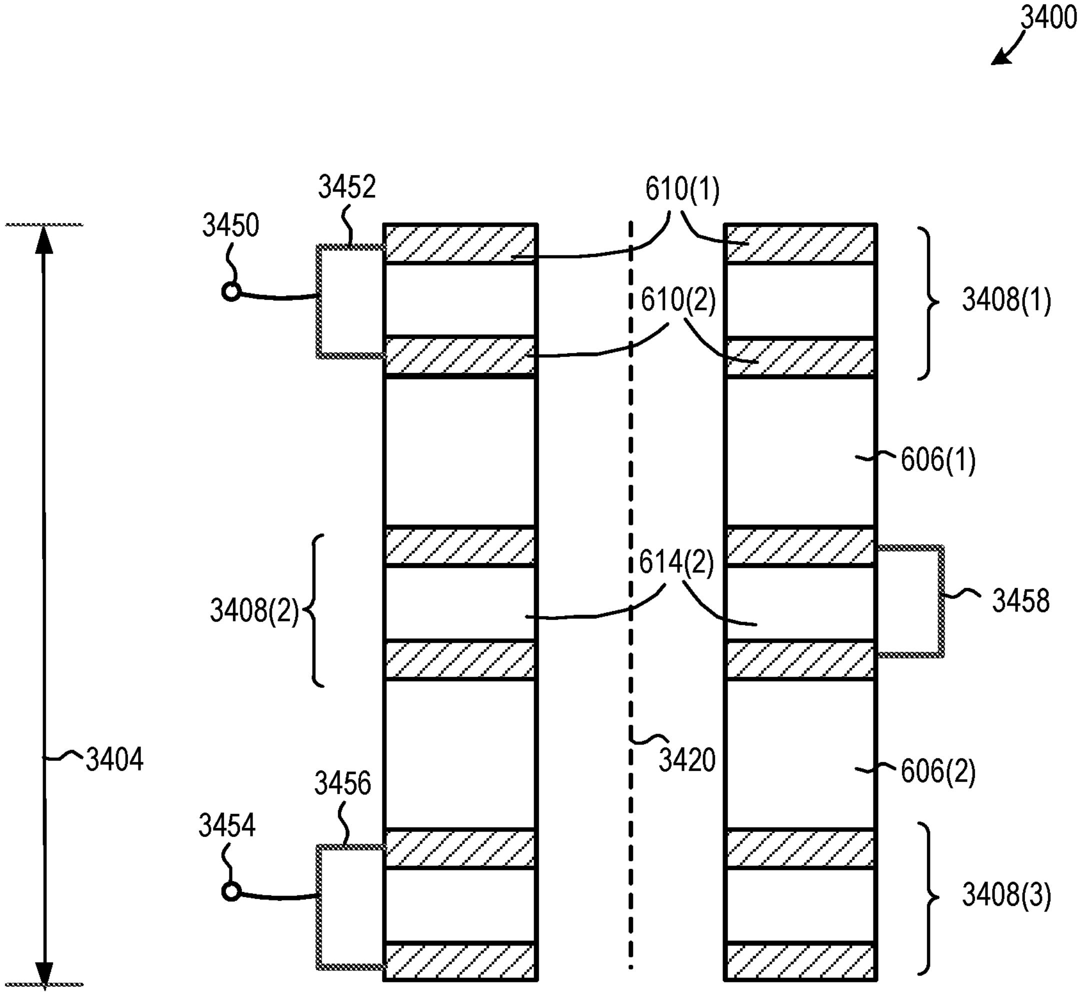
FIG. 34 is a cross-sectional view of an alternate embodiment of the FIG. 6 resonant coil configured to have a series-resonant topology.

FIG. 34 is a cross-sectional view of a resonant coil 3400, which is an alternate embodiment of resonant coil 600 (FIGS. 6-8) and is configured to have a series-resonant electrical topology. The position of the FIG. 34 cross-section is analogous to that of FIG. 8. Resonant coil 3400 includes three conductor layers 3408 concentrically stacked in an alternating manner around a center axis 3420 in a thickness 3404 direction, with adjacent conductor layers 3408 separated from each other in the thickness direction by a separation dielectric layer 606. Each conductor layer 3408 includes two instances of first conductor sublayer 610 separated in the thickness 3404 direction by a sublayer dielectric layer 614. First conductor sublayers 610 could be replaced with second conductor sublayers 612 without departing from the scope hereof.

Each first conductor sublayer 610 of conductor layer 3408(1) is electrically coupled to an electrical terminal 3450 via a conductor 3452. Similarly, each first conductor sublayer 610 of conductor layer 3408(3) is electrically coupled to an electric terminal 3454 via a conductor 3456. Conductor sublayers 610 of conductor layer 3408(2) are electrically coupled together via a conductor 3458. Conductors 3452 and 3456 are angularly aligned with respect to center axis 3420, while conductor 3458 is angularly offset from conductors 3452 and 3456 with respect to center axis 3420.

There is minimal electric field between first conductor sublayers 610 within a given conductor layer 3408, during operation of resonant coil 3400. Consequentially, sublayer dielectric layers 614 can be formed of low-cost, industry standard dielectric materials having relatively high-loss, such as FR4 or polyimide, without negatively impacting performance Additionally, thickness of sublayer dielectric layers 614 does not materially affect electrical properties of resonant coil 3400, which further promotes flexibility in selecting sublayer dielectric layer 614 material.

There is significant electric field between conductor layers 3408 during operation of resonant coil 3400. Consequently, separation dielectric layers 606 must be formed of a low-loss dielectric material, such as PTFE, PFA, ETFE, FEP, polypropylene, polyethylene, polystyrene, glass, or ceramic, to achieve high performance of resonant coil 3400. Capacitance values can be adjusted during the design of resonant coil 3400 by varying size and/or separation of conductor layers 3408.

Although resonant coil 3400 is shown as including only three conductor layers 3408 to promote illustrative clarity, it is anticipated that resonant coil 3400 will typically have additional conductor layers 3408. In such embodiments, conductor layers 3408 are electrically coupled to achieve a series resonant topology in a manner similar to that illustrated in FIG. 29,32, or 33.

Figure 35:
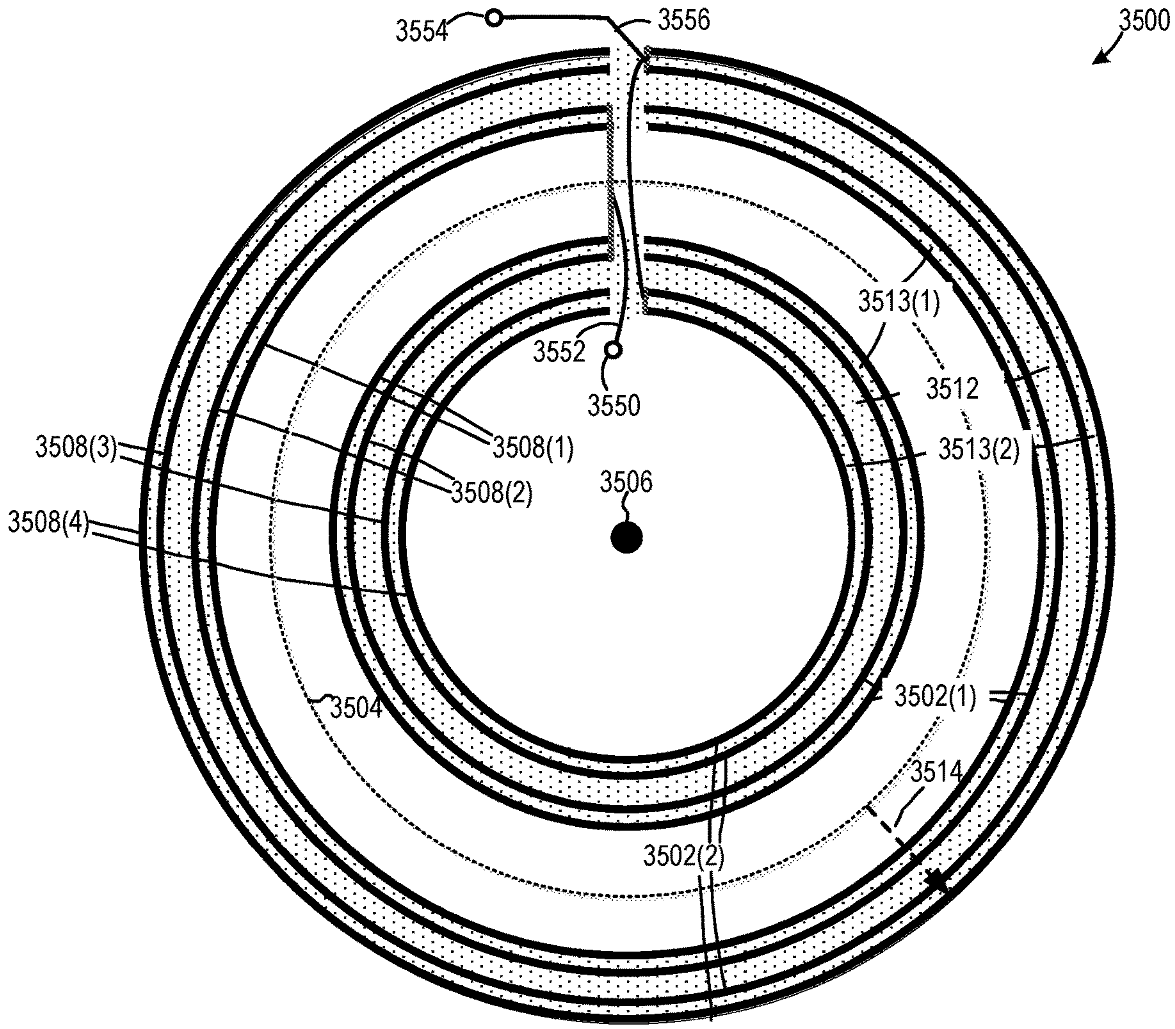
FIG. 35 is a cross-sectional view of an alternate embodiment of the FIG. 17 resonant coil configured to have a series-resonant topology.

FIG. 35 is a cross-sectional view of a resonant coil 3500, which is an alternate embodiment of resonant coil 1700 (FIGS. 17-19) and is configured to have a series resonant topology. The position of the FIG. 35 cross-section is analogous to that of FIG. 19. Resonant coil 3500 includes two conductor layers 3502 concentrically stacked in an alternating manner around a common axis 3504, with adjacent conductor layers 3502 separated from each other in a radial 3514 direction by separation dielectric layers 3512. Radial direction 3514 is orthogonal to common axis 3504, and common axis 3504 forms a loop around a center axis 3506. Each conductor layer 3502 includes two instances of first conductor sublayer 3508 separated in the radial 3514 direction by a sublayer dielectric layer 3513.

Each first conductor sublayer 3508 of conductor layer 3502(1) is electrically coupled to a terminal 3550 via a conductor 3552. Similarly, each first conductor sublayer 3508 of conductor layer 3502(2) is electrically coupled to a terminal 3554 via a conductor 3556. There is minimal electric field between first conductor sublayers 3508 within a given conductor layer 3502, during operation of resonant coil 3500. Consequentially, sublayer dielectric layers 3513 can be formed of low-cost, industry standard dielectric materials having relatively high-loss, such as FR4 or polyimide, without negatively impacting performance Additionally, thickness of sublayer dielectric layers 3513 does not materially affect electrical properties of resonant coil 3500, which further promotes flexibility in selecting sublayer dielectric layer 3513 material.

There is significant electric field between conductor layers 3502 during operation of resonant coil 3500. Consequently, separation dielectric layers 3512 must be formed of a low-loss dielectric material, such as PTFE, PFA, ETFE, FEP, polypropylene, polyethylene, polystyrene, glass, or ceramic, to achieve high performance of resonant coil 3500. Capacitance values can be adjusted during the design of resonant coil 3500 by varying size and/or separation of conductor layers 3502.

Although resonant coil 3500 is shown as including only two conductor layers 3502 to promote illustrative clarity, it is anticipated that resonant coil 3500 will typically have additional conductor layers 3502. In such embodiments, conductor layers 3502 are electrically coupled to achieve a series resonant topology in a manner similar to that illustrated in FIG. 29,32, or 33.

Figure 36:
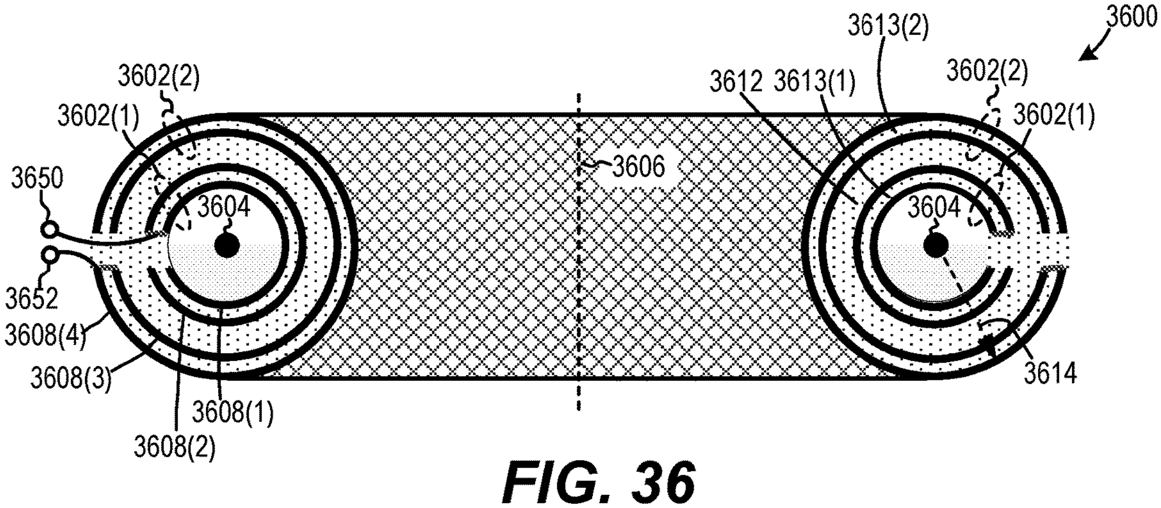
FIG. 36 is a cross-sectional view of an alternate embodiment of the FIG. 20 resonant coil configured to have a series-resonant topology.

FIG. 36 is a cross-sectional view of a resonant coil 3600, which is an alternate embodiment of resonant coil 2000 (FIGS. 20 and 21) configured to have a series resonant topology. The position of the FIG. 36 cross-section is analogous to that of FIG. 21. Resonant coil 3600 includes two conductor layers 3602 concentrically stacked in an alternating manner around a common axis 3604, with adjacent conductor layers 3602 separated from each other in a radial 3614 direction by a separation dielectric layer 3612. Radial direction 3614 is orthogonal to common axis 3604, and common axis 3604 forms a loop around a center axis 3606. Each conductor layer 3602 includes two instances of first conductor sublayer 3608 separated in the radial 3614 direction by a sublayer dielectric layer 3613.

Each first conductor sublayer 3608 of conductor layer 3602(1) is electrically coupled to a terminal 3650, and each first conductor sublayer 3608 of conductor layer 3602(2) is electrically coupled to a terminal 3652. There is minimal electric field between first conductor sublayers 3608 within a given conductor layer 3602, during operation of resonant coil 3600. Consequentially, sublayer dielectric layers 3613 can be formed of low-cost, industry standard dielectric materials having relatively high-loss, such as FR4 or polyimide, without negatively impacting performance Additionally, thickness of sublayer dielectric layers 3613 does not materially affect electrical properties of resonant coil 3600, which further promotes flexibility in selecting sublayer dielectric layer 3613 material.

There is significant electric field between conductor layers 3602 during operation of resonant coil 3600. Consequently, separation dielectric layers 3612 must be formed of a low-loss dielectric material, such as PTFE, PFA, ETFE, FEP, polypropylene, polyethylene, polystyrene, glass, or ceramic, to achieve high performance of resonant coil 3600. Capacitance values can be adjusted during the design of resonant coil 3600 by varying size and/or separation of conductor layers 3602.

Although resonant coil 3600 is shown as including only two conductor layers 3602 to promote illustrative clarity, it is anticipated that resonant coil 3600 will typically have additional conductor layers 3602. In such embodiments, conductor layers 3602 are electrically coupled to achieve a series resonant topology in a manner similar to that illustrated in FIG. 29,32, or 33.

New Magnetic Cores

Applicant has additionally developed new magnetic cores and associated magnetic devices which help prevent lateral current crowding associated with conventional magnetic cores. These new magnetic cores do not completely enclose conductor layers wound in the magnetic cores, thereby promoting low cost, ease of manufacturing, and cooling of the conductor layers.

Figure 37:
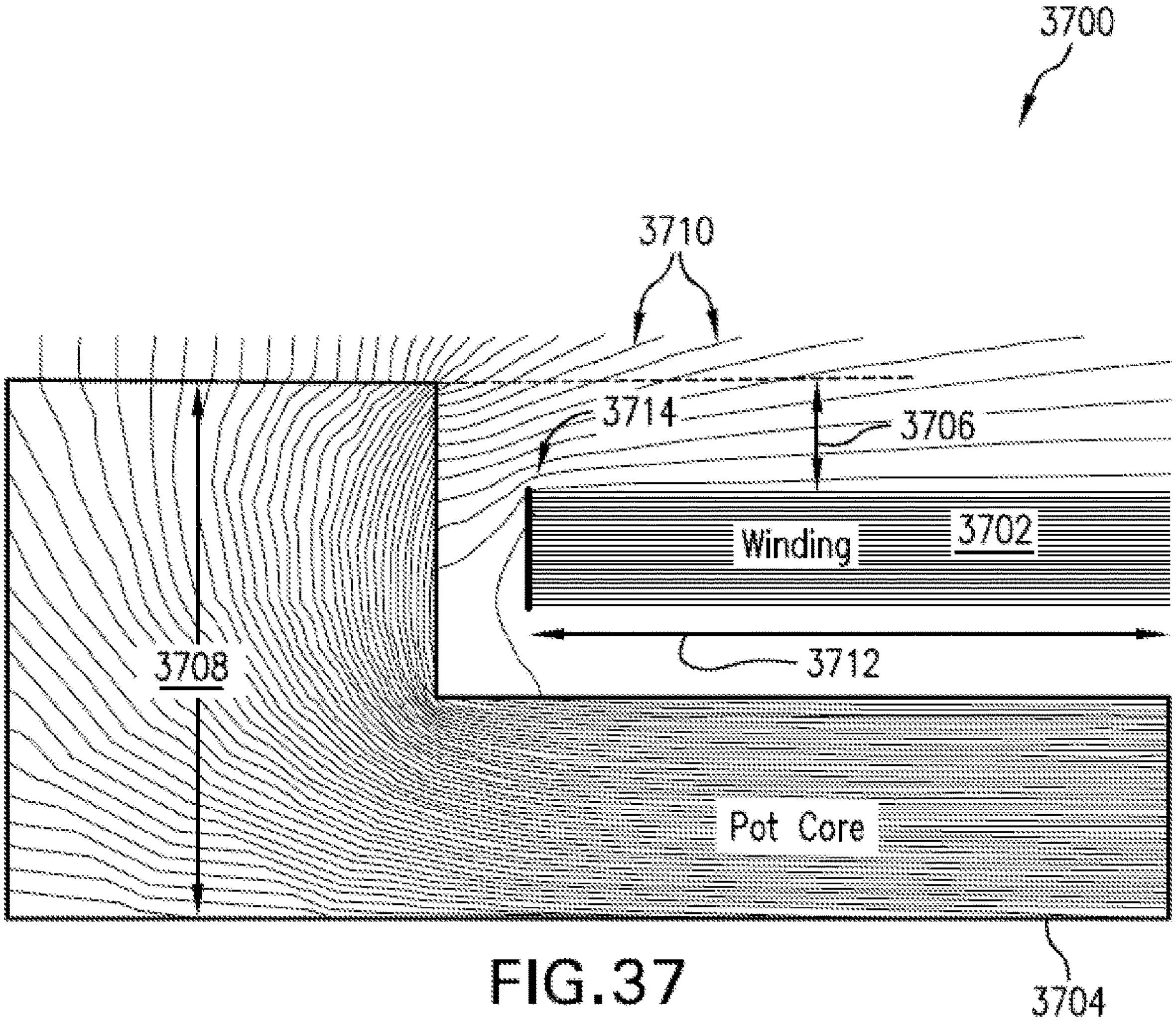
FIG. 37 illustrates a finite element analysis of a portion of a magnetic device including a multi-layer winding disposed in a conventional pot magnetic core.

To help appreciate these new magnetic cores, consider FIG. 37 which illustrates an axis-symmetric finite element analysis of a portion of a magnetic device 3700 including a multi-layer winding 3702 disposed in a conventional pot magnetic core 3704. Pot magnetic core 3704 extends above multi-layer winding 3702 by a relatively small height 3706 to minimize a total height 3708 of magnetic device 3700. Curves 3710 represent simulated magnetic field. Only two instances of curves 3710 are labeled in FIG. 37 to promote illustrative clarity. It is desired that the magnetic field be substantially parallel to multi-layer winding 3702 along a width 3712 of multi-layer winding 3702 to minimize inducement of eddy currents and resulting current crowding in multi-layer winding 3702. However, the relatively small value of height 3706 causes the magnetic field to be significantly non-parallel to multi-layer winding 3702 near an edge 3714 of multi-layer winding 3702, as illustrated FIG. 37. Consequently, significant eddy currents may flow along a width 3712 of multi-layer winding, resulting in current crowding near edges of multi-layer winding 3702, which increases effective resistance of the winding. Non-parallel magnetic field lines can increase effective resistance of a multi-layer winding significantly more than they can increase effective resistance of a single-layer winding because the additional layers of a multi-layer winding provide additional conductive paths for eddy currents to circulate. Consequentially, non-parallel magnetic field lines may be particularly detrimental to a magnetic device including multiple conductor layers.

The new magnetic core cores developed cores developed by Applicant at least partially overcome the above-discussed drawbacks associated with conventional magnetic cores. In particular, the new magnetic cores include magnetic extensions which shape magnetic fields to help minimize eddy currents and associated current crowding in conductor layers disposed in the magnetic cores, without completely enclosing the conductor layers.

Figure 38:
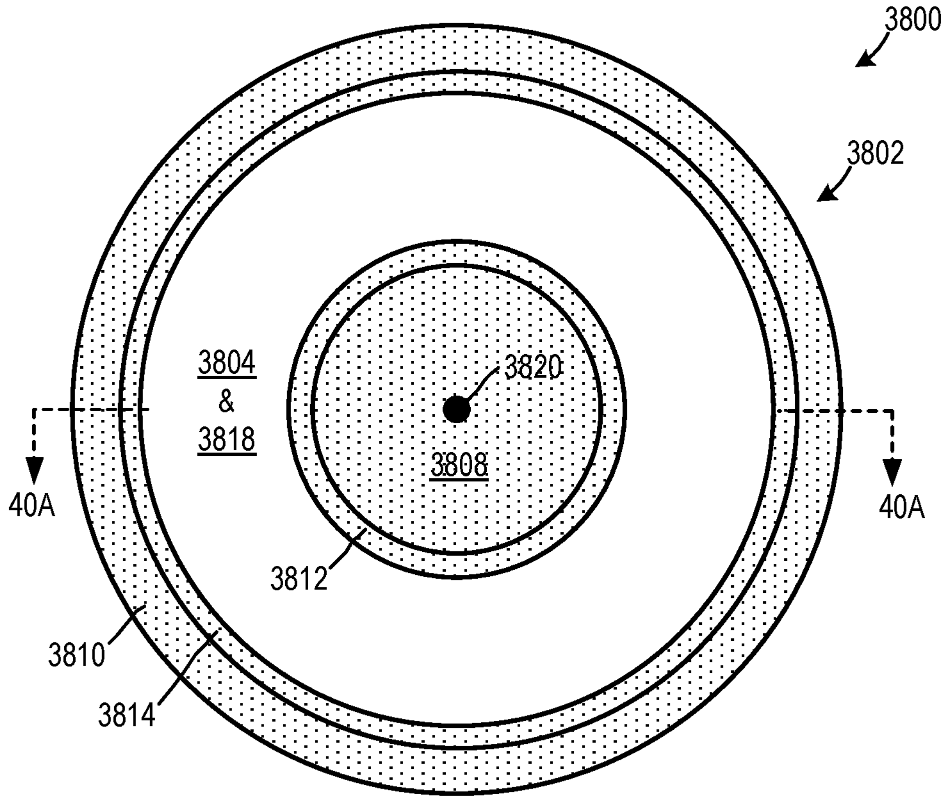
FIG. 38 is a top plan view of a magnetic device including a magnetic core with magnetic extensions, according to an embodiment.
Figure 39:
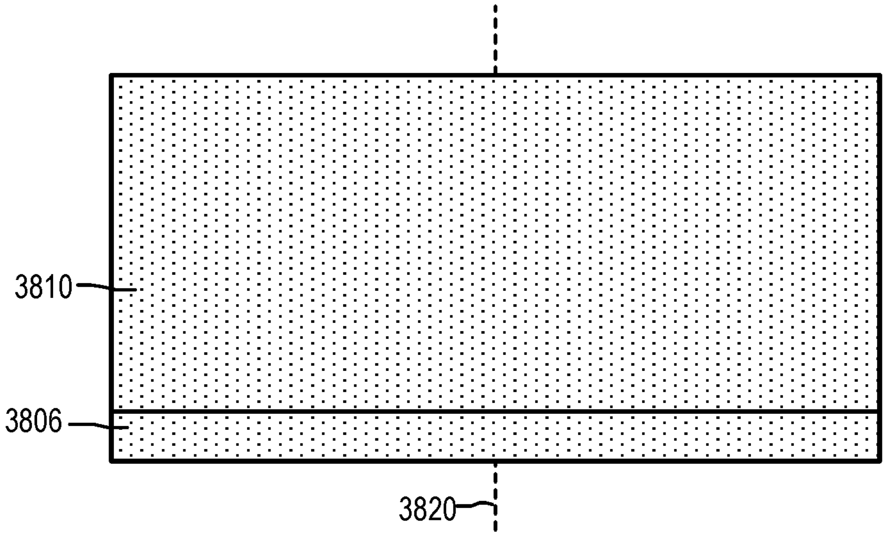
FIG. 39 is a side elevational view of the FIG. 38 magnetic device.
Figure 40:
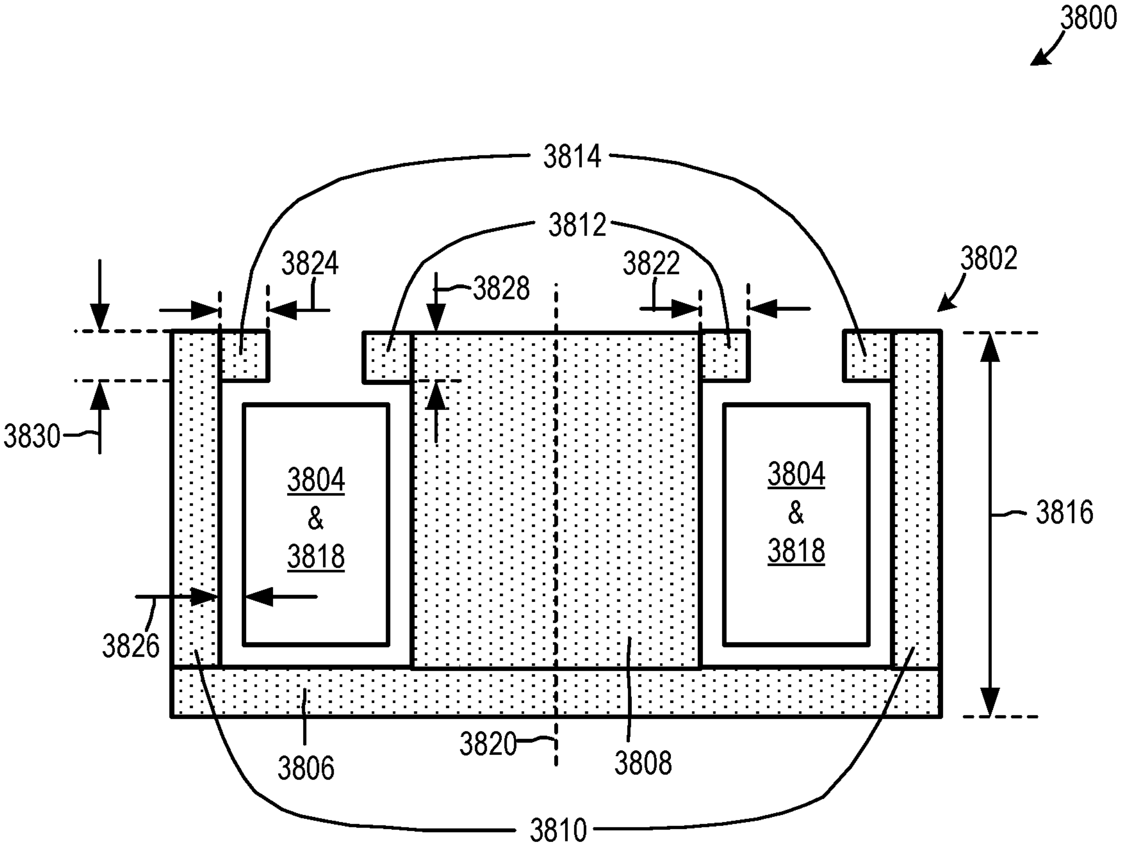
FIG. 40 is a cross-sectional view of the FIG. 38 magnetic device taken along line 40A-40A of FIG. 38.

FIGS. 38-40 illustrate a magnetic device 3800 including one embodiment of the new magnetic cores including magnetic extensions. In particular, FIG. 38 is a top plan view of magnetic device 3800, FIG. 39 is a side elevational view of magnetic device 3800, and FIG. 40 is a cross-sectional view of magnetic device 3800 taken along line 40A-40A of FIG. 38.

Magnetic device 3800 includes a magnetic core 3802, a plurality of conductor layers 3804, and one or more separation dielectric layers 3818. Magnetic core 3802 includes an end magnetic element 3806, a center post 3808, a hollow outer magnetic element 3810, an inner magnetic extension 3812, and an outer magnetic extension 3814. Center post 3808 is disposed on end magnetic element 3806 and extends away from end magnetic element 3806 in a thickness 3816 direction. Hollow outer magnetic element 3810, which is concentric with center post 3808, is also disposed on end magnetic element 3806 and extends away from end magnetic element 3806 in the thickness 3816 direction. Center post 3808 is disposed within hollow outer magnetic element 3810, as seen when magnetic device 3800 is viewed cross-sectionally in the thickness 3816 direction. Each of inner magnetic extension 3812 and outer magnetic extension 3814 are concentric with center post 3808. Outer magnetic extension 3814 is disposed between hollow outer magnetic element 3810 and center post 3808, as seen when magnetic device 3800 is viewed cross-sectionally in the thickness 3816 direction. Inner magnetic extension 3812 is disposed between outer magnetic extension 3814 and center post 3808, as seen when magnetic device 3800 is viewed cross-sectionally in the thickness 3816 direction Additionally, inner magnetic extension 3812 is separated from outer magnetic extension 3814 as seen when magnetic device 3800 is viewed cross-sectionally in the thickness 3816 direction.

In certain embodiments, outer magnetic extension 3814 is attached to hollow outer magnetic element 3810, and inner magnetic extension 3812 is attached to center post 3808, as illustrated. However, in some other embodiments, outer magnetic extension 3814 is separated from hollow outer magnetic element 3810 by a gap, and/or inner magnetic extension 3812 is separated from center post 3808 by a gap. Magnetic core 3802 is formed, for example, of a ferrite magnetic material or a powder iron magnetic material. The lines separating the various elements of magnetic core 3802 are included to facilitate identification of the elements of magnetic core 3802 and do not necessarily represent discontinuities in magnetic core 3802.

Figure 5:
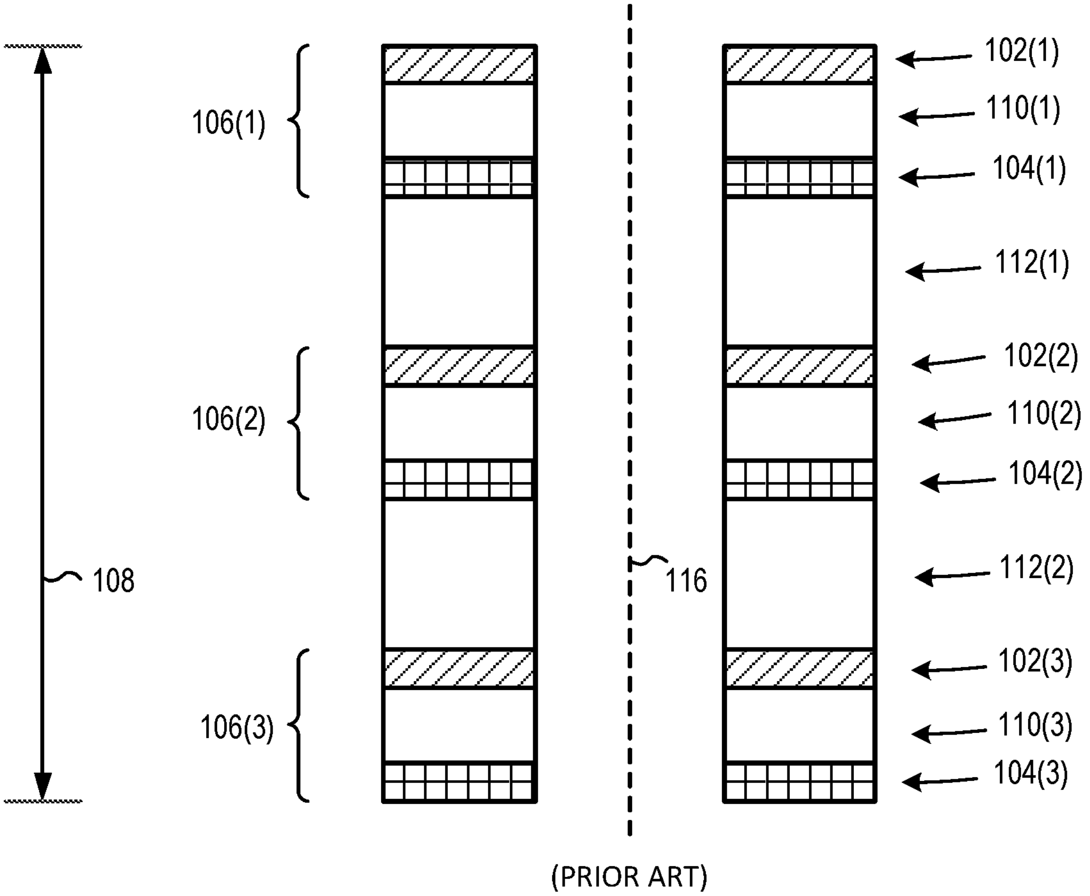
(PRIOR ART) FIG. 5
FIG. 5 is a cross-sectional view of the FIG. 1 resonant coil taken along line 5A-5A of FIG. 1.

Conductor layers 3804 are wound around center post 3808, such that conductor layers 3803 are disposed, in the thickness 3816 direction, between (a) end magnetic element 3806 and (b) inner and outer magnetic extensions 3812 and 3814. Separation dielectric layers 3818 separate adjacent conductor layers 3804. Details of conductor layers 3804 and separation dielectric layers 3818 are not shown to promote illustrative clarity. In particular embodiments, separation dielectric layers 3818 and conductor layers 3804 are stacked in an alternating manner along a common axis 3820 extending in the thickness 3816 direction, such as in a manner similar to that illustrated in FIG. 5, 8, or 34. In some other embodiments, separation dielectric layers 3818 and conductor layers 3804 are stacked around common axis 3820 such that separation dielectric layers 3818 and conductor layers 3804 are concentric with common axis 3240, such as in a manner similar to that illustrated in FIG. 25 or 27.

Inner magnetic extension 3812 has an inner extension width 3822 orthogonal to the thickness 3816 direction, and outer magnetic extension 3814 has an outer extension width 3824 orthogonal to the thickness 3816 direction. Inner magnetic extension 3812 also has an inner extension height 3828 in the thickness 3816 direction, and outer magnetic extension 3814 has an outer extension height 3830 in the thickness 3816 direction. While not required, it is anticipated that inner extension width 3822 will typically be essentially equal to outer extension width 3824, and that inner extension height 3828 will typically be equal to outer extension height 3830, such that magnetic device 3800 has symmetrical geometry. Conductor layers 3804 are separated from magnetic core 3802 by a gap width 3826.

Figure 41:
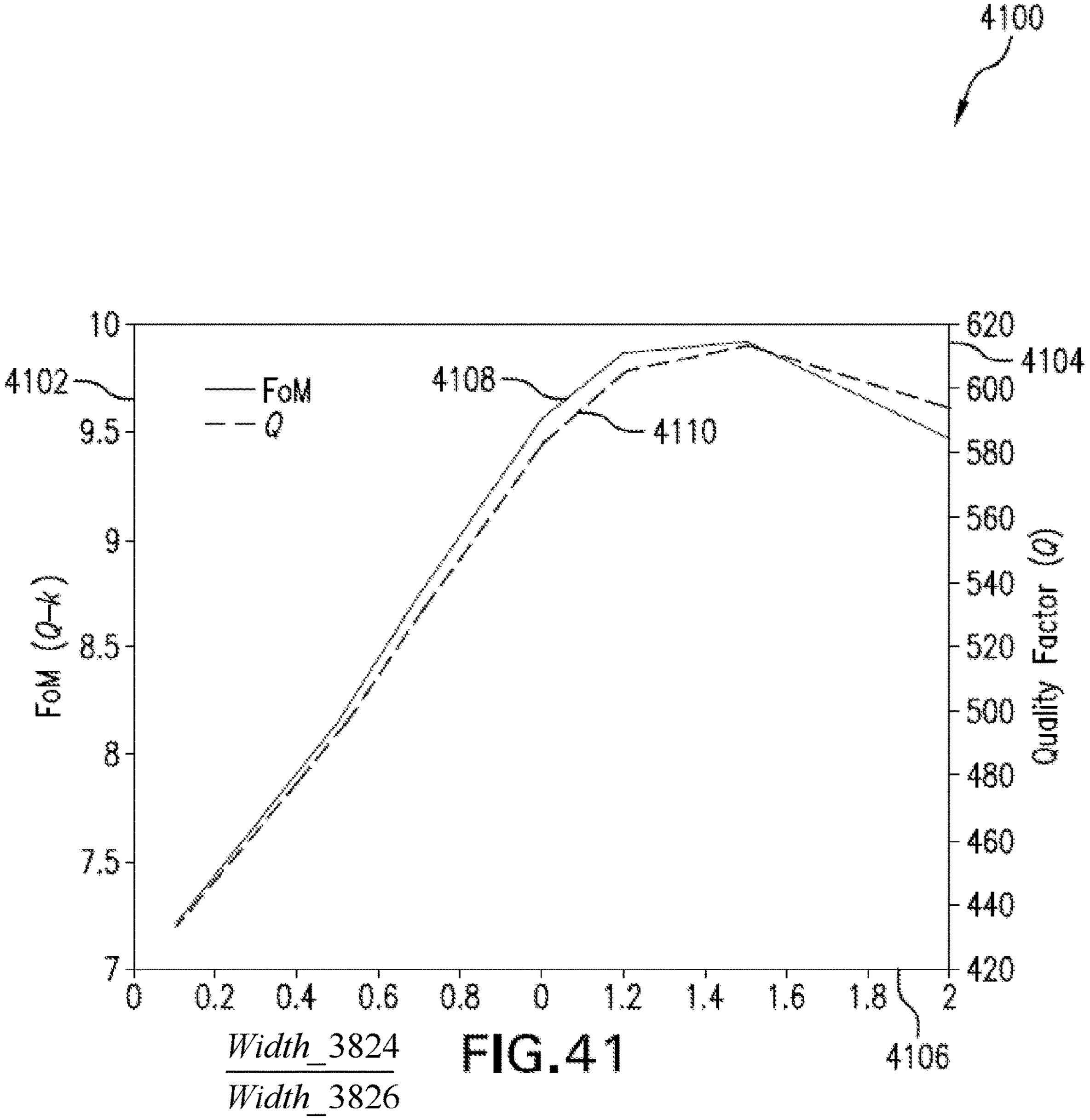
FIG. 41 is a graph of figure of merit and Quality Factor of one implementation of the FIG. 38 magnetic device.

Inner magnetic extension 3812 and outer magnetic extension 3814 shape magnetic fields generated by current flowing through conductor layers 3804 to help achieve magnetic fields which are substantially parallel to conductor layers 3804 near edges of the conductor layers, thereby potentially significantly reducing current crowding associated with use of conventional magnetic cores. Applicant has determined that certain ratios of outer extension width 3824 to gap width 3826 may be particularly advantageous in some embodiments of magnetic device 3800 with symmetrical geometry. In particular, FIG. 41 is a graph of figure of merit (FoM) and Quality Factor (Q) as a function of the ratio of outer extension width 3824 to gap width 3826 in an embodiment of magnetic device 3800 where conductor layers 3804 include ten sections, the magnetic device has a total height of 3 millimeters, and the magnetic device has an overall diameter of 6.6 centimeters. FoM is equal to product of Q and coupling coefficient (k) associated with magnetic device 3800. Vertical axis 4102 represents FoM, vertical axis 4104 represents Q, horizontal axis 4106 represents ratio of outer extension width 3824 to gap width 3826, curve 4108 represents FoM, and curve 4110 represents Q. As evident from FIG. 41, FoM and Q each have peak values when ratio of outer extension width 3824 to gap width 3826 is about 1.5.

The shape of magnetic device 3800 could be varied without departing from the scope hereof. For example, although hollow outer magnetic element 3810 and conductor layers 3804 are illustrated as having a ring-shape, these two elements could be modified to have a rectangular shape, as seen when magnetic device 3800 is viewed cross-sectionally in the thickness 3816 direction. As another example, the shape of center post 3808 could be changed from round to rectangular, as seen when magnetic device 3800 is viewed cross-sectionally in the thickness 3816 direction.

Figure 42:
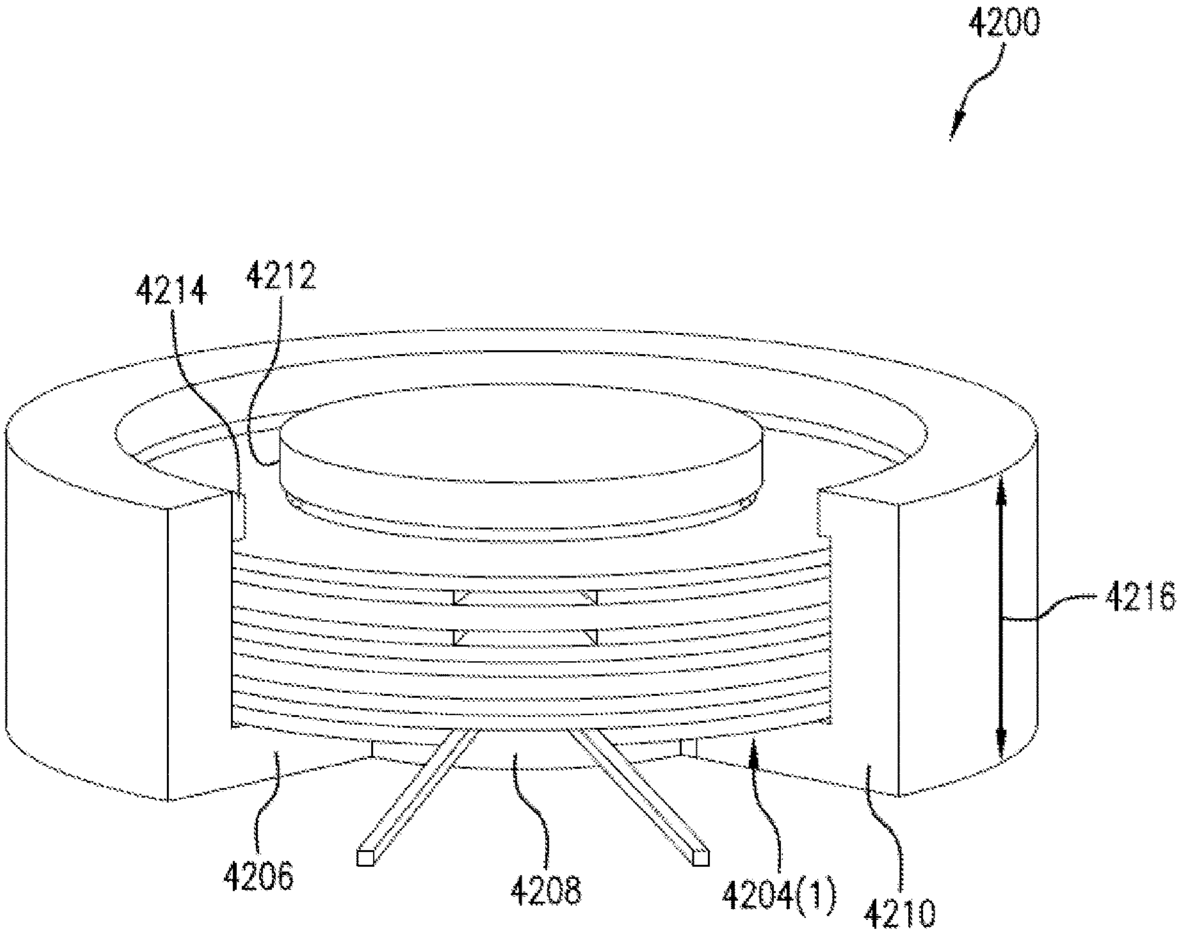
FIG. 42 is a cutaway perspective view of a magnetic device, according to an embodiment.
Figure 43:
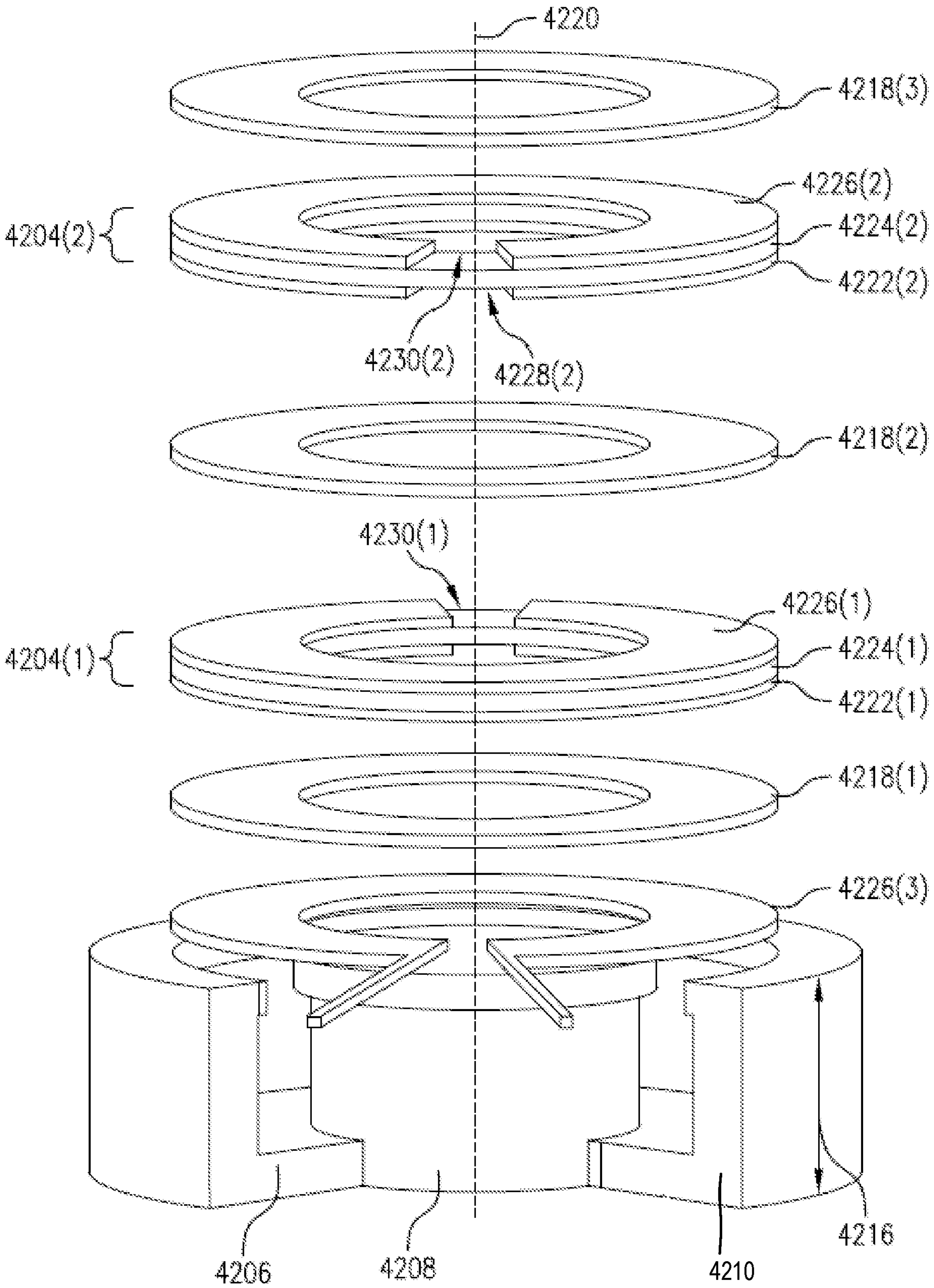
FIG. 43 is an exploded cutaway perspective view of the FIG. 42 magnetic device.

FIG. 42 is a cutaway perspective view, and FIG. 43 is an exploded cutaway perspective view, of a magnetic device 4200, which is one embodiment of magnetic device 3800. Magnetic device 4200 includes an end magnetic element 4206, a center post 4208, a hollow outer magnetic element 4210, an inner magnetic extension 4212, and an outer magnetic extension 4214, which are embodiments of end magnetic element 3806, center post 3808, hollow outer magnetic element 3810, inner magnetic extension 3812, and outer magnetic extension 3814, respectively. Magnetic device 4200 additionally includes a plurality of conductor layers 4204 and a plurality of separation dielectric layers 4218, which are embodiments of conductor layers 3804 and separation dielectric layers 3818, respectively, stacked in an alternating manner in the thickness 4216 direction. Each conductor layer 4204 includes a respective first conductor sublayer 4222, a sublayer dielectric layer 4224, and second conductor sublayer 4226, stacked in the thickness 4216 direction. Adjacent conductor layers 4204 are separated in the thickness 4216 direction by a separation dielectric layer 4218. Each first conductor sublayer 4222 forms a first discontinuity or notch 4228, and each second conductor sublayer 4226 forms a second discontinuity or notch 4230. Only some instances of conductor layers 4204, separation dielectric layers 4218, first conductor sublayers 4222, sublayer dielectric layers 4224, second conductor sublayers 4226, first notches 4228, and second notches 4230 are labeled to promote illustrative clarity.

Within a given conductor layer 4204 instance, first conductor sublayer 4222 is angularly aligned with second conductor sublayer 4226 with respect to common axis 4220, such that notches 4228, 4230 of first and second conductor sublayers 4222, 4226, respectively, are also angularly aligned. However, the plurality of conductor layers 4204 in magnetic device 4200 have alternating opposing orientations, where notches 4228, 4230 of one conductor layer 4204 instance are angularly displaced from notches 4228, 4230 of an adjacent conductor layer 4204 instance, with respect to common axis 4220.

Figure 44:
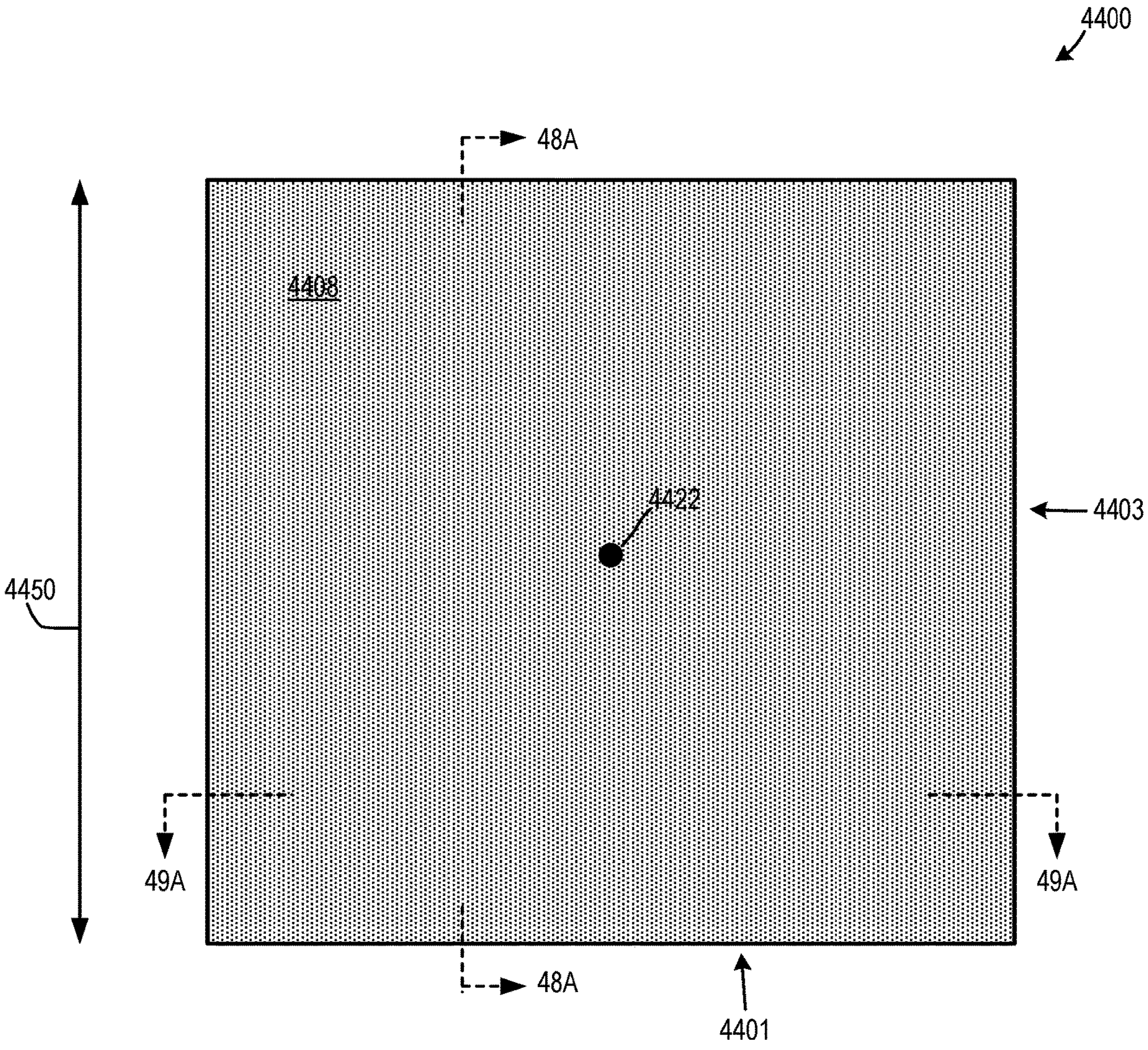
FIG. 44 is a top plan view of another magnetic device including magnetic extensions, according to an embodiment.
Figure 45:
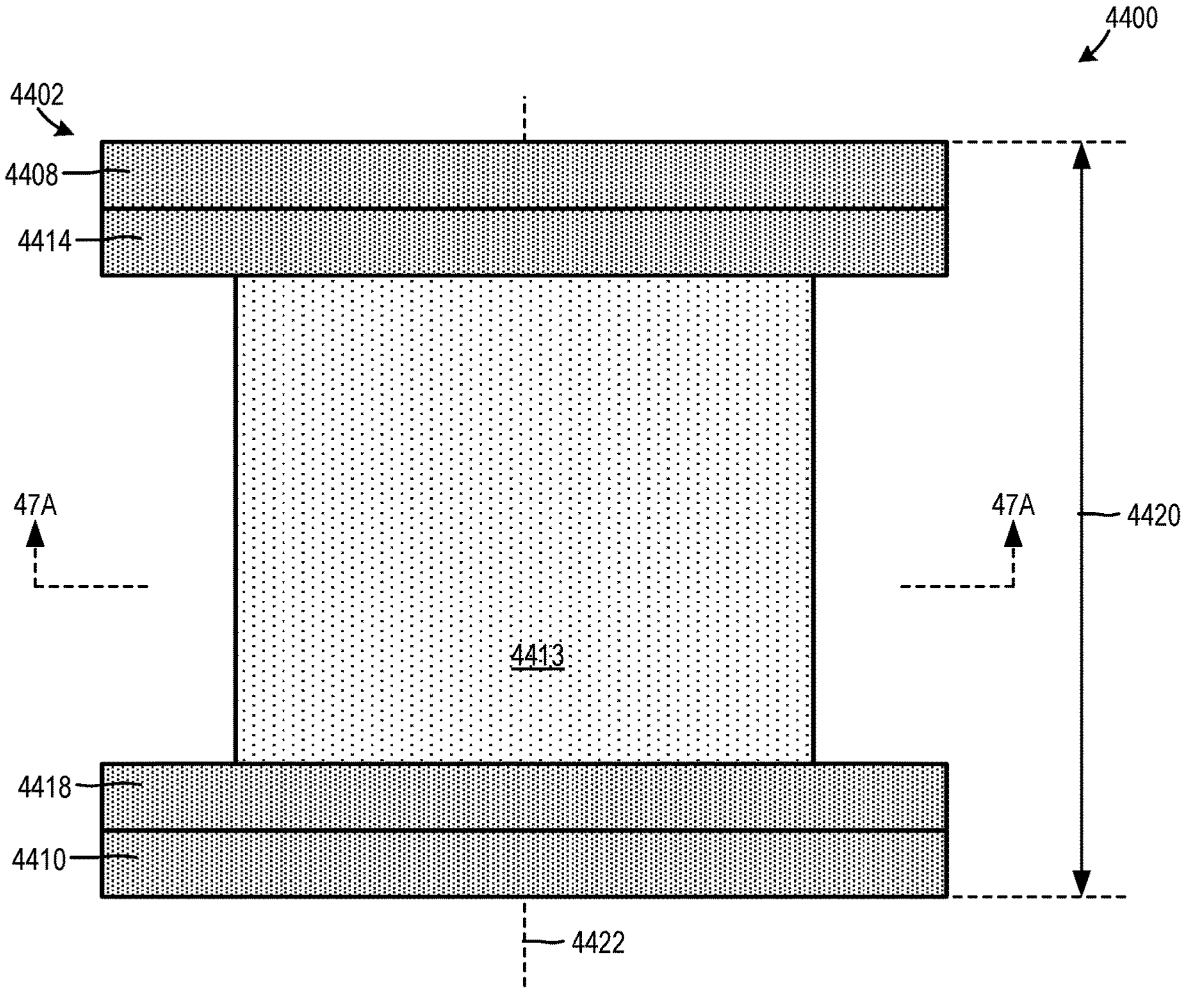
FIG. 45 is a side elevational view of the FIG. 44 magnetic device.
Figure 46:
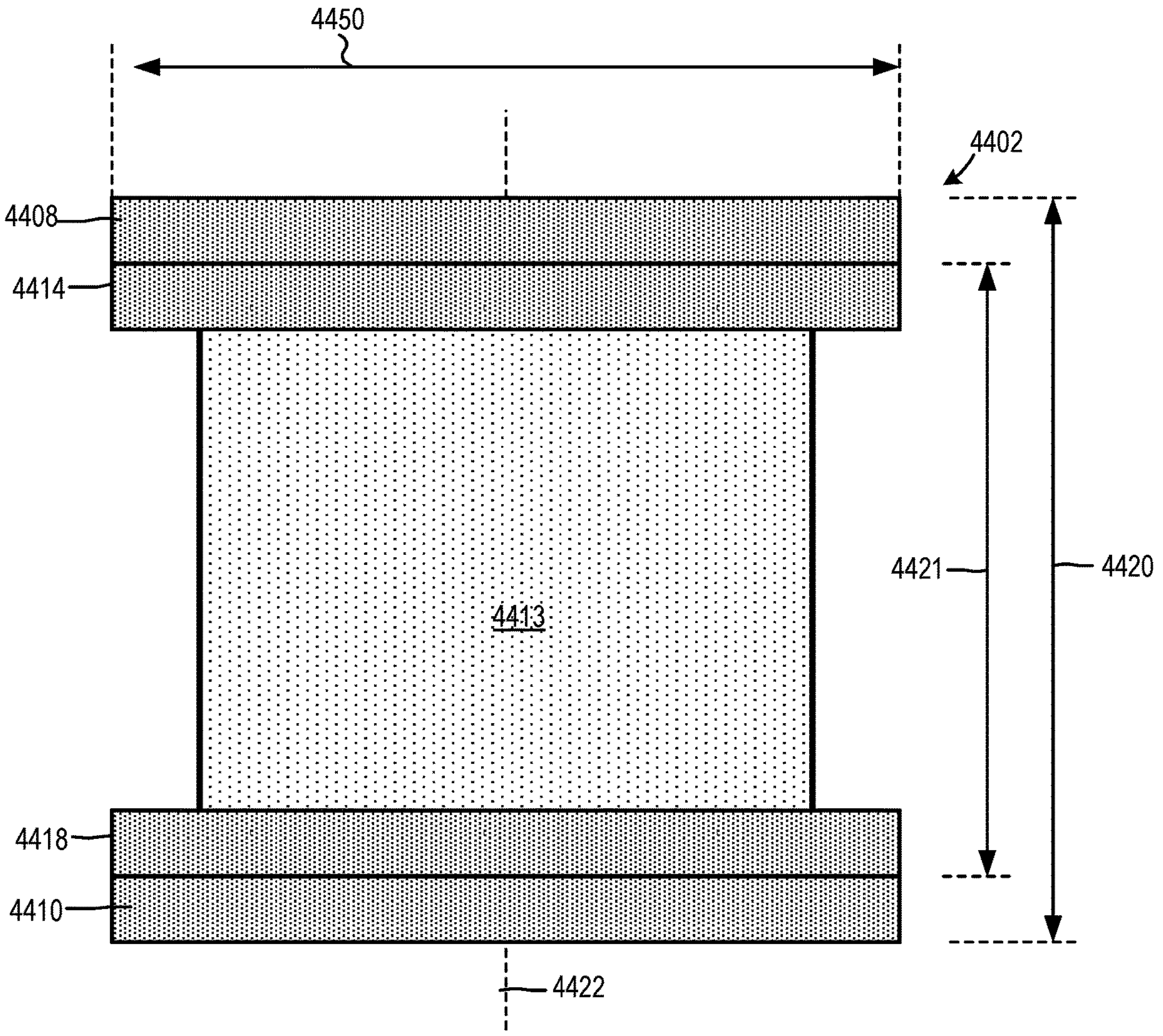
FIG. 46 is another side elevational view of the FIG. 44 magnetic device
Figure 47:
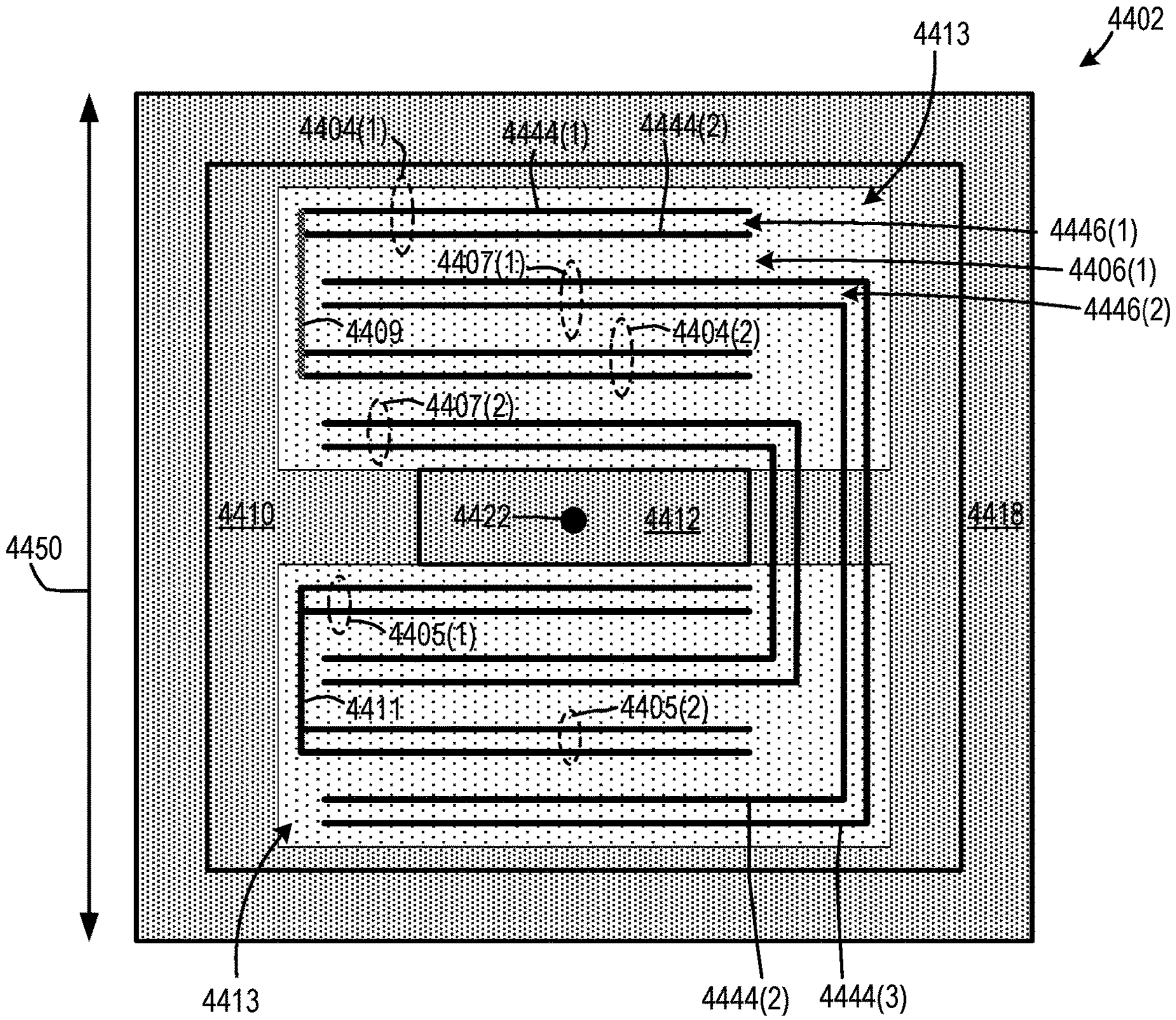
FIG. 47 is a cross-sectional view of the FIG. 44 magnetic device taken along line 47A-47A of FIG. 45.
Figure 48:
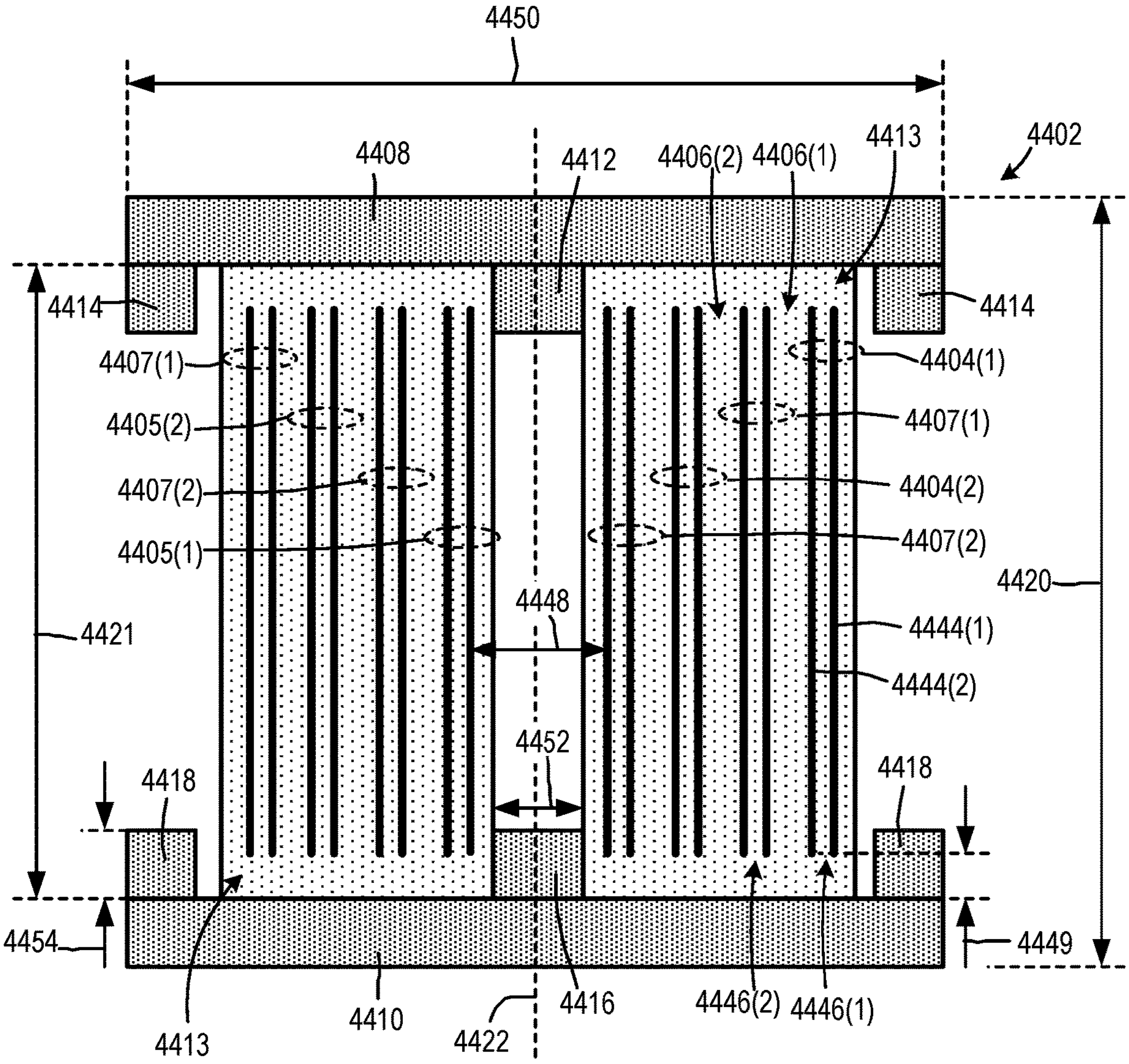
FIG. 48 is a cross-sectional view of the FIG. 44 magnetic device taken along line 48A-48A of FIG. 44.
Figure 49:
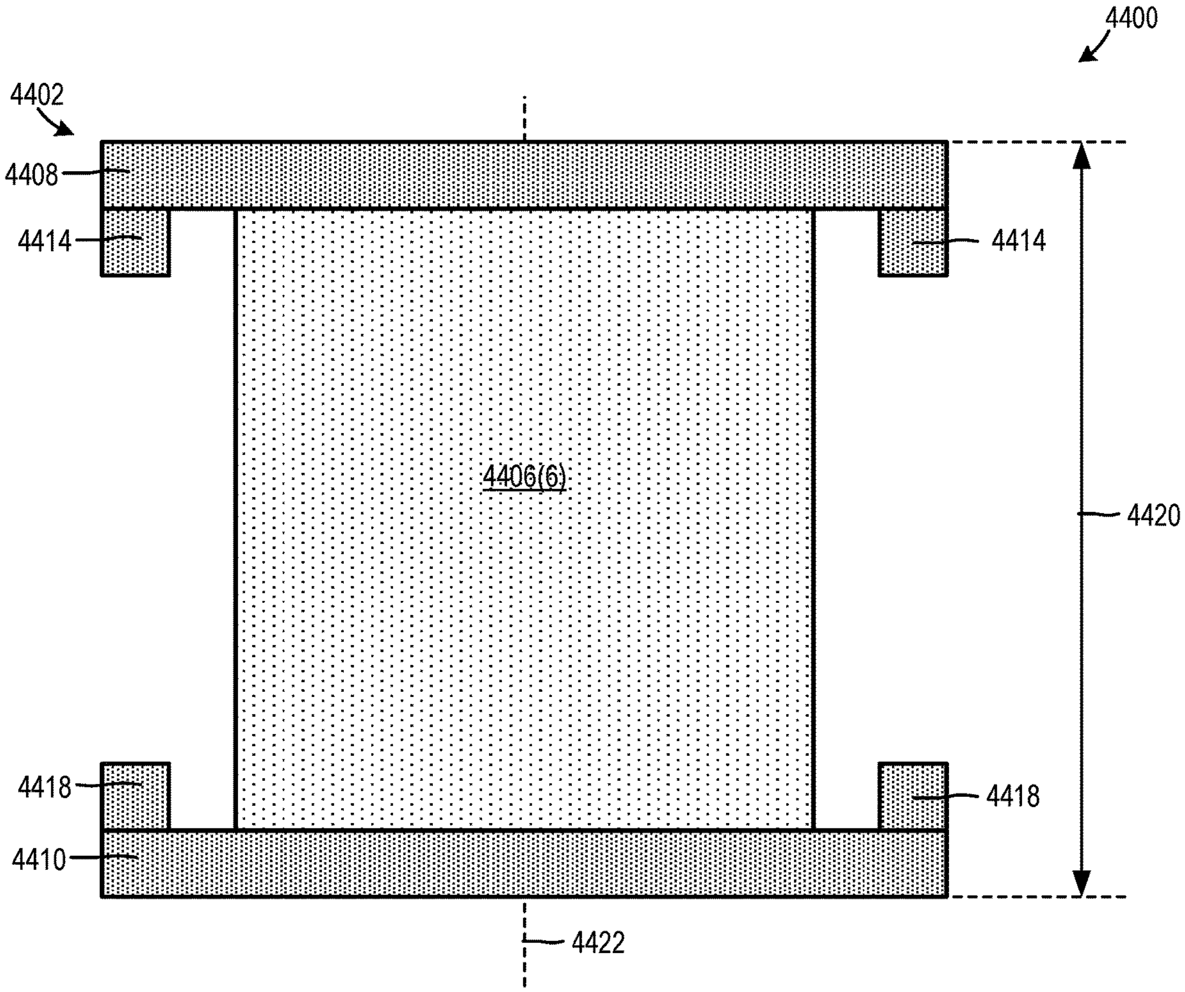
FIG. 49 is a cross-sectional view of the FIG. 44 magnetic device taken along line 49A-49A of FIG. 44.

FIGS. 44-48 illustrate a magnetic device 4400 including another embodiment of the new magnetic cores with magnetic extensions. In particular, FIG. 44 is a top plan view of a magnetic device 4400, FIG. 45 is a side elevational view of a side 4401 of magnetic device 4400 as labeled in FIG. 44, FIG. 46 is a side elevational view of a side 4403 of magnetic device 4400 as labeled in FIG. 44, FIG. 47 is a cross-sectional view of magnetic device 4400 taken along line 47A-47A of FIG. 45, FIG. 48 is a cross-sectional view of magnetic device 4400 taken along line 48A-48A of FIG. 44, and FIG. 49 is a cross-sectional view of magnetic device 4400 taken along line 49A-49A of FIG. 44.

Magnetic device 4400 includes a magnetic core 4402, one or more first conductor layers 4404, one or more second conductor layers 4405, one or more third conductor layers 4407, and one or more separation dielectric layers 4406. Separation dielectric layers 4406 separate adjacent conductor layers. Each third conductor layer 4407 is wound around a center axis 4422 of magnetic device 4440 such that (1) a first end of the third conductor layer is interdigitated with one or more first conductor layers 4404 in a widthwise 4450 direction, and (2) a second end of the third conductor layer is interdigitated with one or more second conductor layers 4405 in the widthwise 4450. The widthwise direction is orthogonal to a thickness direction 4420. Conductor layers 4404, 4405, 4407 and separation dielectric layers 4406 are stacked in an alternating direction in the widthwise 4450 direction. Each conductor layer 4404, 4405, and 4407 includes two conductor sublayers 4444 separated by a sublayer dielectric layer 4446. First conductor layers 4404 are electrically by a conductor 4409, and a first electrical terminal (not shown) is optionally electrically coupled to conductor 4409. Second conductor layers 4405 are electrically by a conductor 4411, and a second electrical terminal (not shown) is optionally electrically coupled to conductor 4411. The first and second electrical terminals, when included, provide electrical interface to magnetic device 4400. The number of conductor layers 4404, 4405, and 4407 and the number of separation dielectric layers 4406 may be varied without departing from the scope hereof. Conductor layers 4404, 4405, and 4407 are optionally separated from magnetic core 4402 by additional dielectric material 4413.

Magnetic core 4402 includes a first end magnetic element 4408, a second end magnetic element 4410, a first inner magnetic extension 4412, a first outer magnetic extension 4414, a second inner magnetic extension 4416, and a second outer magnetic extension 4418. First and second end magnetic elements 4408 and 4410 are separated from each other in a thickness 4420 direction by a separation distance 4421. First inner magnetic extension 4412 is disposed on first end magnetic element 4408 and extends toward second end magnetic element 4410, and first outer magnetic extension 4414 is disposed on first end magnetic element 4408 and extends toward second end magnetic element 4410. Similarly, second inner magnetic extension 4416 is disposed on second end magnetic element 4410 and extends toward first end magnetic element 4408, and second outer magnetic extension 4418 is disposed on second end magnetic element 4410 and extends toward first end magnetic element 4408. First and second inner magnetic extensions 4412 and 4416 are collinear with a center axis 4422 extending in the thickness 4420 direction. First inner magnetic extension 4412 is separated from second inner magnetic extension 4416 in the thickness 4420 direction, and first outer magnetic extension 4414 is separated from second outer magnetic extension 4418 in the thickness 4420 direction. Magnetic core 4402 is formed, for example, of a ferrite magnetic material or a powder iron magnetic material. The lines separating the various elements of magnetic core 4402 are to facilitate identification of the elements and do not necessarily represent discontinuities in magnetic core 4402.

Conductor layers are separated about center axis 4422 by a first gap width 4448 in the widthwise direction 4450. Additionally, conductor layers 4404, 4405, and 4407 are separated from magnetic core 4402 in the thickness 4420 direction by second gap thickness 4449. Each of first and second inner magnetic extensions 4412 and 4416 has an inner extension width 4452 in the widthwise 4450 direction. Each of first and second outer magnetic extensions 4414 and 4418 has an outer extension height 4454 in the thickness 4420 direction. Inner magnetic extensions 4412 and 4416 and outer magnetic extensions 4414 and 4418 shape magnetic fields generated by current flowing through conductor layers 4404, 4405, and 4407 to help achieve magnetic fields which are substantially parallel to conductor layers 4404, 4405, and 4407 near edges of the conductor layers, thereby potentially significantly reducing current crowding associated with use of conventional magnetic cores. Applicant has found that configuring magnetic core 4402 such that (a) inner extension width 4452 is approximately equal to gap width 4448 and (b) outer gap height 4454 is approximately equal to second gap thickness 4449 may promote low effective resistance of conductor layers 4404, 4405, and 4407.

Figure 50:
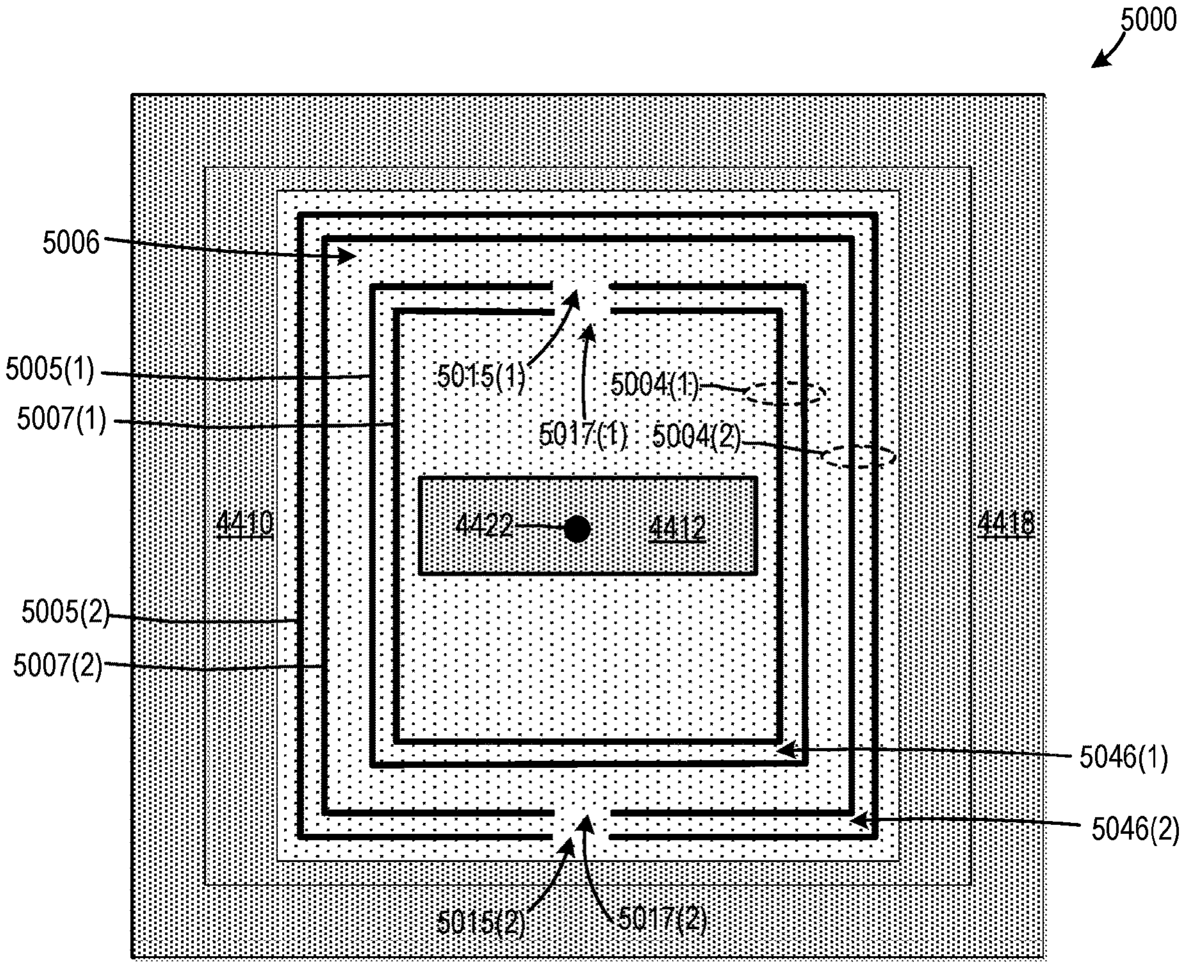
FIG. 50 is a cross-sectional view of a magnetic device which is like the FIG. 44 magnetic device but having a parallel-resonant electric topology, according to an embodiment.

The configuration of conductor layers and/or separation dielectric layers in magnetic device 4400 may be varied without departing from the scope hereof. For example, in some alternate embodiments, the conductor layers and separation dielectric layers have respective configurations similar to the conductor layers and separation dielectric layers of FIG. 25, 27, 29, or 33. For instance, FIG. 50 is a cross-sectional view analogous to the FIG. 47 cross-sectional view of a magnetic device 5000 which is like magnetic device 4400 but has a parallel-resonant electric topology instead of a series-resonant electrictopology. Magnetic device 5000 includes a plurality of conductor layers 5004 concentrically stacked around center axis 4422, where each conductor layer 5004 includes a first conductor sublayer 5005 and a second conductor sublayer 5007 concentrically stacked around center axis 4422. A separation dielectric layer 5006 separates each pair of adjacent conductor layers 5004, and a sublayer dielectric layer 5046 separates adjacent first and second conductor sublayers 5005, 5007 within each conductor layer 5006.

Each first conductor sublayer 5005 forms a first notch or discontinuity 5015, and each second conductor sublayer 5007 forms a second notch or discontinuity 5017. Although discontinuities 5015 and 5017 are illustrated as being filled with air, discontinuities 5015 and 5017 could be filled with another material, such as material forming sublayer dielectric layers 5046 or material forming separation dielectric layers 5006, without departing from the scope hereof. Within each conductor layer 5004 instance, first and second discontinuities 5015, 5017 are angularly aligned with respect to center axis 4422, such that first and second conductor sublayers 5005, 5007 have a common alignment. Conductor layers 5004 have alternating opposing orientations, to excite capacitance between adjacent tubular conductor layers and thereby achieve integrated capacitance of magnetic device 5000. Magnetic device 5000 could include additional conductor layers 5004 without departing from the scope hereof.

Figure 51:
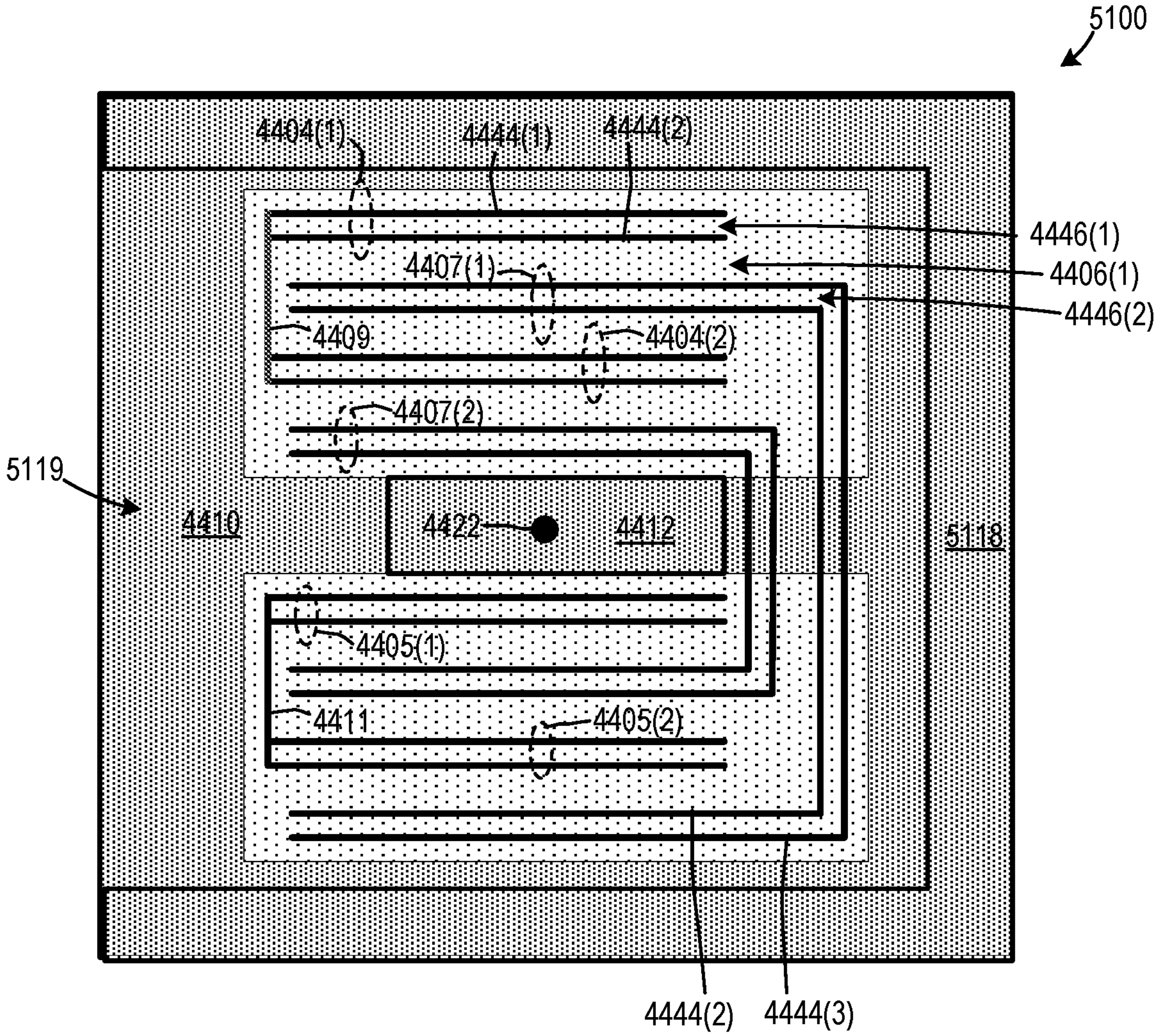
FIG. 51 is a cross-sectional view of a magnetic device which is like the FIG. 44 magnetic device but with a different second outer magnetic extension, according to an embodiment.

Returning to FIGS. 44-48, the shape of magnetic device 4400 could be varied without departing from the scope hereof. For example, although magnetic device 4400 is illustrated as having a rectangular-shape as seen when viewed in the thickness 4420 direction, magnetic device 4400 could be modified to have a circular shape as seen when viewed in the thickness 4420 direction. As another example, magnetic core 4402 could be modified to include passageways, such as for electrical conductors to extend through magnetic core 4402. For instance, FIG. 51 is a cross-sectional view analogous to the FIG. 47 cross-sectional view of a magnetic device 5100 which is like magnetic device 4400 but including a second outer magnetic extension 5118 in place of second outer magnetic extension 4418. Second outer magnetic extension 5118 forms a passageway 5119 on a left side of magnetic device 5100.

Combinations of Features

Features described above may be combined in various ways without departing from the scope hereof. The following examples illustrate some possible combinations:

(A1) A resonant coil with integrated capacitance may include at least one separation dielectric layer and a plurality of conductor layers stacked in an alternating manner Each of the plurality of conductor layers includes a first conductor sublayer and second conductor sublayer having common orientation and a sublayer dielectric layer separating the first and second conductor sublayers. Adjacent conductor layers of the plurality of conductor layers have different orientations.

(A2) In the resonant coil denoted as (A1), the at least one separation dielectric layer may be formed of a first material, the sublayer dielectric layer of each of the plurality of conductor layers may be formed of a second material, where the first material has a lower dielectric loss than the second material.

(A3) In the resonant coil denoted as (A2), the second material may be selected from the group consisting of polyimide and FR4 epoxy fiberglass composite.

(A4) In any one of the resonant coils denoted as (A1) through (A3), the at least one separation dielectric layer and the plurality of conductor layers may be concentrically stacked in an alternating manner around a common axis.

(A5) In the resonant coil denoted as (A4), the common axis may form a loop around a center axis of the resonant coil, and the resonant coil may have a toroidal shape.

(A6) In the resonant coil denoted as (A5), each first conductor sublayer may form a first discontinuity along the common axis, such that the first conductor sublayer does not completely encircle the center axis, each second conductor sublayer may form a second discontinuity along the common axis, such that the second conductor sublayer does not completely encircle the center axis, and within each of the plurality of conductor layers, each first discontinuity may be angularly aligned with each second discontinuity around the center axis.

(A7) In the resonant coil denoted as (A5), each first conductor sublayer may form a first discontinuity, such that the first conductor sublayer does not completely encircle the common axis, each second conductor sublayer may form a second discontinuity, such that the second conductor sublayer does not completely encircle the common axis, and within each of the plurality of conductor layers, each first discontinuity may be angularly aligned with each second discontinuity around the common axis.

(A8) In the resonant coil denoted as (A4), each first conductor sublayer may form a first discontinuity, such that the first conductor sublayer does not completely encircle the common axis, each second conductor sublayer may form a second discontinuity, such that the second conductor sublayer does not completely encircle the common axis, and within each of the plurality of conductor layers, each first discontinuity may be angularly aligned within each second discontinuity around the common axis.

(A9) In the resonant coil denoted as (A8), the resonant coil may have a cylindrical shape, as seen when the resonant coil is viewed cross-sectionally along the common axis.

(A10) In the resonant coil denoted as (A8), the resonant coil having a rectangular shape, as seen when the resonant coil is viewed cross-sectionally along the common axis.

(A11) In any of the resonant coils denoted as (A1) through (A3), the at least one separation dielectric layer and the plurality of conductor layers may be stacked in an alternating manner in a thickness direction.

(A12) In the resonant coil denoted as (A11), within each of the plurality of conductor layers, each of the first and second conductor sublayers may be a foil conductor having a C-shape, and the first conductor sublayer may be aligned with the second conductor sublayer, as seen when the resonant coil is viewed cross-sectionally in the thickness direction.

(A13) In the resonant coil denoted as (A12), within each of the plurality of conductor layers, the first conductor sublayer may form a first notch, the second conductor sublayer may form a second notch, and the first notch may be angularly aligned with the second notch around a center axis extending in the thickness direction.

(A14) In the resonant coil denoted as (A13), the first and second notches of a first conductor layer of the plurality of conductor layers may be angularly displaced with the first and second notches of a second conductor layer of the plurality of conductor layers, around the center axis.

(B1) A resonant coil with integrated capacitance may include first and second terminals and at least one separation dielectric layer and a plurality of conductor layers stacked in an alternating manner in a first direction. Each of the plurality of conductor layers may include (a) a first conductor sublayer and second conductor sublayer and (b) a sublayer dielectric layer separating the first and second conductor sublayers in the first direction. At least one of the plurality of conductor layers may be electrically coupled to the first terminal, and at least one of the plurality of conductor layers may be electrically coupled to the second terminal, such that the resonant coil has a series-resonant electrical topology as seen from the first and second terminals.

(B2) In the resonant coil denoted as (B1), within each of the plurality of conductor layers, the first and second conductor sublayer may be electrically coupled in parallel.

(B3) In any one of the resonant coils denoted as (B1) and (B2), the at least one separation dielectric layer may be formed of a first material, and the sublayer dielectric layer of each of the plurality of conductor layers may be formed of a second material, where the first material has a lower dielectric loss than the second material.

(B4) In the resonant coil denoted as (B3), the second material may be selected from the group consisting of polyimide and FR4 epoxy fiberglass composite.

(B5) In any one of the resonant coils denoted as (B1) through (B4), the plurality of conductor layers may include (a) a plurality of first conductor layers, (b) a plurality of second conductor layers, (c) a plurality of third conductor layers interdigitated with the plurality of first conductor layers in the first direction, and (d) a plurality of fourth conductor layers interdigitated with the plurality of second conductor layers in the first direction. The plurality of third conductor layers may be electrically coupled in parallel with the plurality of fourth conductor layers.

(B6) In any one of the resonant coils denoted as (B1) through (B4), the plurality of conductor layers may include (a) a plurality of first conductor layers, (b) a plurality of second conductor layers, and (c) a plurality of third conductor layers wound around a center axis of the resonant coil, the center axis being orthogonal to the first direction. Each of the plurality of third conductor layers may have a respective first end interdigitated with the plurality of first conductor layers in the first direction and a respective second end interdigitated with the plurality of second conductor layers in the second direction.

(C1) A magnetic device may include a magnetic core and any one of the resonant coils denoted as (A1) through (A14) and (B1) through (B6).

(D1) A magnetic device may include a magnetic core, including (a) an end magnetic element, (b) a center post extending away from the end magnetic element in a thickness direction, (c) a hollow outer magnetic element concentric with the center post and extending away from the end magnetic element in the thickness direction, and (d) an inner magnetic extension and an outer magnetic extension each concentric with the center post. Each of the inner magnetic extension and the outer magnetic extension may be disposed between the hollow outer magnetic element and the center post as seen when the magnetic device is viewed cross-sectionally in the thickness direction. The magnetic device may further include a plurality of conductor layers wound around the center post.

(D2) In magnetic device denoted as (D1), the inner magnetic extension may be attached to the center post, and the outer magnetic extension may be attached to the hollow outer magnetic element.

(D3) In any one of the magnetic devices denoted as (D1) and (D2), the outer magnetic extension may be separated from the inner magnetic extension, as seen when the magnetic device is viewed cross-sectionally in the thickness direction.

(D4) In any one of the magnetic devices denoted as (D1) through (D3), the plurality of conductor layers may be disposed, in the thickness direction, between (a) the end magnetic element and (b) the inner and outer magnetic extensions.

(D5) In any one of the magnetic devices denoted as (D1) through (D4), the hollow outer magnetic element may have a shape selected from the group consisting of a circular shape and a rectangular shape, as seen when the magnetic device is viewed cross-sectionally in the thickness direction.

(D6) Any one of the magnetic devices denoted as (D1) through (D5) may further include least one separation dielectric layer, where the at least one separation dielectric layer and the plurality of conductor layers stacked in an alternating manner around a common axis extending in the thickness direction.

(D7) In the magnetic device denoted as (D6), each of the plurality of conductor layers may include a first conductor sublayer and second conductor sublayer having common orientation and a sublayer dielectric layer separating the first and second conductor sublayers. Adjacent conductor layers of the plurality of conductor layers may have different orientations.

(D8) In the magnetic device denoted as (D6), each of the at least one separation dielectric layer and the plurality of conductor layers may be concentric with respect to the common axis.

(D9) In the magnetic device denoted as (D6), the at least one separation dielectric layer and the plurality of conductor layers may be stacked in an alternating manner in the thickness direction.

(E1) A magnetic device may include a magnetic core, including (a) first and second end magnetic elements separated from each other in a first direction, (b) a first inner magnetic extension disposed on the first end magnetic element and extending toward the second end magnetic element, (c) a first outer magnetic extension disposed on the first end magnetic element and extending toward the second end magnetic element, (d) a second inner magnetic extension disposed on the second end magnetic element and extending toward the first end magnetic element, and (e) a second outer magnetic extension disposed on the second end magnetic element and extending toward the first end magnetic element. The magnetic device may further include plurality of conductor layers disposed, as seen when the magnetic device is viewed cross-sectionally in the first direction, (a) outside of the first and second inner magnetic extensions and (b) inside the first and second outer magnetic extensions.

(E2) In the magnetic device denoted as (E1), the first and second inner magnetic extensions may be collinear with a common axis extending in the first direction, and the plurality of conductor layers may be wound around the common axis.

(E3) In the magnetic device denoted as (E2), the first inner magnetic extension may be separated from the second inner magnetic extension in the first direction, and the first outer magnetic extension may be separated from the second outer magnetic extension in the first direction.

(E4) Any one of the magnetic devices denoted as (E2) and (E3) may further include at least one separation dielectric layer, where the at least one separation dielectric layer and the plurality of conductor layers stacked in an alternating manner around a common axis extending in the first direction.

(E5) In the magnetic device denoted as (E4), each of the plurality of conductor layers may include a first conductor sublayer and second conductor sublayer having common orientation and a sublayer dielectric layer separating the first and second conductor sublayers. Adjacent conductor layers of the plurality of conductor layers may have different orientations.

(E6) In the magnetic device denoted as (E5) each of the at least one separation dielectric layer and the plurality of conductor layers may be concentric with respect to the common axis.

Changes may be made in the embodiments disclosed above without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A resonant coil with integrated capacitance, comprising:

at least one separation dielectric layer formed of a first material and a plurality of conductor layers stacked in an alternating manner, each of the plurality of conductor layers including:

a first conductor sublayer and second conductor sublayer having common orientation, and a sublayer dielectric layer formed of a second material separating the first and second conductor sublayers;

adjacent conductor layers of the plurality of conductor layers having different orientations and the first material having a lower dielectric loss than the second material.

2. The resonant coil of claim 1, the second material selected from the group consisting of polyimide and FR4 epoxy fiberglass composite.

3. The resonant coil of claim 1, the at least one separation dielectric layer and the plurality of conductor layers being concentrically stacked in an alternating manner around a common axis.

4. The resonant coil of claim 3, the common axis forming a loop around a center axis of the resonant coil, and the resonant coil having a toroidal shape.

5. The resonant coil of claim 4, wherein:

each first conductor sublayer forms a first discontinuity along the common axis, such that the first conductor sublayer does not completely encircle the center axis;

each second conductor sublayer forms a second discontinuity along the common axis, such that the second conductor sublayer does not completely encircle the center axis; and within each of the plurality of conductor layers, each first discontinuity is angularly aligned with each second discontinuity around the center axis.

6. The resonant coil of claim 4, wherein:

each first conductor sublayer forms a first discontinuity, such that the first conductor sublayer does not completely encircle the common axis;

each second conductor sublayer forms a second discontinuity, such that the second conductor sublayer does not completely encircle the common axis; and within each of the plurality of conductor layers, each first discontinuity is angularly aligned with each second discontinuity around the common axis.

7. The resonant coil of claim 3, wherein:

each first conductor sublayer forms a first discontinuity, such that the first conductor sublayer does not completely encircle the common axis;

each second conductor sublayer forms a second discontinuity, such that the second conductor sublayer does not completely encircle the common axis; and within each of the plurality of conductor layers, each first discontinuity is angularly aligned within each second discontinuity around the common axis.

8. The resonant coil of claim 7, the resonant coil having a cylindrical shape, as seen when the resonant coil is viewed cross-sectionally along the common axis.

9. The resonant coil of claim 7, the resonant coil having a rectangular shape, as seen when the resonant coil is viewed cross-sectionally along the common axis.

10. The resonant coil of claim 1, the at least one separation dielectric layer and the plurality of conductor layers being stacked in an alternating manner in a thickness direction.

11. The resonant coil of claim 10, wherein, within each of the plurality of conductor layers:

each of the first and second conductor sublayers is a foil conductor having a C-shape; and the first conductor sublayer is aligned with the second conductor sublayer, as seen when the resonant coil is viewed cross-sectionally in the thickness direction.

12. The resonant coil of claim 11, wherein, within each of the plurality of conductor layers:

the first conductor sublayer forms a first notch;

the second conductor sublayer forms a second notch; and the first notch is angularly aligned with the second notch around a center axis extending in the thickness direction.

13. The resonant coil of claim 12, the first and second notches of a first conductor layer of the plurality of conductor layers being angularly displaced with the first and second notches of a second conductor layer of the plurality of conductor layers, around the center axis.

14. A magnetic device, comprising:

a magnetic core; and the resonant coil of claim 1.

15. A resonant coil with integrated capacitance, comprising:

first and second terminals; and at least one separation dielectric layer formed of a first material and a plurality of conductor layers stacked in an alternating manner in a first direction, each of the plurality of conductor layers including:

a first conductor sublayer and second conductor sublayer, and a sublayer dielectric layer formed of a second material separating the first and second conductor sublayers in the first direction;

adjacent conductor layers of the plurality of conductor layers having different orientations and the first material having a lower dielectric loss than the second material;

at least one of the plurality of conductor layers being electrically coupled to the first terminal, and at least one of the plurality of conductor layers being electrically coupled to the second terminal, such that the resonant coil has a series-resonant electrical topology as seen from the first and second terminals.

16. The resonant coil of claim 15, within each of the plurality of conductor layers, the first and second conductor sublayer being electrically coupled in parallel.

17. The resonant coil of claim 15, the second material selected from the group consisting of polyimide and FR4 epoxy fiberglass composite.

18. The resonant coil of claim 15, the plurality of conductor layers comprising:

a plurality of first conductor layers;

a plurality of second conductor layers;

a plurality of third conductor layers interdigitated with the plurality of first conductor layers in the first direction; and a plurality of fourth conductor layers interdigitated with the plurality of second conductor layers in the first direction;

the plurality of third conductor layers being electrically coupled in parallel with the plurality of fourth conductor layers.

19. The resonant coil of claim 15, the plurality of conductor layers comprising:

a plurality of first conductor layers;

a plurality of second conductor layers; and a plurality of third conductor layers wound around a center axis of the resonant coil, the center axis being orthogonal to the first direction;

each of the plurality of third conductor layers including:

a respective first end interdigitated with the plurality of first conductor layers in the first direction, and a respective second end interdigitated with the plurality of second conductor layers in the second direction.

* * * * *